April 28, 1953  E. J. FOGARTY ET AL  2,636,285
AIRCRAFT PILOT TRAINER

Filed Oct. 12, 1945  17 Sheets-Sheet 1

INVENTORS: E. J. FOGARTY
R. O. RIPPERE
BY P. C. Smith
ATTORNEY

April 28, 1953  E. J. FOGARTY ET AL  2,636,285
AIRCRAFT PILOT TRAINER

Filed Oct. 12, 1945  17 Sheets-Sheet 7

INVENTORS: E. J. FOGARTY
R. O. RIPPERE
BY
P. C. Smith
ATTORNEY

INVENTORS: E. J. FOGARTY
R. O. RIPPERE
BY P. C. Smith
ATTORNEY

INVENTORS: E. J. FOGARTY
R. O. RIPPERE
BY
P. C. Smith
ATTORNEY

FIG. 13

April 28, 1953  E. J. FOGARTY ET AL  2,636,285
AIRCRAFT PILOT TRAINER

Filed Oct. 12, 1945  17 Sheets-Sheet 17

FIG. 17

INVENTORS: E. J. FOGARTY
R. O. RIPPERE
BY
P. C. Smith
ATTORNEY

Patented Apr. 28, 1953

2,636,285

UNITED STATES PATENT OFFICE 2,636,285

AIRCRAFT PILOT TRAINER

Edward J. Fogarty, Rutherford, N. J., and Robert O. Rippere, Massapequa, N. Y., assignors to Bell Telephone Laboratories, Incorporated, New York, N. Y., a corporation of New York Application October 12, 1945, Serial No. 622,068

39 Claims. (Cl. 35—12)

This invention relates to an aircraft pilot trainer in which the operation of controls similar to those of a standard aircraft by the pilot causes the operation of intruments on the pilot's instrument panel and of instruments at an instructor's desk to simulate the instrument operation of an actual flight whereby a student pilot may be given ground training commensurate with actual training in an airplane and under all flight conditions which might be encountered during an actual flight.

In the training of pilots it has been the practice heretofore to give them training in aircraft of a training type and also in ground trainers equipped to give them some of the fundamentals of instrument flight. To familiarize the pilots with the handling of power and other equipment of airplanes, ground courses have been given with such equipment. Following such basic training it has then been the practice to train pilots extensively in the flight of actual aircraft which they will later be assigned to fly.

Aircraft are costly to build, to fly and to maintain, and their use for intensive training purposes by pilots who have not yet attained their skills in flying them introduces a great hazard both to the equipment and to the pilots during the training period and obviously withdraws such aircraft from their more valuable use in actual service.

From actual experience it has been found that after the pilots have had all of their basic training in flying and in the operation of the equipment of airplanes, the actual flying hours in the air with airplanes which they will ultimately be assigned to fly, may be materially reduced through the use of a ground trainer designed to simulate all of the flight and operational functions of the type of airplane to which they will later be assigned. A ground trainer of this type for training the crew personnel of a multiengined seaplane has been fully disclosed in Patent 2,584,261 of February 5, 1952, to R. C. Davis, E. J. Fogarty and R. O. Rippere. In Patent 2,564,429 to C. E. Germanton of August 14, 1951, a ground trainer has been disclosed in which a pilot may be trained to perform all the functions required to start and control the engine of an airplane of a single engined high speed type which the trainer is designed to simulate. The present invention relates more particularly to such a trainer in which the pilot may be trained to perform all of the flight functions which would be required to adequately fly such an airplane.

It is therefore an object of the present invention to provide a ground trainer in which a student pilot may be trained to perform all the flight functions which would be required to actually fly an airplane of the type which the trainer is designed to simulate.

To attain this object, the trainer in accordance with this invention has been designed to follow as nearly as possible the flight and engine characteristics of the airplane which it is designed to simulate in the operation of its controls and the instrument response thereto. The instruments and controls provided for the pilot are similar in appearance to those in a regular airplane but such instruments are controlled through electrical circuits and mechanically operated apparatus so that the indications on the instruments and "feel" on the controls simulate those of an airplane in flight. In addition sound effects and airplane vibrations are simulated by a loudspeaker and a vibrator located in the trainer. Although the trainer flight unit remains stationary when the pilot performs his normal functions at the start and during flight, equipment is brought into action which simulates and records engine starting, take-off and landing, banked turns, altitude effects, fuel level and pressure, oil pressure, cylinder and oil temperatures, etc. in the instrument response. The design is based on various aerodynamic and engine performance characteristics and registers and result in terms of normal airplane instrument readings.

The objective is obtained by the use of motor drive and motor control units which operate from input signal potentials caused by the unbalancing of circuits as the engine and flight controls are positioned. These motors through reduction gear trains produce shaft rotations to angular positions proportional to the input potentials. The shafts cause the rotation of potentiometers which control other drive units and also cause the operation of telemetric apparatus which control the operation of corresponding instruments thus causing said instruments to register the shaft positions. Potentiometers are also mechanically coupled to the engine and flight controls and electrically connected to the motor control circuits.

In order that the training of a student pilot may be suitably supervised and directed, an instructor's desk is provided at which duplicates of the instruments of the training unit are mounted, at which control keys and switches are provided for enabling the instructor to introduce conditions of flight and at which various supervisory signals are also provided.

Just as an airplane uses thrust horsepower created by the engine and propeller to take off, climb and fly, so does the trainer use thrust horsepower to simulate take-off, climb and flight. The flight circuits may be considered in two groups. One group includes the circuits associated with straight ahead flight, including climbing flight, and the other group includes the circuits associated with turns.

The straight flight circuits include angle of attack, angle of climb, indicated airspeed, rate of climb, altimeter, true airspeed, pitch bar and accelerometer circuits.

In an airplane, the pilot uses the elevator control, sometimes called the stick, to control the speed of flight. If the power developed by the engine and propeller is more than is needed to fly level at the speed the pilot chooses, the airplane will climb and similarly if the engine power is less than that required to fly level, the airplane will descend. The position of the stick determines the angle of attack of the wings, which is the angle between the lower surface of the wings and the line of flight of the airplane. The angle of attack determines how much lift or drag the wings produce for any air-speed. In the trainer these effects are controlled in a similar way. The stick is arranged to control the positions of the potentiometers of the angle of attack motor unit. Potentiometers on the angle of attack motor unit in turn control the position of the angle of climb potentiometers, which in turn affect the indicated air-speed motor unit and the rate of climb motor unit. When the angle of climb increases, the rate of climb motor moves the potentiometers and instruments operated thereby to a position representing a higher rate of climb and the indicated air-speed motor moves its potentiometers and instruments to a position representing a lower air-speed. Lower indicated air-speed results in lower true air-speed and as the true air-speed potentiometers move, they reduce a potential controlling the rate of climb motor eventually causing it to stabilize at a new rate of climb.

An angle of climb potentiometer also controls the altimeter motor unit. If the angle of climb represents a positive rate of climb of 200 feet per minute, the altimeter will show an increase of 200 feet in altitude at the end of a minute.

The true air-speed of an airplane is usually different from the indicated air-speed because the ordinary air-speed indicator depends on the air density as well as the true speed and said air density depends on barometric pressure and temperature, both of which are closely related to altitude. In the trainer the air density effect is controlled by the altimeter motor unit so that as the altitude increases the true air-speed becomes greater than the indicated air-speed.

The pitch bar motor unit controls the up and down movement of the horizon bar in the gyro horizon instrument. It is controlled by various potentials representing the angle of climb and the vertical components of the angle of attack and yaw. In straight flight an increase in angle of climb or angle of attack will cause the pitch bar motor to move the horizon bar down thus representing a nose up condition.

The accelerometer motor unit is controlled by potentiometers on the angle of attack and wing flaps motor units. A positive increase in angle of attack will cause an increase in the accelerometer indication in a positive direction.

The turning flight circuits include rate of turn, bank, ball, compass, ground speed and ground track. The rudder is used primarily to control movement of an airplane around its vertical axis. This movement is called yawing and the rate at which the airplane turns about its vertical axis is the rate of yaw. The rate of turn with respect to the earth is related to the rate of yaw by the bank angle of the airplane.

The ailerons are used principally to control movement of an airplane around its longitudinal axis. This movement is called rolling. The bank angle or angle between the wings and the horizon is controlled by rolling the airplane.

There are other factors, however, which also affect these movements. If the ailerons are deflected without using the rudder, as the bank angle increases the plane side-slips. Side-slipping causes air to strike the side of the rudder and causes the airplane to yaw in the direction of the side-slip. In this case the rate of yaw is a secondary result of aileron movement. If on the other hand, rudder is applied without movement of the ailerons, the centrifugal force causes the airplane to skid. Because of the construction of the wings, the skid causes the airplane to roll, raising the wing on the side toward which it is skidding. Thus, a secondary result of rudder movement is a change in bank angle.

In the trainer the rate of turn and bank circuits are arranged so that the effects immediately described above are reproduced. Application of left rudder without ailerons causes the rate of turn motor to run its potentiometers and instruments in a direction corresponding to an increasing rate of turn to the left. A potential from a rate of turn potentiometer causes the ball motor to run its potentiometers and instruments to indicate a "ball right" condition, representing a yaw to the left. A potential from a ball potentiometer causes the bank motor to run its potentiometers and instruments in a direction to indicate a lowering of the left wing. A potential from a second ball potentiometer tends to decrease the rate of turn to the left until a stable condition exists.

If the stick is moved to the right without moving the rudder pedals, a potential is connected to the bank motor so that it moves its potentiometers and instruments in a direction corresponding to a lowering of the right wing and a potential from one of these potentiometers causes the ball motor to move to a "ball right" or slip position. A potential from one of the ball potentiometers causes the rate of turn motor to move in a direction to indicate the right turn. The rate of turn movement is reflected into the ball and bank circuits until stabilization occurs under the existing conditions.

The ball circuit controls the movement of the ball indicator in the turn and bank instrument. If the airplane has the correct bank angle for its rate of turn and air-speed, the ball will be centered in the curved glass tube of the instrument. If the right wing is lower than it should be the ball moves to the right. In the trainer if there is a rate of turn to the right, a corresponding potential from the rate of turn potentiometer tends to cause the ball motor to move the ball to the left. If the bank angle is correct for the air-speed and rate of turn, the potential from the bank potentiometer connected to control the ball would be equal and opposite to the rate of turn potential and the ball motor will center the ball.

The remote indicating compass in the trainer is controlled by the movement of the compass motor unit which is a function of the rate of pitch, rate of yaw, bank angle and angle of climb. The effect of rate of pitch increases as the bank angle increases whereas the effect of rate of yaw decreases as the bank angle increases. Both increase as the angle of climb increases. In the trainer, the effect of rate of yaw is introduced by means of potentiometers on the rate of turn motor unit and the effect of rate of pitch by potentiometers on the angle of the attack motor unit. The potentials from these potentiometers are in turn modified by potentiometers representing trigonometric functions of the angle of climb and bank angle.

A turning error is introduced into the compass circuit by means of a rotary transformer mounted on the rate of turn motor unit whereby a potential is imposed, which is proportional to the position of the rate of turn motor unit shaft, on one leg of the telemetric circuit connecting the synchro-transmitter associated with the compass motor unit and the synchro-receivers which are associated with the remote indicating compasses.

The compass, altimeter and air-speed indicators tell the pilot how fast and in what direction the airplane is moving with respect to the air around it. If that air is moving with respect to the earth, the pilot must make allowances for the magnitude and direction of the air movement with respect to the earth. These factors are known as ground wind velocity and direction. In the airplane, the pilot has visual means of estimating wind direction and velocity. In the trainer the instructor must inform the pilot student of any changes. In the trainer the imaginary course flown is recorded on a map by a flight recorder whose direction and speed are controlled by the ground track and ground speed motor control units respectively which are dependent on the true air-speed and compass heading of the simulated flight and the ground wind velocity and direction.

The features of the trainer by which flight conditions may be simulated having been briefly described, reference may now be had for a more comprehensive understanding of the invention to the following detailed description of the invention when read in connection with the accompanying drawings, in which:

Fig. 2 also shows a box in the lower left corner thereof representing a rough air motor unit controlled from the instructor's desk, Fig. 17, for simulating the effects of rough air;

Figure 13:
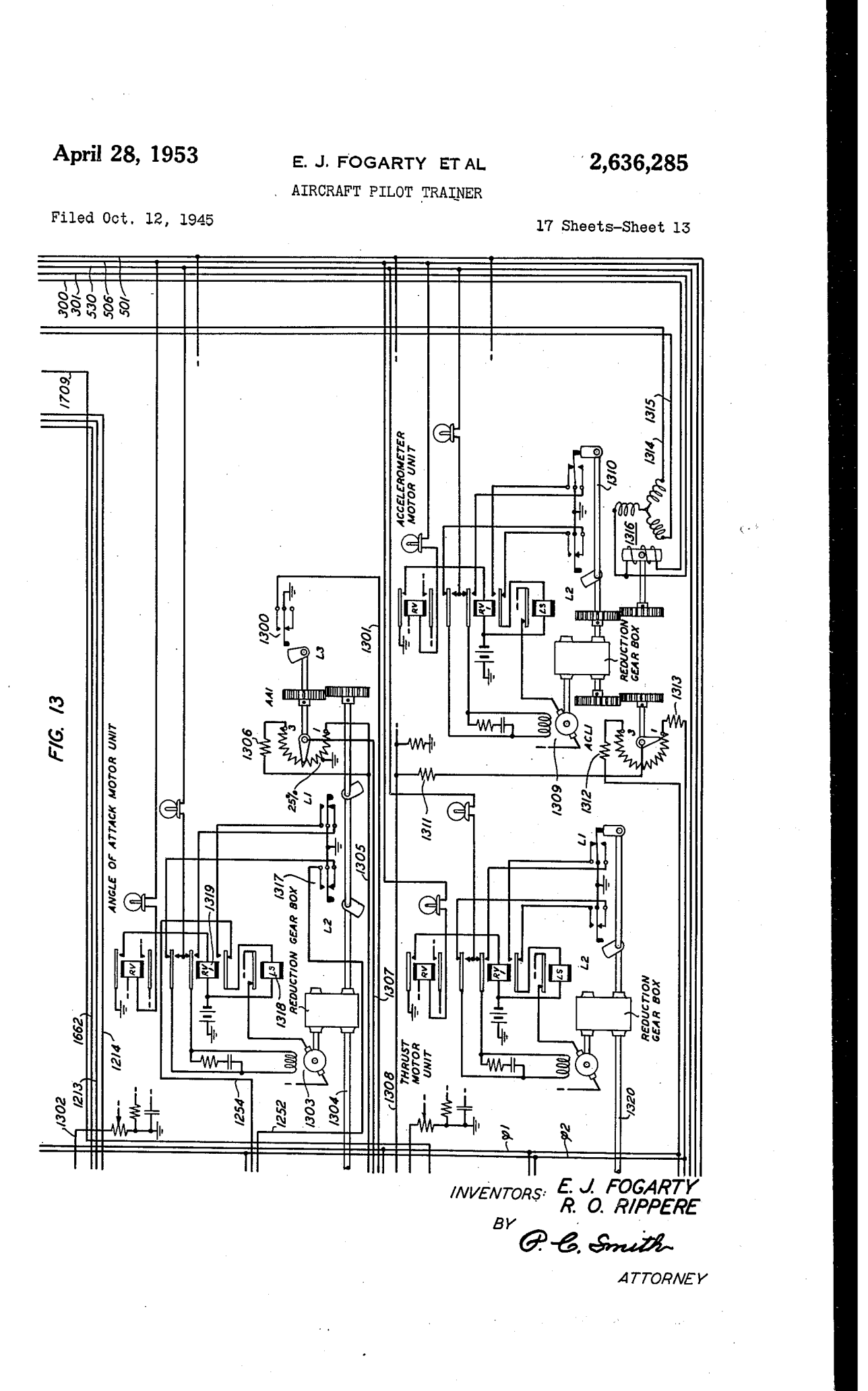
Figure 14:
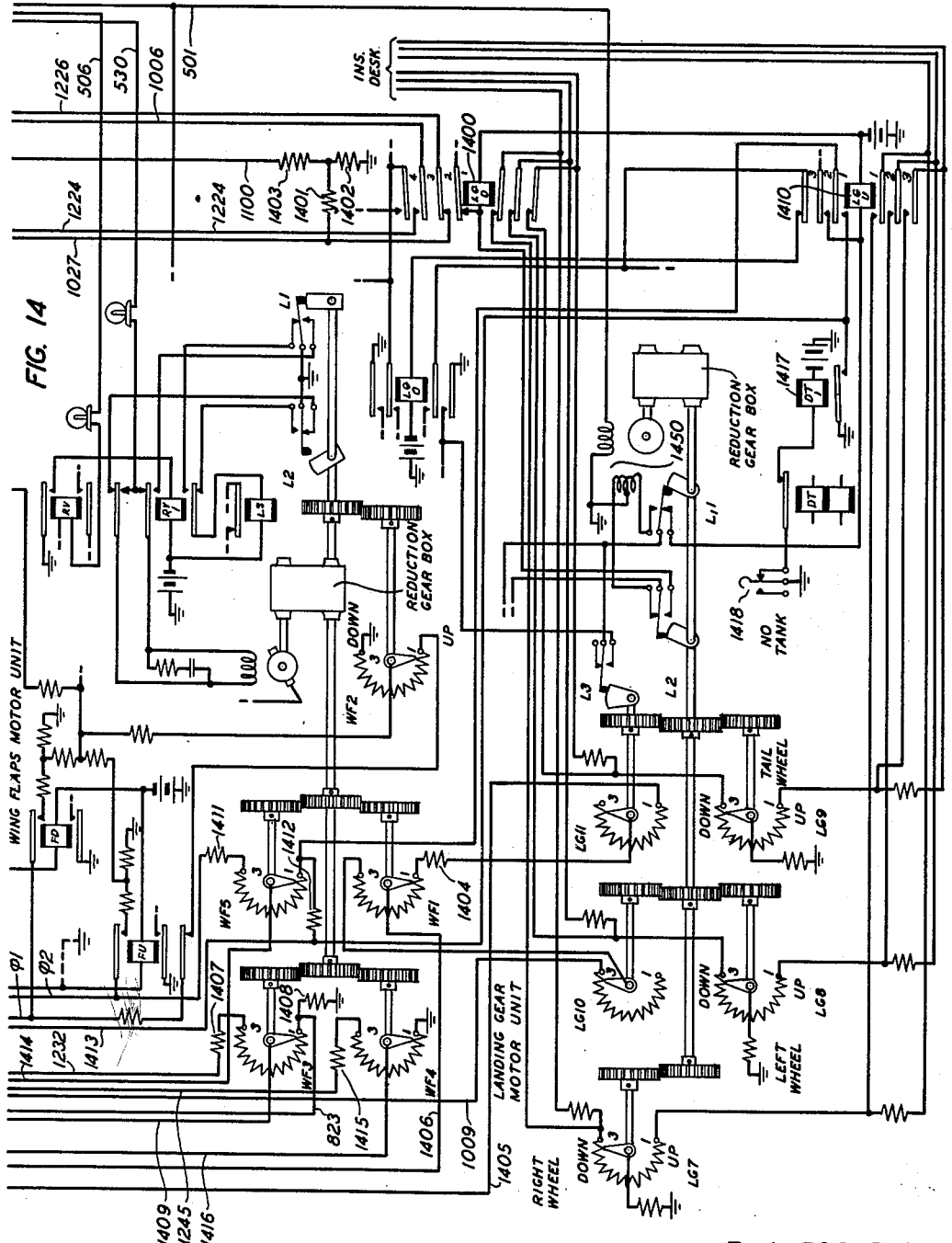
Figure 15:
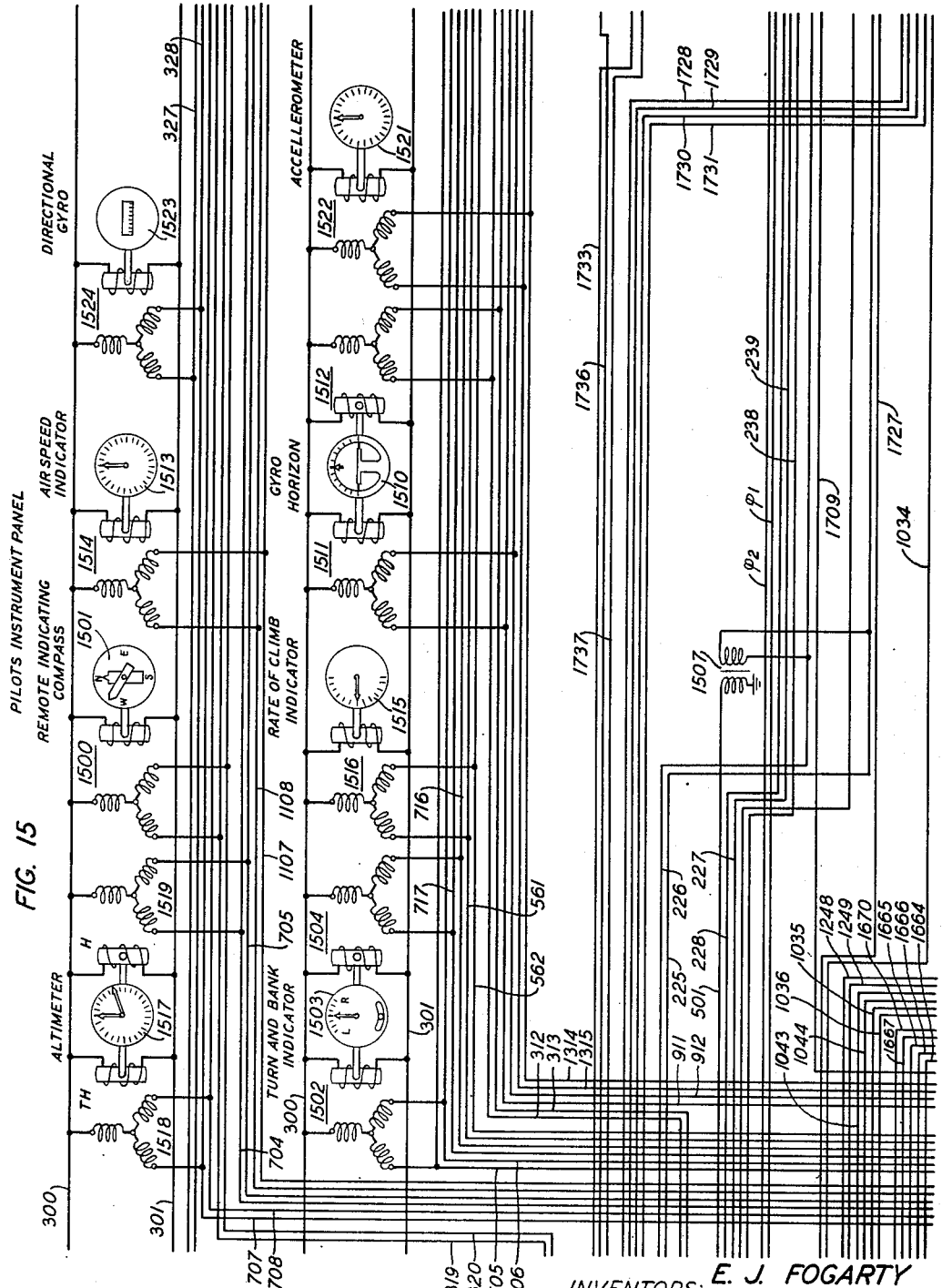
Figure 16:
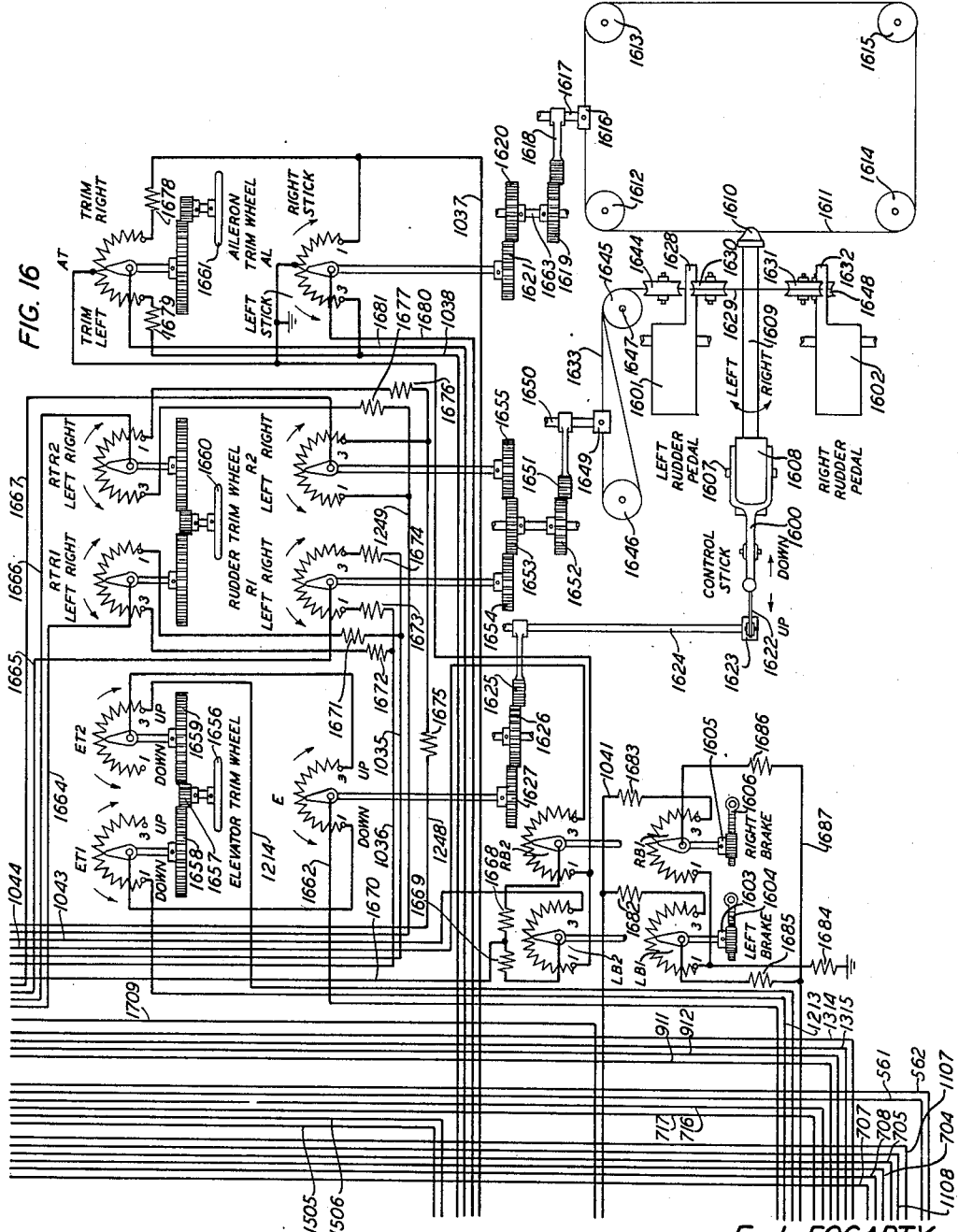

Fig. 13 shows above the dot-dash line a schematic representation of the angle of attack motor control circuit and apparatus of the associated motor unit; at the left and below the dot-dash line, the schematic representation of the thrust motor control circuit and apparatus of the associated motor unit and at the right and below the dot-dash line the schematic representation of the accelerometer motor control circuit and motor unit;

Fig. 14 shows in the upper portion thereof a schematic representation of the wing flaps motor control circuit and motor unit and in the lower portion thereof a schematic representation of the landing gear motor unit;

Fig. 15 shows schematically the instruments mounted on the pilot's flight instrument panel positioned before the pilot's station in the cockpit of the trainer and the synchro-receivers for controlling them;

Fig. 16 shows the potentiometers operated mechanically by the elevator, rudder and the aileron trim wheels, the potentiometers operated by the control stick and rudder pedals and the potentiometers operated by the foot brakes, all of which control equipment is mounted in the cockpit of the trainer and operable by the pilot;

Fig. 17 shows schematically the flight instruments mounted on the instructor's instrument panel at the instructor's desk, controls by which the instructor may impose rough air, wind and wing ice conditions and a schematic representation of the flight recorder which is positioned for movement over a map mounted on the top surface of the desk;

Fig. 18 shows schematically the essential elements of the trainer; and

Fig. 19 is a diagram showing how the several figures of the drawing should be arranged to fully disclose the invention.

Figure 10:
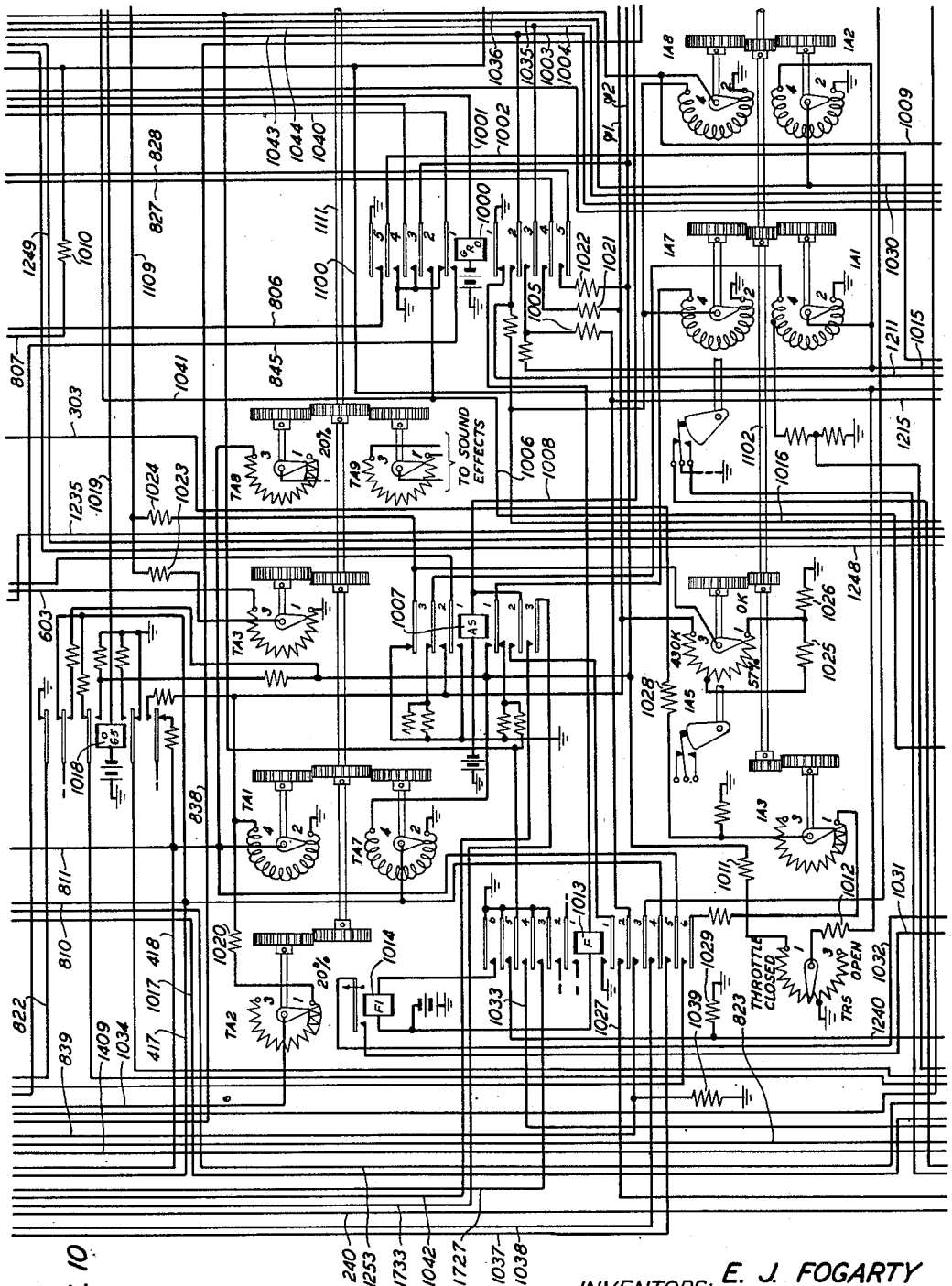
Fig. 10 shows in the upper portion thereof apparatus of the true air-speed motor unit and in the lower portion thereof apparatus of the indicated air-speed motor unit.
Figure 11:
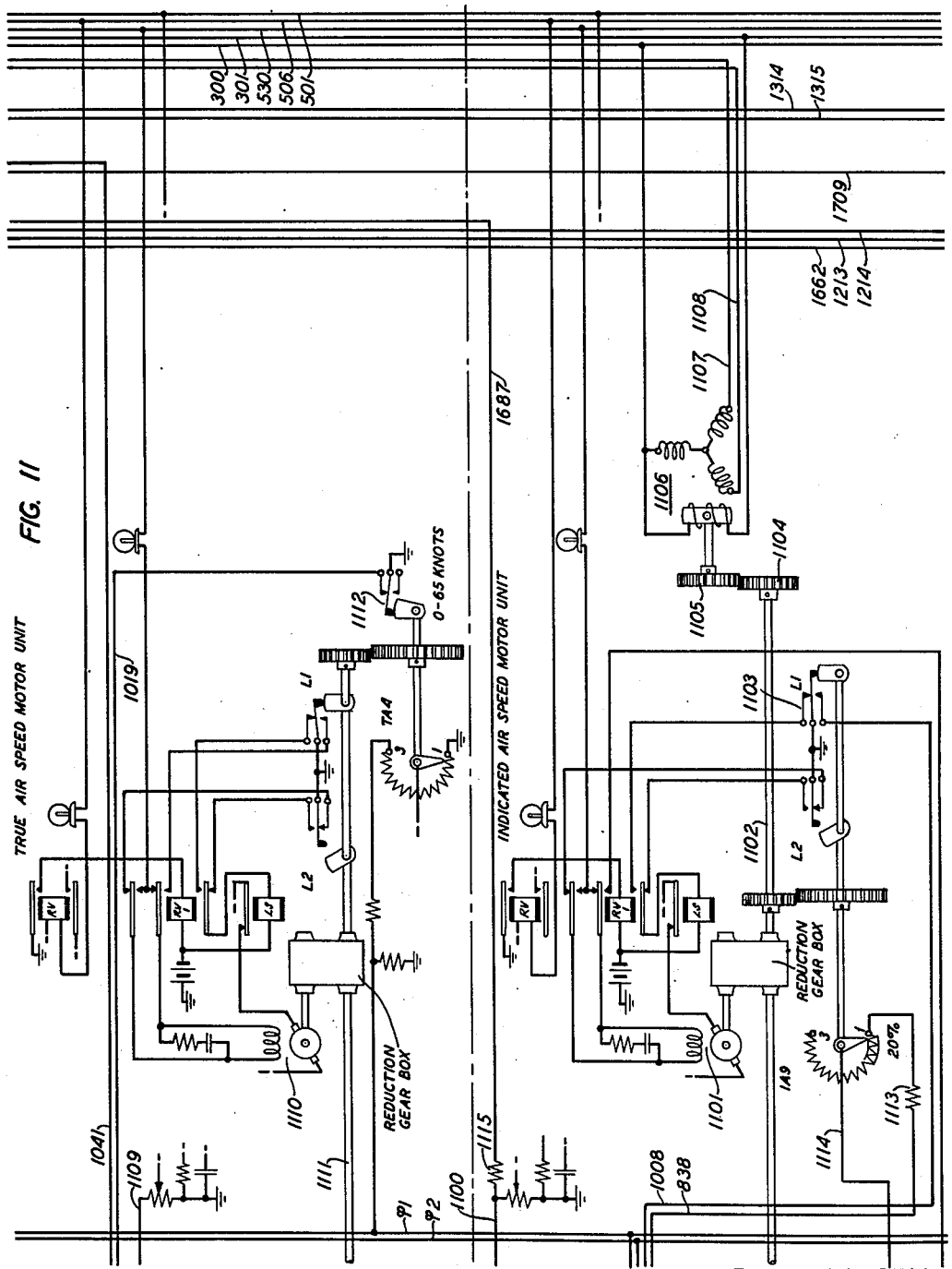
Fig. 11 shows above the dot-dash line a schematic representation of the true air-speed motor control circuit and apparatus of the associated motor unit and below the dot-dash line a schematic representation of the indicated air-speed motor control circuit and apparatus of the associated motor unit.

Referring first to Fig. 10, the trainer comprises a "mock-up" 1800 of the fuselage of an airplane so constructed as to closely resemble in size, arrangement and appearance the fuselage of an actual airplane which the trainer is designed to simulate. The trainer being designed to simulate a single seated airplane of the fighter type, the cockpit is equipped with a regulation pilot seat 1800, control stick 1600, rudder pedals 1601 and 1602, throttle control 1802, governor control 1803 and with all of the other controls and instruments which the pilot would require in the operation and flight of the actual airplane. Connected by a cable 1804 to the trainer 1800 is an instructor's desk 1805 at which are located panels 1806, mounting instruments which duplicate the instruments of the trainer, controls for enabling the instructor to impose operating and flight conditions upon the trainer which might be encountered in the operation and flight of an actual airplane, signals for supervising the response of the pilot under training to the instruction and conditions imposed by the instructor, and a flight recorder 1750 operable over a terrain map on the desk top under the control of the trainer to indicate the simulated course flown by the pilot. Also connected to the trainer 1800 and to the instructor's desk 1805 by other cables 1807 and 1808 are apparatus cabinets 1809 which contain a power supply, motor units, motor controls and miscellaneous circuits which control the operation of the apparatus in the trainer and at the instructor's desk.

Figure 4:
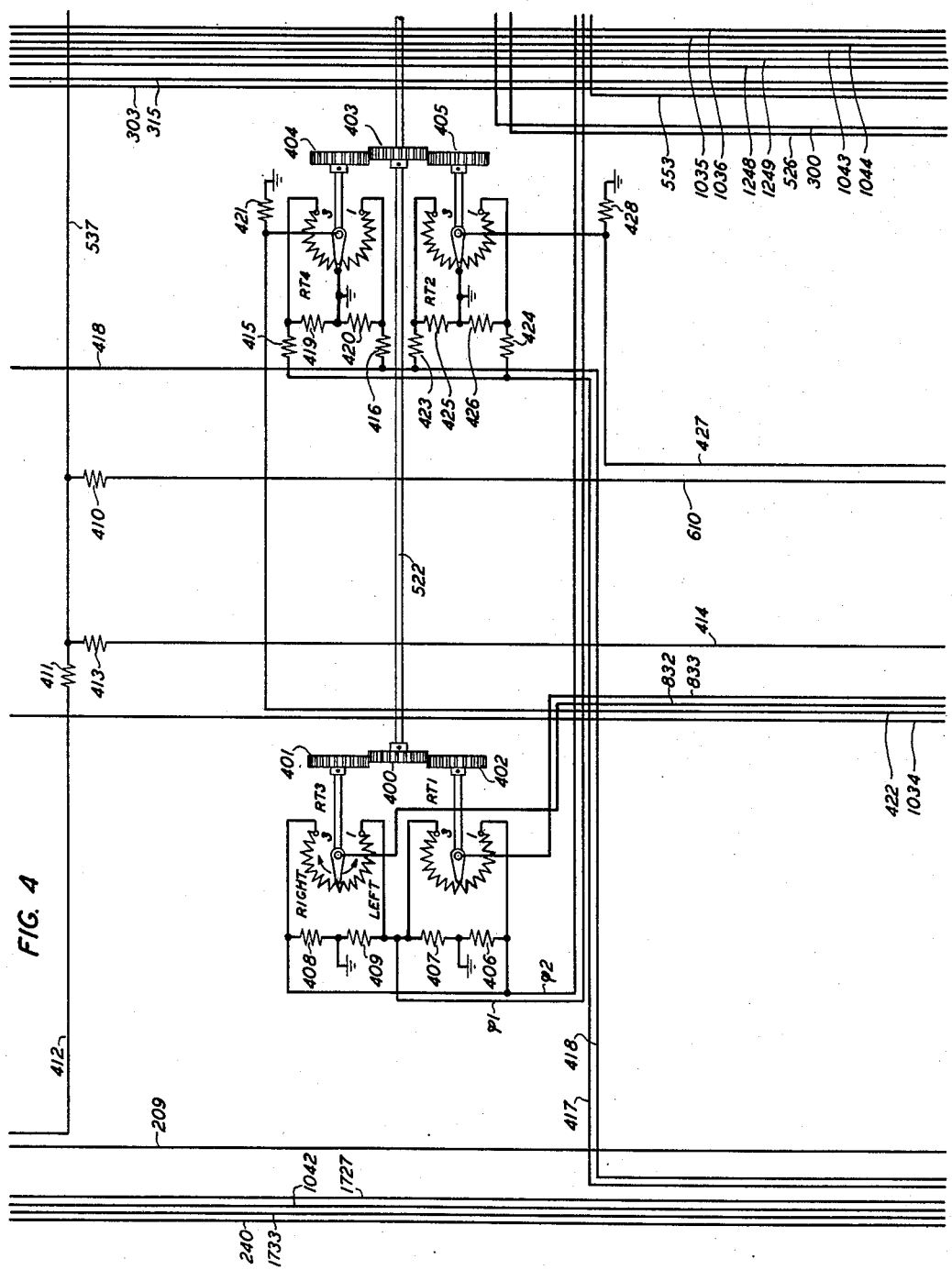
Fig. 4 shows a portion of the apparatus of the rate of turn motor unit.

The motor control circuits and associated motor units are in general mounted in pairs. For example, the rate of turn motor control circuit illustrated in the upper portion of Fig. 5 and all of the potentiometers and synchro-transmitters controlled thereby and disclosed in the upper portion of Fig. 5 and in Fig. 4, and the rate of climb motor control circuit and associated potentiometer and synchro-transmitter controlled thereby constitute a single assembly. Each motor control circuit comprises a direct current reversible motor which through a reduction gear box drives a main driving shaft which in turn may drive one or more synchro-transmitters for controlling instruments remotely mounted on instrument panels of the trainer and at the instructor's desk, may drive potentiometers or variable transformers of the so-called "variac" type for controlling other motor control circuits of the trainer, and drive limit switches to assure that the driving motor will be arrested before the sliders of the potentiometers or variacs are driven beyond the ends of the windings with which they are associated. The shaft may also drive cams for operating other switches. This equipment is mounted on a motor plate as schematically disclosed in the Patent No. 2,428,767, granted to Albert-Davis-Gumley and Holden on October 14, 1947. The relays, condensers, resistances, control rheostats, testing jacks and electronic devices associated with the equipment mounted on the motor plates, are located on an apparatus rack positioned above and secured to the motor plate. Several of these motor plates and mounting rack assemblies are mounted one above the other in apparatus cabinets forming a separate unit of the trainer equipment.

Figure 5:
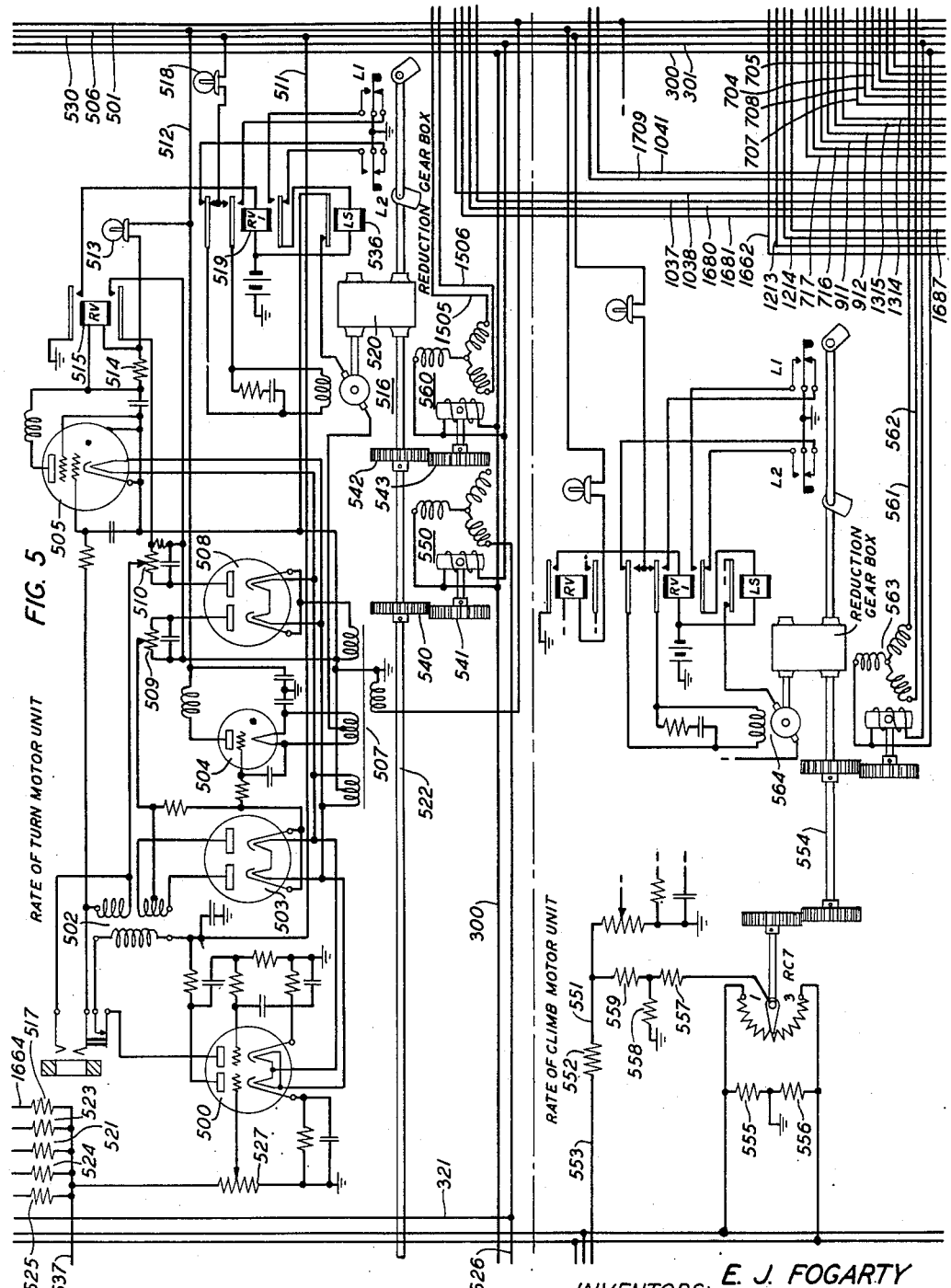
Fig. 5 shows above the dot-dash line the rate of turn motor control circuit and other apparatus of the rate of turn motor unit and below the dot-dash line a schematic representation of the rate of climb motor control circuit and apparatus of the associated motor unit.

Each of the motor control circuits, for example, the circuit disclosed in Fig. 5, is of the type disclosed and fully described in Patent No. 2,428,767, granted to Albert-Davis-Gumley-Holden on October 14, 1947. In general the circuit for controlling the motor 516 comprises a dual triode amplifier tube 500 which receives a signal potential incoming on signal control conductor 507, amplifies it, and applies it through the step-up transformer 502 to the plates of the dual diode rectifier tube 503. The tube 503 serves as a full wave rectifier to rectify the output signal from the tube 500 and to apply it as a positive potential to the grid of the gas-filled tube 504. The output potential of tube 500 is also applied through the upper secondary winding of transformer 502 to the control grid of the gas-filled tube 505. Direct current for furnishing grid bias to the control grids of tubes 504 and 505 is supplied from the right secondary winding of power transformer 507, through the dual diode rectifier tube 508 under the control of the grid bias control rheostats 509 and 510. Filament heating current for all of the tubes is supplied from the other secondary windings of the power transformer 507, the primary winding of which transformer is energized from the 115-volt bus bar 501. Plate potential is supplied to the plates of the amplifier tube 500, over conductor 511 from the +130-volt bus bar 530 and 60-cycle plate potential is applied from the 115-volt bus bar 506, over conductor 512 to the plate of tube 504 and through resistance lamp 513 and thence in parallel through resistance 514 and the winding of the RV relay 515 to the plate of tube 505.

The motor 516 is of the direct current reversible type whose stator winding is energized by current from the direct current bus bar 530, through the lamp resistance 518 under the control of the RV1 reversing relay 519, which relay is in turn under the control of the plate relay 515 associated with the gas-filled tube 505. The rotor winding of the motor is energized by positive impulses of current transmitted therethrough by the firing of the gas-filled tube 504. When the input signal potential applied to conductor 537 is in phase with the potential applied to the plate of tube 505, relays 515 and 519 will operate and, since the rectifier tube 503 functions to make the grid of tube 504 more positive in response to both half waves of the signal regardless of the phase of the signal with respect to the phase of the potential applied to the plate of tube 504, the tube 504 will cause the transmission of an impulse through the rotor circuit of motor 516 each time the tube 504 fires on each positive half wave of the plate potential and the motor will rotate in one direction. In response to an input signal which is out of phase with the potential applied to the plate of tube 505, tube 505 will not conduct and consequently relays 515 and 519 will not operate but since tube 504 will fire on each positive half wave of the potential applied to its plate, the motor 516 will be operated in response to the incoming signal in the reverse direction of rotation.

Potentiometers and variacs of a motor unit may enter into the control of several other motor control circuits of the trainer. For example, the motor 516 of the rate of turn motor unit rotates shaft 522 through the reduction gear box 520, which shaft through gears 400, 401 and 402 rotates the sliders of potentiometers RT1 and RT3, through gears 403, 404 and 405 rotates the sliders of potentiometers RT2 and RT4 and through gears 540, 541, 542 and 543 rotates the rotors of synchro-transmitters 550 and 560. Potentiometer RT1 enters into the control of the compass motor control circuit of Fig. 3 and potentiometer RT3 enters into the control of the bank motor control circuit of Fig. 9 and the angle of climb motor control circuit of Fig. 9. Potentiometer RT3 also enters into the control of the rate of turn motor control circuit of Fig. 5. Potentiometer RT2 enters into the control of the ball motor control circuit of Fig. 7 and potentiometer RT4 enters into the control of the rate of turn motor control circuit of Fig. 5. The synchro-transmitter 550 is effective to introduce a turning error into the telemetric circuit which controls the synchro-receivers 1500 and 1700 which drive the remote indicating compasses 1501 and 1701 on the pilot's and instructor's instrument panels. The synchro-transmitter 560 drives the synchro-receivers 1502 and 1702 which drive the rate of turn pointers of the turn and bank indicators 1503 and 1703 on the pilot's and instructor's instrument panels.

The motor control circuits shown schematically in other figures of the drawing, such as the rate of climb motor control circuit shown in the lower portion of Fig. 5, are similar to the rate of turn motor control circuit, but to avoid unnecessarily increasing the disclosure these circuits have been abbreviated to show only the input circuit to the first amplifying tube thereof, to show the RV, RV1 and LS relays which control the circuits of the motor and to show the motors, reduction gear boxes and limit switches. Such abbreviated motor control circuits are disclosed in Figs. 3, 5, 7, 9, 11, 13 and 14.

The motor 1450 of the landing gear motor unit of Fig. 14 is of the reversible alternating current shaded pole type having a main stator winding and shaded pole windings. A motor of this type is caused to rotate in one direction by energizing its stator winding and short-circuiting one of the shaded pole windings and to rotate in the opposite direction by energizing its stator winding and short-circuiting its other shaded pole winding. The landing gear control circuit is more fully disclosed in Patent 2,519,698 to F. M. Pearsall of August 22, 1950.

The instruments on the pilot's and instructor's instrument panels, illustrated in Figs. 15 and 17, are identical in appearance to the instruments which would be found on the corresponding instrument panels of an actual airplane, but are driven by synchro-receivers associated therewith as, for example, the remote indicating compass 1501 which is driven by the associated synchro-receiver 1500. Some of the instruments such as, for example, the gyro or artificial horizon have two driving synchro-receivers associated therewith, in the case of the gyro horizon instrument, one of the receivers being operable from the bank motor control unit to tip the artificial horizon bar and to operate a pointer to indicate the angle of bank simulated in the flight being conducted in the trainer, and the other receiver being operable from the pitch bar motor unit to raise or lower the bar to indicate whether a level, diving or climbing flight is being simulated. An instrument of this type is fully disclosed in Patent No. 2,381,872, granted August 14, 1945, to C. I. Baker.

Figure 1:
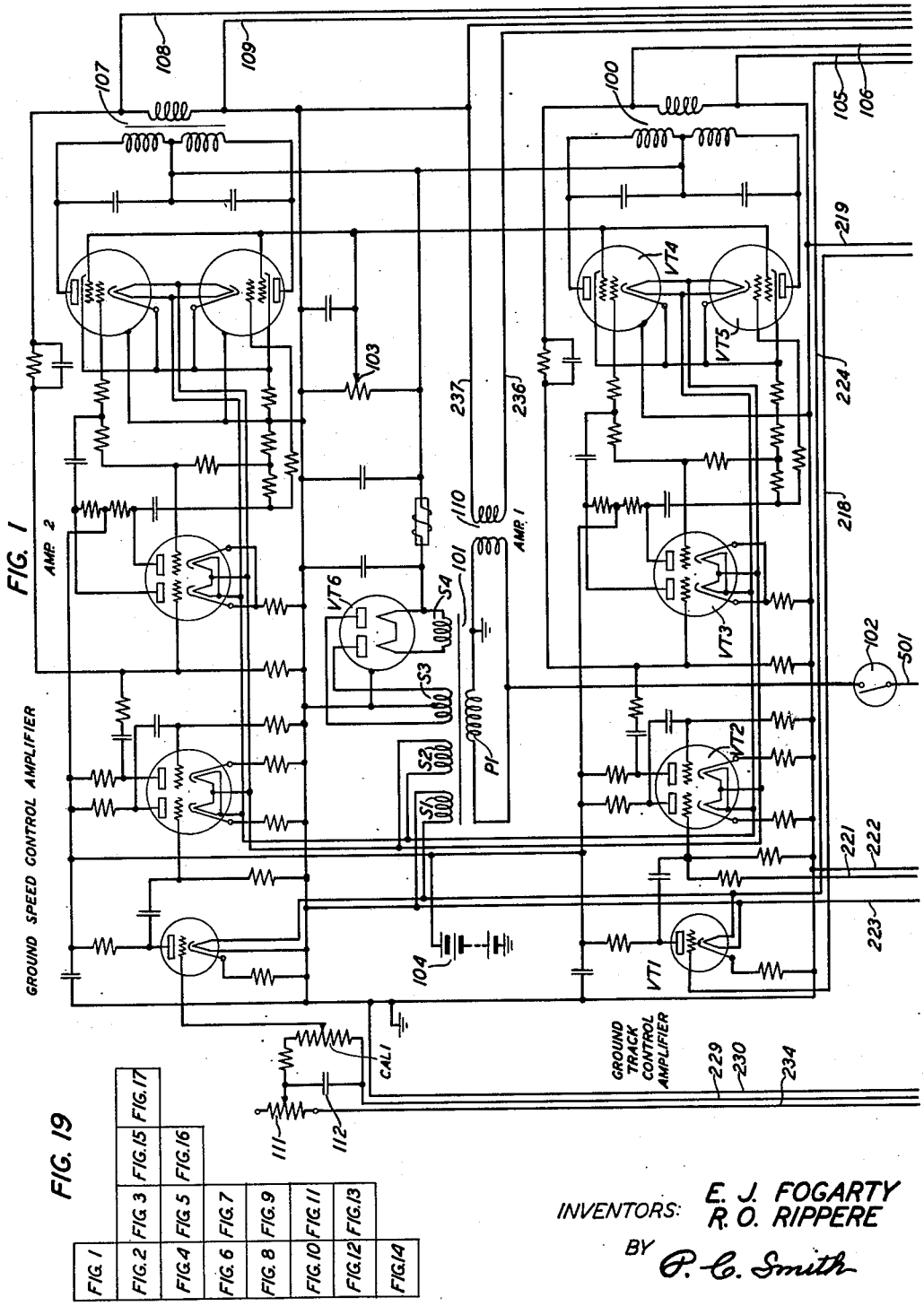
Fig. 1 shows the ground speed and ground track control amplifiers which control the ground speed and ground track motor units disclosed in Fig. 2.
Figure 2:
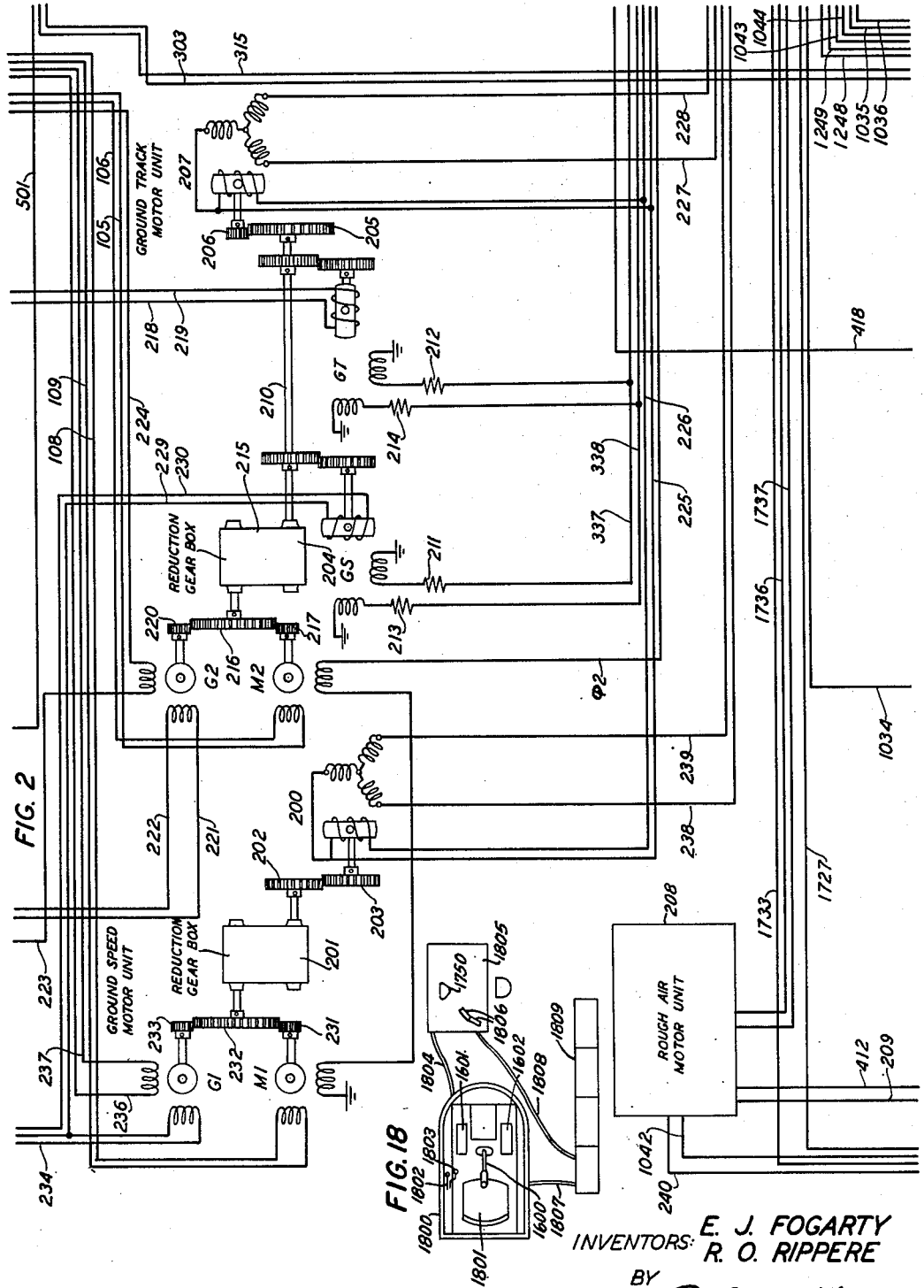
Fig. 2 shows schematically the ground speed and ground track motor units which control the speed and direction of movement of the flight recorder at the instructor's desk disclosed schematically in Fig. 17.

The flight recorder motor control circuits of Fig. 1 in conjunction with the motor units of Fig. 2 control the flight recorder on the instructor's desk, schematically disclosed in Fig. 17. The speed at which the flight recorder is advanced to record the actual ground speed of the simulated flight is under the control of the ground speed motor control circuit shown in the upper portion of Fig. 1 and the motor M1 disclosed in the left portion of Fig. 2. The motor M1 through the reduction gear box 201 and gears 202 and 203 drives the synchro-transmitter 200 which is electrically connected with the synchro-receivers 1705 and 1706 geared to the driving wheels of the flight recorder. The orientation of the flight recorder to record the direction of the simulated flight course is under the control of the ground track motor control circuit disclosed in the lower portion of Fig. 1 and the motor M2 disclosed in Fig. 2, which motor through the reduction gear box 204 and the gears 205 and 206 drives the synchro-transmitter 207 electrically connected with the synchro-receiver 1707 geared to the spindle of the steering wheel of the flight recorder. In general the flight recorder is controlled in the manner more fully disclosed in Patent 2,486,784 to W. H. T. Holden of November 1, 1949.

The control stick 1600, rudder pedals 1601 and 1602 and brake operating members 1604 and 1606 at the pilot's station are schematically illustrative of the similar controls of an actual airplane. The stick 1600 terminates at its lower end in two arms which embrace and are pivoted by the pivot 1607 to a cylinder 1608 mounted on the rotatable shaft 1609. The shaft 1609 has secured to its forward end a rocker arm 1610 to the lower end of which the ends of a cable loop 1611 are attached. The cable loop extends over guide pulleys 1612 to 1615, inclusive, and is clamped to the lower end of a rocker arm 1616. The rocker arm is secured to a jack shaft 1617 to which is also secured a segmental gear 1618. The gear 1618 through the gears 1619 and 1620 carried by jack shaft 1663 drives the gear 1621 secured to the slider shaft of the aileron potentiometer AL. With the stick 1600 in its neutral position as shown, the slider of the potentiometer will be positioned at the midtap of its winding. A movement of the stick to the left or right will through the linkage just described cause a rotation of the slider of the potentiometer to the left or to the right.

The stick 1600 is also connected by a link 1622 with the rocker arm 1623 secured to shaft 1624. Shaft 1624 also has secured thereto a segmental gear 1625 which through the idler gear 1626 drives the gear 1627 secured to the slider shaft of the elevator potentiometer E. With the stick 1600 in its normal position with respect to its forward and backward movements, the slider of potentiometer E will be positioned at a point about one-third away from the No. 1 or down terminal of its winding. A forward or backward movement of the stick will through the linkage just described, cause a rotation of the slider of the potentiometer toward one or the other terminal of its winding.

The forwardly extending portion 1628 of rudder pedal 1601 is connected by a cable 1629 extending upwardly over pulley 1630 and downwardly over pulley 1631 with the forwardly extending portion 1632 of rudder pedal 1602. The arm 1628 of pedal 1601 is also connected by cable 1633 which extends downwardly, thence over pulleys 1644, 1645 and 1646, over a pulley (not shown but mounted to rotate on the same stub shaft 1647 as pulley 1645), thence over pulley 1648 and upwardly to the arm 1632 of pedal 1602. This arrangement of cables and pulleys is such that when one of the rudder pedals is depressed, the other pedal rises. The movement of either pedal is communicated to a rocker arm 1649, the end of which is clamped to the cable 1633. The rocker arm is secured to a jack shaft 1650 to which a segmental gear 1651 is also secured. Such gear drives gears 1654 and 1655 through the intermediate gears 1652 and 1653. The gears 1654 and 1655 are secured to the slider shafts of the rudder potentiometers R1 and R2. With the rudder pedals in their normal positions, the linkage just described positions the sliders of the potentiometers at the mid-points of their windings. If, however, the right pedal 1602 is depressed, the sliders of the potentiometers will be moved toward the right terminals of their windings or if the left pedal 1601 is depressed, the sliders of the potentiometers will be moved toward the left terminals of their windings.

In the airplane which the trainer simulates, the foot brakes are operated by auxiliary pedals mounted on the upper portions of the rudder pedals and in the trainer this auxiliary pedal mechanism is used to control potentiometers. However, to simplify the disclosure the auxiliary pedals are omitted and only the racks and pinions operated thereby have been disclosed. The auxiliary pedal on the left rudder pedal, through the rack 1604 and pinion 1603, rotates the sliders of the left brake potentiometers LB1 and LB2 and the auxiliary pedal on the right rudder pedal, through the rack 1606 and pinion 1605, rotates the sliders of the right brake potentiometers RB1 and RB2.

The elevator trim wheel 1656 through the gears 1657, 1658 and 1659 rotates the sliders of the elevator trim potentiometers ET1 and ET2. In a similar manner the rudder trim wheel 1660 adjusts the sliders of the rudder trim potentiometers RTR1 and RTR2 and the aileron trim wheel 1661 adjusts the slider of the aileron trim potentiometer AT.

The rough air unit represented by the box 208 in Fig. 2 is of the type fully disclosed in the Patent No. 2,460,743, granted February 1, 1949, to C. E. Germanton.

The apparatus employed in embodying the invention having now been briefly described, the procedure followed in making a typical flight will now be described. Preparatory to making a flight the pilot adjusts the elevator trim wheel 1656 until the dial associated therewith shows a ½ degree nose-up position, adjusts the rudder trim wheel 1660 until the dial associated therewith shows a 2.25-degree nose right position, and adjusts the aileron trim wheel 1661 until the dial associated therewith shows a 0-degree position. He then checks to see that the wing flaps key (not shown) is in the "up" position. With the key in the "up" position the sliders of all of the potentiometers WF1 to WF5, inclusive, of the wing flaps motor unit, Fig. 14, will be at the No. 1 terminals of their windings. With the airplane on the ground the landing gear will be extended and locked in the extended position and therefore the sliders of the potentiometers of the landing gear motor unit, Fig. 14, will be at the No. 3 terminals of their windings.

Figure 12:
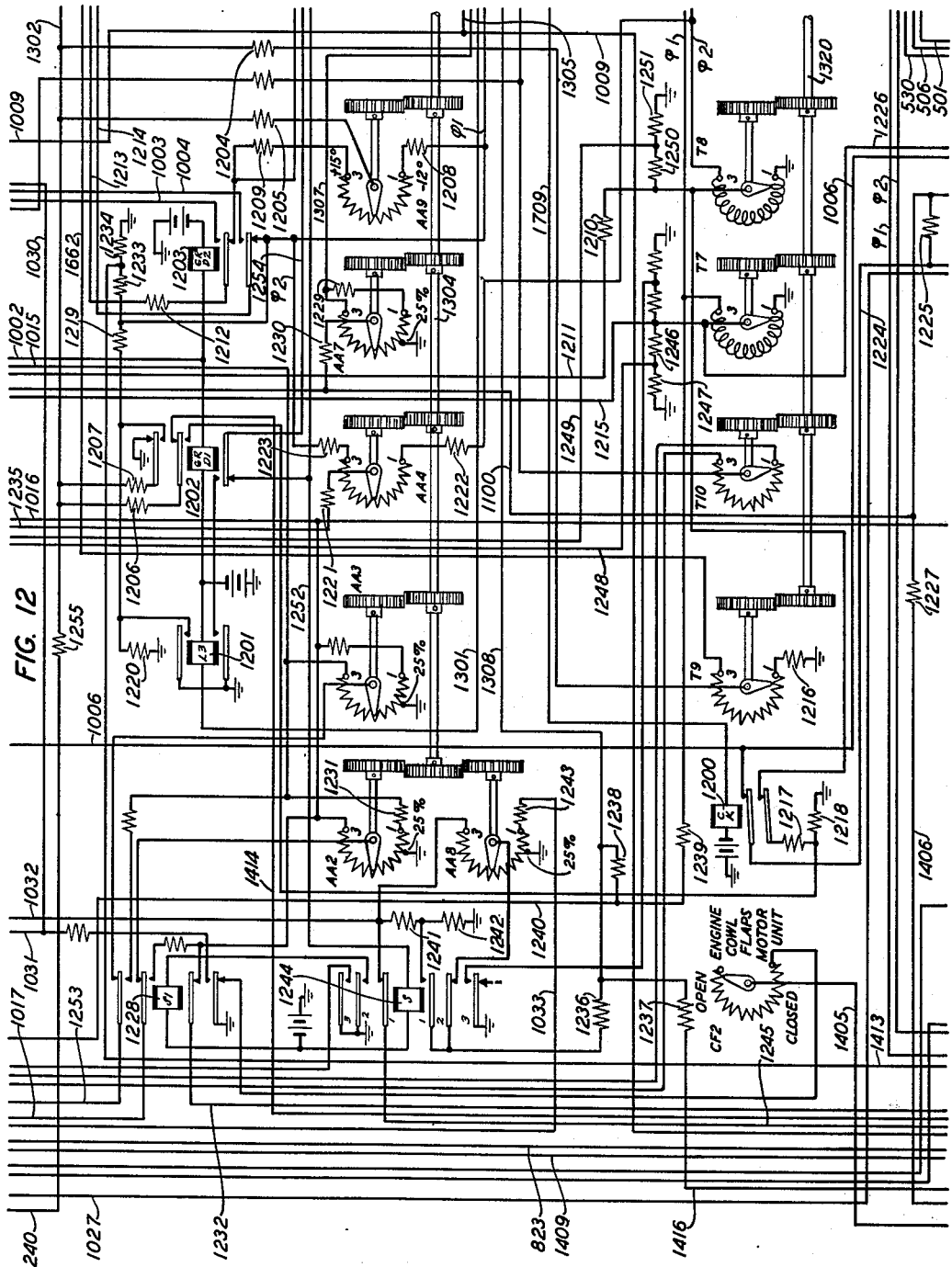
Fig. 12 shows in the upper portion thereof apparatus of the angle of attack motor unit and in the lower portion thereof apparatus of the thrust motor unit.

The landing wheels of an airplane would be chocked by the ground crew before the engine is started and the chocking of the wheels in the trainer is simulated by the operation of the CK relay 1200, Fig. 12, which is operated under the control of the wheel chocks key 1708 operated by the instructor to its closed or "in" position as shown in Fig. 17. The circuit of relay 1200 extends from ground over the contacts of key 1708 and over conductor 1709 through the winding of relay 1200 to battery. The brakes are at this time released and the sliders of the brake potentiometers RB1, RB2, LB1 and LB2, Fig. 16, will be at the No. 1 terminals of their windings. The stick 1600 is at this time in its normal position.

The starting of the engine may now be simulated in the manner fully described in the Germanton Patent 2,564,429. As the engine throttle is opened the manifold pressure as indicated by the manifold pressure indicators increases and the tachometers show an increase of engine speed, until when the throttle is fully opened, a manifold pressure of 54 inches of mercury and an engine speed of 2700 revolutions per minute will be indicated. As the R. P. M. increases the thrust motor unit of Fig. 13 will be controlled in the manner fully set forth in the Germanton Patent 2,564,429 to rotate shaft 1320 and thus to move the sliders of the potentiometers and variacs controlled thereby, such as the potentiometers T9 and T10 and the variacs T7 and T8, away from the No. 1 terminals of their windings.

Before the engine of an airplane is started the tail wheel of the landing gear is on the ground. This is simulated by the operation of the L3 relay 1201 under the control of the L3 switch 1300 of the angle of attack motor unit which switch closes when the angle of attack is about 8 degrees or the normal position of the shaft 1304 of the angle of attack motor unit. The circuit of relay 1201 may be traced from ground over the contacts of switch 1300 and over conductor 1301 through the winding of relay 1201 to battery. The grounded condition of an airplane is simulated in the trainer by the operated condition of the GRD relay 1000 which is energized over a circuit from battery through its winding, over conductor 1001, over the alternate contacts of the L3 switch 700 and the alternate contacts of the L1 switch 701 of the altitude motor unit of Fig. 7, which switches are both operated to their alternate positions when the altitude of a simulated flight is zero. The contacts of switch 701 close to their alternate position as the altitude decreases between 600 and 100 feet and the contacts of the micro-switch 700 close to their alternate position when the altitude becomes zero. Relay 1000 upon operating establishes a circuit from ground over its upper No. 4 contacts and over conductor 1002 and thence in parallel through the winding of the GRD1 relay 1202 and the GRD2 relay 1203 which operate to represent a ground condition of the flight in the angle of attack motor control circuit of Fig. 12. The GRD3 relay 805 is also energized in a circuit from ground over the upper contacts of the GRD relay 1000 and conductor 806 to represent a ground condition of the flight in the angle of climb motor control circuit of Fig. 8.

When a grounded condition of flight is simulated, the equation of moments in the angle of attack motor control circuit may be expressed as follows: Wing moment+tail moment+moment due to thrust when the wheels are chocked+ moment due to weight when the tail wheel is off the ground=pitching moment.

These moments may be represented by the equation $K1V_i^2 a + (K2V_i^2 + K3T) \delta e + K4T$ (chocks in) $+ K5W =$ pitching moment where $\delta e$ is the position of the elevator; $a$=angle of attack; $V_i$=indicated air-speed; $T$=thrust and $W$=weight. Since the indicated air-speed voltages are very small under ground speed conditions, $V_i$ is substituted for $V_i^2$ in the trainer. An additional approximation is made for the wing moment, namely, the substitution of a constant for $K_1V_1$. The equation thus used in the trainer may be expressed:

$$K6\alpha + (K2V_i + K3T)\, \delta e + K4T + K5W = \text{pitching moment}$$

The potential applied from the slider of the angle of attack balancing potentiometer AA9, through resistor 1205 to control conductor 1302 of the angle of attack motor control circuit of Fig. 13 represents the wing moment. This potential is derived from the winding of potentiometer AA9, the No. 1 terminal of which is connected through resistor 1208 to the 40-volt $\phi 1$ bus bar and the No. 2 terminal of which is connected through resistor 1209 to the 40-volt bus bar $\phi 2$. These bus bars are supplied with potential from the secondary winding of power transformer 302, the primary winding of which is supplied from a 115-volt alternating current source. With the slider of potentiometer AA9 at a point on the winding representative of an angle of attack of about 8 degrees or the condition when the position of the tail wheel on the ground is simulated, the derived potential will be predominantly of phase $\phi 2$.

The potential applied from the slider of the thrust potentiometer T9 of Fig. 12 through resistor 1204 to control conductor 1302 of the angle of attack motor control circuit represents the tail moment. To derive this potential the winding of the thrust variac T8 is energized from the $\phi 2$ bus bar and the winding of the thrust variac T7 is energized from the $\phi 1$ bus bar so that with the GRD relay 1000 and GRD2 relay 1203 both energized to represent a grounded flight condition, potential of phase $\phi 2$ is applied from the slider of variac T8 through resistor 1210, over conductor 1211, over the lower No. 2 contacts of the GRD relay 1000, over conductor 1003, over the inner front contact of the GRD2 relay 1203, through resistor 1212, over conductor 1213, through the elevator trim potentiometer ET1, Fig. 16, to the No. 1 terminal of the elevator potentiometer E and potential of phase $\phi 1$ is applied from the slider of variac T7, over conductor 1215, through resistor 1005, over the lower No. 3 contact of the GRD relay 1000, over conductor 1004, over the lower front contact of the GRD2 relay 1203, conductor 1214 and through the elevator trim potentiometer ET2 of Fig. 16, to the No. 3 terminal of the elevator potentiometer E. The slider of potentiometer E is connected over conductor 1002 through the winding of the thrust potentiometer T9 and resistor 1216 to ground. Thus any preponderance of phase $\phi 1$ or phase $\phi 2$ potential appearing at the slider of potentiometer E causes the winding of potentiometer T9 to be energized by potential of that phase from the slider of which potential is derived and applied through resistor 1204 to control conductor 1303 of the angle of attack motor control circuit. Until the starting of the engine is simulated and thrust is developed, the sliders of thrust variacs T7 and T8 will be at the No. 1 or ground terminals of their windings and consequently no tail moment potential will be derived and applied from the slider of the thrust potentiometer T9 through resistor 1204 to control conductor 1302.

When, however, engine operation has been simulated and the sliders of variacs T7 and T8 have moved towards the No. 3 terminals of their windings, representative of the development of thrust, potentials of phase $\phi 1$ and $\phi 2$ will be applied to the terminals of the elevator potentiometer E over the circuits previously traced. The potential of phase $\phi 2$ as applied to the winding of the elevator trim potentiometer ET1 will be slightly less than the potential of phase $\phi 1$ applied to the winding of the elevator trim potentiometer ET1 due to the inclusion of the 270-ohm resistor 1212, and with the elevator trim wheel set as previously stated to show a ½-degree nose-up condition, the sliders of the trim potentiometers will be so set as to slightly augment this difference in potential so that with the stick 1600 in its neutral position and the slider of the elevator potentiometer E at a point one-third from the No. 1 terminal winding, the potential derived at such slider and as modified by the thrust potentiometer T9 and applied through resistor 1204 to control conductor 1302, will be of phase $\phi 1$ and will increase as the slider of potentiometer T9 moves towards the No. 3 terminal of its winding or as the engine thrust increases.

The potential applied through resistor 1206 to the angle of attack control conductor 1302 is representative of the moment caused by the thrust of the engine with the wheel chocks in. This potential of phase $\phi 2$ is derived from a potential divider connected from the slider of the thrust variac T8, over the lower contacts of the CK relay 1200, operated to represent the wheel chocks in, and through resistors 1217 and 1218 to ground, and is applied from the junction point between such resistors, over the inner upper front contact of the GRD1 relay 1202, through resistor 1206 to conductor 1302.

The potential applied through resistor 1207 to control conductor 1302 is representative of the moment due to weight. While a ground condition of flight is being simulated and the GRD1 relay 1202 is operated, and the L3 relay 1201 is operated representative of the condition when the tail wheel is on the ground, ground potential is connected over the upper contacts of relay 1201, over the upper front contact of relay 1202 and through resistor 1207 to conductor 1302, but as soon as the angle of attack becomes reduced below +8 degrees and relay 1201 releases, potential of phase $\phi 1$ is applied from the $\phi 1$ bus bar through the potential divider including resistors 1219 and 1220, from which a phase $\phi 1$ potential is applied over the upper front contact of relay 1202 and through resistor 1207 to conductor 1302 to introduce a weight moment.

Under the assumption that preparatory to the simulation of a take-off the wheel chocks are in as represented by the operation of the CK relay 1200, the GRD, GRD1, GRD2 and GRD3 relays 1000, 1202, 1203 and 805 are operated representative of a ground flight condition, and the L3 relay 1201 is operated to simulate the tail wheel on the ground, the opening of the throttle and the consequent increase of engine thrust causes an increase of the phase $\phi 2$ potential applied from the slider of variac T8 through resistor 1206 to control conductor 1302 of the angle of attack motor control circuit and at the same time causes an increase in the phase $\phi 1$ potential applied from the slider of thrust potentiometer T9 through resistor 1204 to control conductor 1302, but the phase $\phi 2$ potential will predominate and will cause the motor 1303 of such motor control circuit to rotate the shaft 1304 and the sliders of potentiometers driven thereby toward the No. 1 terminals of their windings.

Thereby the slider of the balancing potentiometer AA9 will be adjusted to decrease the phase φ2 potential connected therefrom through resistor 1205 to control conductor 1302 to oppose the summation of the potentials applied to conductor 1302 through resistors 1204 and 1206 and to slow down the motor 1303.

As the shaft 1304 rotates, the L3 cam 1390 opens the previously traced circuit of the L3 relay 1291 which releases to simulate the condition of a chocked airplane the tail wheel of which has lifted from the ground due to the slip stream from the propeller. With relay 1291 released, potential of phase φ1 is applied through resistor 1207 to control conductor 1302 representative of the application of the wing moment due to the tail wheel leaving the ground which tends to tip the airplane back on its tail wheel. This potential augments the potential derived at the slider of the balancing potentiometer AA9 to reduce the speed of the angle of attack motor 1303 and to thereby slow down the reduction of the angle of attack until the balancing potentiometer AA9 brings the motor control circuit into balance.

Figure 3:
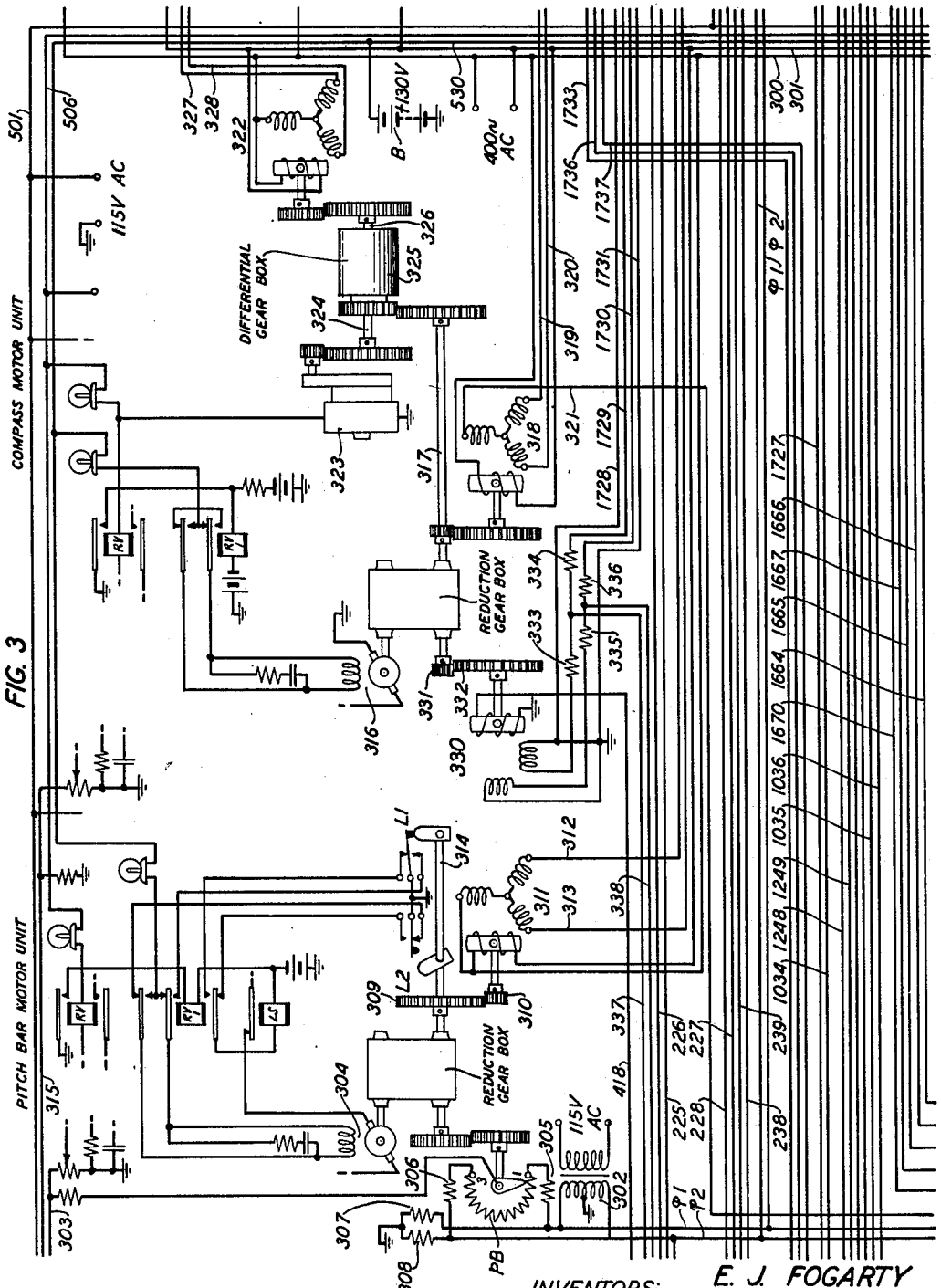
Fig. 3 shows in the left portion thereof a schematic representation of the pitch bar motor control circuit and motor unit and in the right portion thereof a schematic representation of the compass motor control circuit and motor unit.

The adjustment of the angle of attack potentiometer AA4 results in the application of a signal potential to control conductor 303 of the pitch bar motor control circuit of Fig. 3. At this time the slider of the balancing potentiometer PB of this circuit will be slightly above the middle of its winding and the horizon bars of the gyro horizon instruments 1510 and 1710 on the pilot's and instructor's instrument panels will indicate a slight nose-up condition. The signal potential is applied from the slider of potentiometer AA4 through resistor 1221 over conductor 1235 and through the bank potentiometer BK1 and resistor 835 to ground and a derived potential is applied to control conductor 303 through resistor 834 from the junction point between resistor 1221 and the slider of potentiometer BK1. To derive this potential the winding of the potentiometer AA4 is bridged between the φ1 and φ2 bus bars through resistors 1222 and 1223. Since there is no air-speed or no rate of climb and no bank angle at this time, the angle of attack potentiometer AA4 is the only factor which affects the positions of the horizon bars. As the slider of potentiometer AA4 moves toward the No. 1 terminal of its winding in response to the change in the angle of attack incident to the simulation of the lifting of the airplane tail wheel from the ground, the preponderance of phase φ1 potential applied from such slider is reduced whereupon the potential of phase φ2 which is preponderant at the time at the slider of balancing potentiometer PB, becomes effective to operate the motor 304 of the pitch bar motor unit in a direction representative of the movement of the horizon bars to nose level positions. The winding of the balancing potentiometer is bridged between the φ1 and φ2 bus bars through resistors 305 and 306 in parallel with resistors 307 and 308, the mid-point between which is grounded. As the slider of potentiometer PB moves to the mid-point of its winding the control network becomes balanced and motor 304 stops.

The movement of the shaft 314 driven by the motor 304, through the gears 309 and 310, rotates the rotor of synchro-transmitter 311. The rotor winding thereof is energized by 400-cycle current from the bus bars 300 and 301 and the stator windings are connected over conductors 312 and 313 and the bus bar 300 with the corresponding stator windings of the synchro-receivers 1512 and 1712. With the rotor windings of these receivers also energized from the bus bars 300 and 301, these receivers follow the operation of the synchro-transmitter 311 to move the horizon bars of the gyro horizon instruments down to nose level positions.

Normally with no flight condition simulated the air-speed indicators 1513 and 1713 on the pilot's and instructor's instrument panels will indicate zero air-speed since potential of phase φ2 will be applied to control conductor 1100 of the indicated air-speed motor control circuit to thereby cause the motor 1101 to turn shaft 1102 until the sliders of the potentiometers and variacs driven thereby are at the No. 1 terminals of their windings and the L1 limit switch 1193 is operated to its alternate position. This position of shaft 1102 is transmitted by gears 1104 and 1105 to the rotor of synchro-transmitter 1106, the stator windings of which are connected by bus bar 300 and conductors 1107 and 1108 with the corresponding stator windings of the synchro-receivers 1514 and 1714 associated with the air-speed indicators 1513 and 1713. Therefore the air-speed indicators are positioned corresponding to the position of shaft 1102 or a zero position.

With the flight assumed to be grounded and the wheel chocks in and consequently the GRD relay 1000 and the CK relay 1200 both operated, potential of phase φ2 is applied to conductor 1100 from the φ2 bus bar over the upper No. 2 contacts of the GRD relay 1000, over conductor 1006, over the inner contacts of the CK relay 1200 and through resistor 1225 to control conductor 1100 of the indicated air-speed motor unit. This is the only effective signal potential at this time and is sufficient to hold the indicated air-speed motor and shaft 1102 in its zero air-speed position.

After the engine starting has been simulated and engine thrust is developed as represented by the movement of the slider of the thrust variac T7 away from the No. 1 terminal of its winding, potential of phase φ1 will be derived at the slider of such potentiometer and applied over conductor 1226, over the upper No. 2 contacts of the LGD relay 1400, now operated since the landing gear is assumed to be down and locked, and through the potential divider comprising resistors 1401 and 1402 to ground. From this potential divider the phase φ1 potential is supplied through resistor 1403 to control conductor 1100 of the indicated air-speed motor control circuit. While this potential of phase φ1 will increase as the thrust increases yet, due to the heavy φ2 potential applied so long as the "chocks in" relay 1200 remains operated, the motor 1101 is not controlled to move the shaft 1102 from its zero position and consequently no air-speed is indicated.

After the simulated warming up of the engine has been completed the pilot closes the throttle until an engine speed of 1,000 revolutions per minute is indicated. This will result in a reduction of thrust which will have no effect on the indicated air-speed circuit but will result in a reduction of the phase φ2 potential derived at the slider of thrust variac T8 and applied over the previously traced circuit through resistor 1206 to control conductor 1302 of the angle of attack motor control circuit, and in the reduction of the phase φ1 potential applied from the slider of the thrust potentiometer T9 through resistor 1204 to control conductor 1302 whereupon the balancing potentiometer AA9 will control the motor 1303 to rotate shaft 1304 in a direction to move the sliders of the potentiometers driven thereby toward the No. 3 terminals of their windings representative of an increase in the angle of attack until a condition of balance is secured. At this time the L3 switch 1300 operated from the shaft 1304 will cause the reoperation of the L3 relay 1201 representative of the nosing-up of the airplane until the tail wheel again rests on the ground. The release of relay 1201 discontinues the application of phase $\varphi 1$ potential through resistor 1207 to control conductor 1302 to discontinue the weight moment.

As a result of the movement of the slider of angle of attack potentiometer AA4 the signal potential applied from the slider thereof to control conductor 303 of the pitch bar motor control circuit is changed back to its original value and as a consequence the motor 304 under the control of balancing potentiometer PB turns the shaft 314 back until the horizon bars of the gyro horizon instruments 1510 and 1710 again show a slight nose-up or ground setting.

*Take-off*

The instructor being satisfied that the pilot has readied the trainer for the simulation of a take-off now operates the Wheel Chocks Key 1708 to its "out" position thereby releasing the CK relay 1200. The pilot now advances the throttle gradually to a full throttle position whereupon the tachometers increase their readings gradually to 2700 revolutions per minute. As a result of the increase in R. P. M. the thrust motor control circuit responds to represent an increase in engine thrust. With the CK relay 1200 released, the phase $\varphi 2$ potential applied thereby through resistor 1225 to control conductor 1100 of the indicated air speed motor control circuit and which positions the shaft 1102 in a position representative of zero air speed, is removed. A circuit is now effective for applying a potential of phase $\varphi 1$ to control conductor 1100. This potential is derived from the slider of the thrust variac T7 and the potential divider comprising resistors 1401 and 1402 as previously described and is applied through resistor 1403 to conductor 1100. It varies directly as the engine thrust.

The indicated air speed motor circuit is controlled by signal potentials, of which the thrust potential is one, representing the forces along the line of flight. During flight potentials representing thrust, drag and the components of weight along the line of flight when climbing or diving, are applied to control conductor 1100. The sum of these potentials represents accelerating force. Since the motor 1101 runs at a speed proportional to the sum of these potentials the rate of movement of the air-speed indicators 1513 and 1713 is proportional to the accelerating force. The drag force is a function of air-speed and yaw so that increasing either increases the drag potential thus reducing the forward acceleration, finally stabilizing when the equation is satisfied.

The force equation as presented by the indicated air-speed circuit is "thrust—drag—weight $\times$ sine (angle of climb) =accelerating force." The circuit connected to resistor 1403 as previously described represents the thrust. The drag force consists of the normal straight flight drag plus a component introduced by the effect of yaw. The straight flight drag is equal to K (indicated air-speed)$^2$ $C_D$, where K represents one-half the product of sea level air density and the wing area of the airplane which is being simulated and $C_D$ is the coefficient of drag which is the sum of the parasitic drag coefficient due to deflection of wing flaps, landing gear and engine cowl flaps and induced drag coefficient due to angle of attack of the wings.

A potential representative of the wing flaps, cowl flaps and landing gear drag, is applied to control conductor 1100 through resistor 1227. This potential is effective only when the AS relay 1007 is operated over conductor 1008 and to ground over contacts of the L1 limit switch 1103 when the shaft 1102 has been rotated to a position indicative of an airplane in motion. With relay 1007 operated potential of phase $\varphi 2$ is applied from the $\varphi 2$ bus bar, over the lower No. 1 front contact of relay 1007 and through the winding of the indicated air-speed variac IA7 to ground. A potential derived from the slider of this variac is applied to the winding of variac IA8 from the slider of which a phase $\varphi 2$ potential is derived which varies as the square of the indicated air-speed. From the slider of variac IA8 the derived potential is applied over conductor 1009, through the landing gear potentiometer LG10, through the winding of the wing flaps potentiometer WF1, through resistor 1404, through the landing gear potentiometer LG11, over conductor 1405, through the engine cowl flaps potentiometer CF2 to ground at the lower back contact of the S1 or stall relay 1228. From the slider of potentiometer WF1 the derived potential is applied over conductor 1406 and through resistor 1227 to control conductor 1100. This drag potential becomes greater if the stall relay 1228 operates as will later be described.

The drag effect due to angle of attack varies as the square of the indicated air-speed and therefore this potential is derived at the slider of the air-speed variac IA8 and applied over conductors 1009 and 1305 through the angle of attack potentiometer AA1, the winding of which is bridged by resistor 1306 and tapped to ground at a point 25 per cent from its No. 1 terminal, thence over conductor 1307, through the angle of attack potentiometer AA7, the winding of which is similarly bridged by resistor 1229 and the 25 per cent winding tap of which is connected to ground, thence through resistor 1230 to control conductor 1100.

Figure 6:
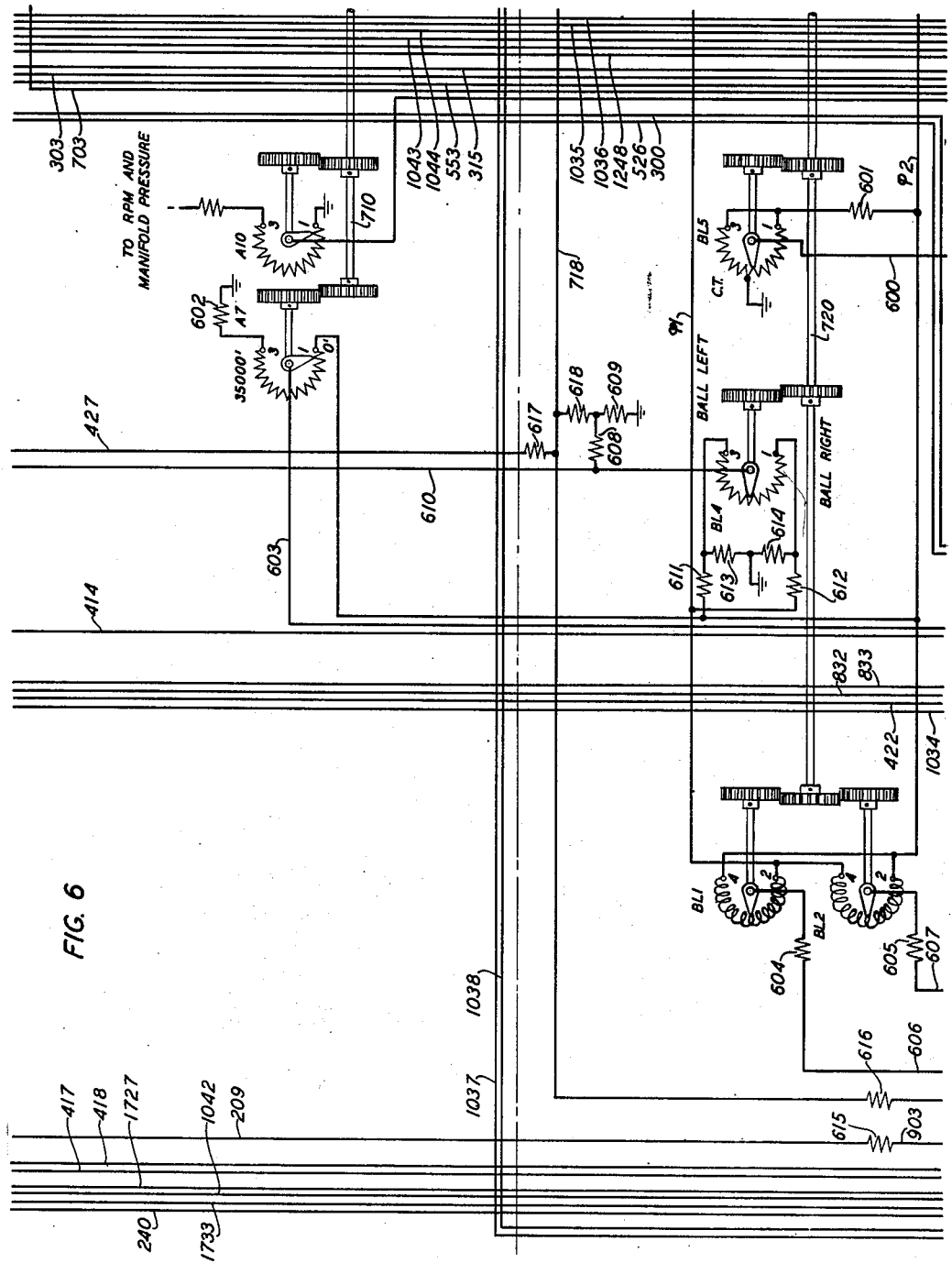
Fig. 6 shows above the dot-dash line apparatus of the altimeter motor unit and below the dot-dash line apparatus of the ball motor unit.

The drag effect due to yaw is simulated by the potential derived at the slider of the ball potentiometer BL5 of Fig. 6 and applied over conductor 606 through resistor 801 to control conductor 1100. For this purpose the winding of the potentiometer BL5 has its center tap connected to ground and its outer terminals connected together through resistor 601 to the $\varphi 2$ bus bar. If there is no yaw and the ball motor unit has therefore positioned the slider of the potentiometer BL5 at the center tap of its winding, this drag potential is ineffective.

A further drag effect due to the propeller at low power is introduced as a potential of phase $\varphi 2$ from the slider of throttle rheostat TR5, through resistor 1012 to control conductor 1100 of the indicated air-speed motor control circuit. This potential is derived from the leading half of the throttle rheostat which is connected into a circuit from ground at its mid-tap through such half of its winding and through resistor 1011 to the $\varphi 2$ bus bar. This drag potential therefore decreases as the throttle opens to a half open position and then is ineffective. Since the propeller power varies with the throttle opening this drag potential decreases as the propeller power increases.

The weight component potential is of phase φ1 and is derived at the slider of the angle of climb potentiometer AC10 whose winding is bridged between the φ1 and φ2 bus bars through resistors 802 and 803 and is applied from such slider through resistor 804 to control conductor 1100. So long as the simulated flight is on the ground and the GRD3 relay 805 is energized, ground is connected between the slider of potentiometer AC10 and resistor 804 and this weight potential is rendered ineffective. With relay 805 operated ground is connected over the lower front contact thereof, over conductor 807 and through the 5000-ohm resistance 1010 to control conductor 1100 to provide a low resistance shunt of the input of the indicated air-speed motor control circuit to reduce the effect of the accelerating force until take-off has been simulated. After relay 805 has released following take-off the weight component potential will vary positively or negatively dependent upon the movement of the slider of potentiometer AC10 toward its No. 1 terminal for a climbing flight or toward its No. 3 terminal for a diving flight.

During the simulation of the movement of the airplane on the ground just prior to take-off, the drag potentials opposing the thrust potential, applied through resistor 1403 as previously described, are those imposed by the wings as represented by the position of the sliders of the angle of attack potentiometers AA1 and AA7 and applied to control conductor 1100 through resistor 1230, and by the landing gear, engine cowl flaps and wing flaps positions as represented by the positions of the sliders of the landing gear potentiometers LG10 and LG11, the position of the slider of the cowl flaps potentiometer CF2 and the position of the slider of the wing flaps potentiometer WF1 and applied to control conductor 1100 through resistor 1227. The propeller drag potential applied through resistor 1012 is not effective at this time since the propeller would be developing maximum power, the wheel chocks drag potential applied through resistor 1225 would not be effective since the CK relay 1200 would be released at this time and the drag potential due to yaw applied under the control of the ball potentiometer BL5 through resistor 801 would also be ineffective. Furthermore, until the simulated flight leaves the ground the weight potential which may act either as a drag or a thrust and is applied through resistor 804 is not effective since the GRD3 relay 805 is assumed to be operated.

Now as the throttle opening increases to full open and the engine thrust increases the thrust potential of phase φ1 applied through resistor 1403 to control conductor 1100 under the control of thrust potentiometer T7 increases and as a consequence the motor 1101 of the indicated air-speed motor unit rotates the shaft 1102 at an increasing speed. The rotation of shaft 1102 moves the sliders of variacs IA7 and IA8 away from the No. 2 terminals of their windings thereby increasing the drag potential of phase φ2 applied over the circuit previously traced to the landing gear potentiometers LG10 and LG11, through the cowl flaps potentiometer CF2 and through the winding of the wing flaps potentiometer WF1. At this time the landing gear is down and locked as represented by the position of the sliders of landing gear potentiometers LG10 and LG11 at the No. 3 terminals of their windings, the engine cowl flaps are open as represented by the position of the slider of cowl flaps potentiometer CF2 at the No. 3 terminal of its winding, and the wing flaps are up as represented by the position of the slider of the wing flaps potentiometer WF1 at the No. 1 terminal of its winding. The result is that the drag potential derived at the slider of potentiometer WF1 is the sum of the maximum drag potential incident to the landing gear being down and the cowl flaps open, less the drag potential which would be imposed if the wing flaps were down. This composite drag potential applied through resistor 1227 to control conductor 1100 increases as the air-speed increases and opposes the φ1 thrust potential. Consequently, the shaft 1102 turns at the speed of the simulated movement of the airplane over the ground and this speed is shown as a gradually increasing speed indication by the air-speed indicators 1513 and 1713.

As soon as there is indicated air-speed the AS relay 1007 operates over the previously traced circuit and establishes a circuit from the φ1 bus bar, over the upper No. 2 contacts of relay 1007 and through the winding of the indicated air-speed variac IA1 to ground and a circuit from the φ2 bus bar, over the lower No. 1 contacts of relay 1007 and through the winding of the indicated air-speed variac IA7 to ground. These potentials augment the similarly phased potentials derived at the sliders of the thrust variacs T7 and T8 and as the air-speed increases cause an increase in the phase φ1 potential derived at the slider of thrust potentiometer T8 and applied through resistor 1204 to the control conductor 1302 of the angle of attack motor control circuit. At this time, since the CK relay 1200 has released, no potential of phase φ2 is applied to control conductor 1302 through resistor 1205 and the potential of phase φ1 applied to conductor 1302 is such as would tend to increase the angle of attack. However the motor 1303 is not operated to move the sliders of the potentiometers driven thereby toward the No. 3 terminals of their windings representative of an increase in the angle of attack until the take-off is simulated and the GRD, GRD1, GRD2 and GRD3 relays 1000, 1202, 1203 and 805 have released.

When an air-speed of 95 knots or more is indicated, the rate-of-climb indicators 1515 and 1715 will begin to show climb and the altimeters 1517 and 1717 will begin to show altitude. The rate of climb is represented by the motor unit shown in the lower portion of Fig. 5 and the motor 564 thereof is controlled by potentials representing forces perpendicular to the earth. Since these voltages are developed in the angle-of-climb circuit the rate of climb may be expressed as a function of this angle, namely: Rate of climb=true air-speed×sine (angle of climb). In this circuit the sine function is considered linear to a value of 1.2 at 70 degrees.

To control the motor 564 a potential is applied to control conductor 551, through resistor 552, over conductor 553 from the slider of the angle of climb potentiometer AC8, the winding of which has its mid-tap grounded and its outer terminals connected through resistors 808 and 809 and conductors 810 and 811 with the sliders of the true air-speed variacs TA7 and TA1, respectively, which variacs have their windings energized respectively over circuits connected to the φ2 and φ1 bus bars. Any increase in true air-speed with a positive angle of climb or a positive increase in angle of climb for any given air-speed will cause the motor 564 to move the shaft 554 in a direction representative of a positive increase in the rate of climb. This action moves the slider of balancing potentiometer RC7 in a direction to apply a potential of opposite phase to control conductor 551 until a balance is attained. For this purpose the winding of the balancing potentiometer is bridged by resistors 555 and 556 and connected between the $\varphi1$ and $\varphi2$ bus bars, the junction point between such resistances being connected to ground. The slider of this potentiometer is connected through the potential divider comprising resistors 557 and 558 to ground, the junction point in the latter potential divider being connected through resistor 559 to control conductor 551.

The movement of shaft 554 is communicated to the synchro-transmitter 563, the rotor winding of which is energized from the bus bars 300 and 301 and the stator windings of which are connected over conductors 561 and 562 and bus bar 300 with the corresponding stator windings of the synchro receivers 1516 and 1716 associated with the rate-of-climb indicators 1515 and 1715. The rotors of the synchro-receivers are also energized from bus bars 300 and 301. To insure that the rate-of-climb indicators will be centered when the trainer is normal even though the shaft 554 of the rate-of-climb motor unit may have positioned the slider of balancing potentiometer RC7 slightly off-center, resistor 552 is connected to ground over conductor 553 and the upper No. 2 contacts of the GRD3 relay 805 until the simulated flight leaves the ground and relay 805 releases whereupon the motor 564 will be placed entirely under the control of the balancing potentiometer which will cause the motor to rotate shaft 554 until the slider of potentiometer RC7 is centered.

Figure 7:
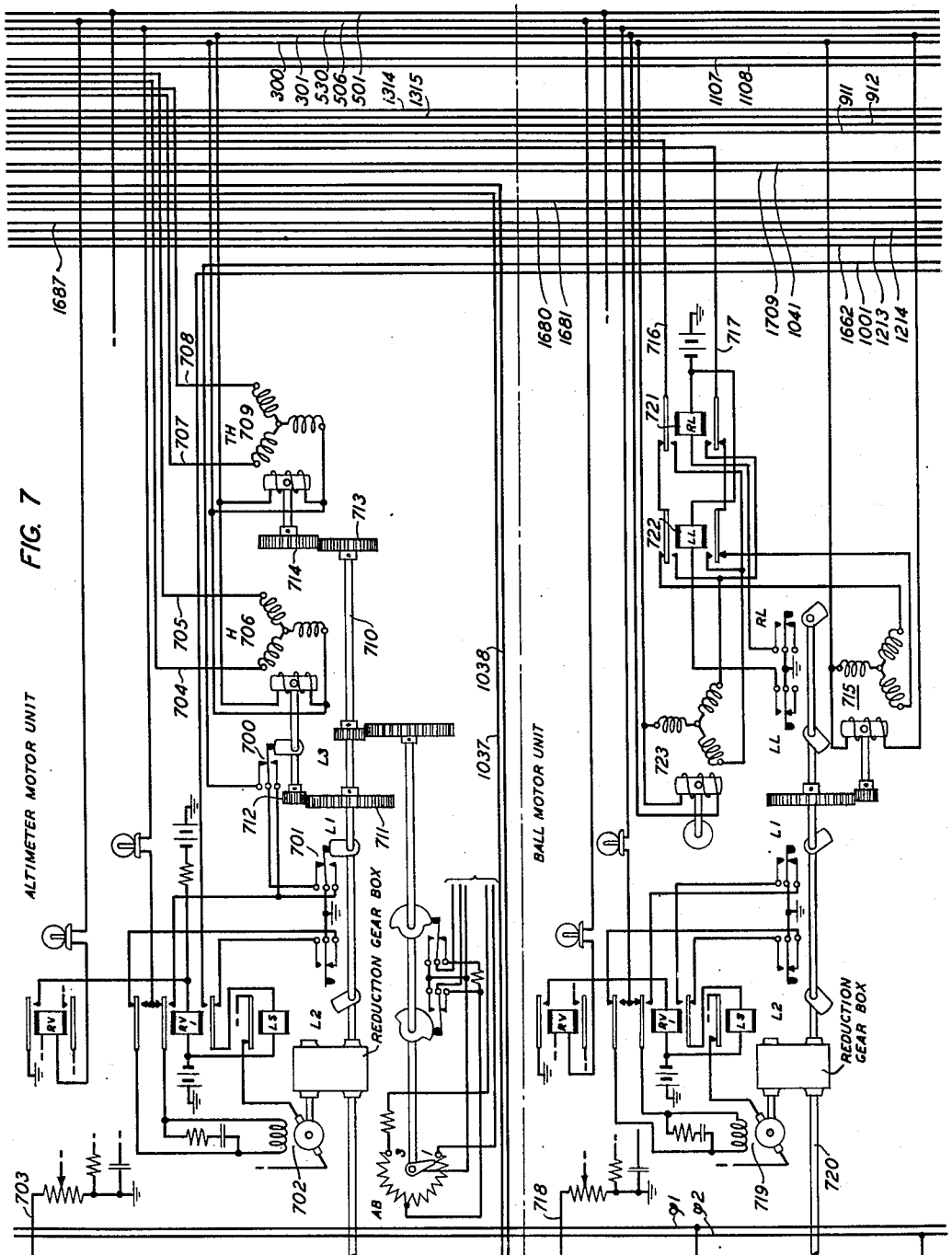
Fig. 7 shows above the dot-dash line a schematic representation of the altimeter motor control circuit and apparatus of the associated motor unit and below the dot-dash line the schematic representation of the ball motor control circuit and apparatus of the associated motor unit.

The altimeter motor unit shown in the upper portion of Figs. 6 and 7 in effect integrates the rate of climb. Since a characteristic of the motor control circuit used in the trainer is that the motor runs at a speed proportional to the signal applied to the input or control conductor, the altimeter motor 702 is made to run at a speed directly proportional to the rate of climb by using a signal potential identical with that controlling rate of climb and by properly adjusting the altimeters 1517 and 1717 to register changes in altitude at the rate shown on the rate-of-climb indicators 1515 and 1715. The circuit by which signal potential is applied to control conductor 703 of the altimeter motor control circuit may be traced through resistor 812 to the slider of the angle-of-climb potentiometer AC2, the winding of which has its mid-tap grounded and its outer terminals connected through resistors 813 and 814 to conductors 810 and 811 to which phase $\varphi1$ and phase $\varphi2$ potentials are applied under the control of the true air-speed variacs TA1 and TA7.

The altimeters 1517 and 1717 are each driven by two synchro-receivers one of which, 1519 for the altimeter 1517 and 1719 for the altimeter 1717, drives the 100-feet indicating needle, and the other of which, 1518 for the altimeter 1517 and 1718 for the altimeter 1717, drives the 1000-feet indicating needle. The stator windings of the synchro-receivers 1519 and 1719 are connected over bus bar 300 and conductors 704 and 705 with the corresponding stator windings of the synchro-transmitter 706 and the stator windings of the synchro-receivers 1518 and 1718 are connected over bus bar 300 and conductors 707 and 708 with the corresponding stator windings of synchro-transmitter 709. The rotor windings of all of these synchro-transmitters and receivers are energized from the bus bars 300 and 301. The rotor winding of transmitter 706 is driven from the shaft 710 of the altimeter motor unit through the gears 711 and 712 which have a step-up ratio of 1 to 10 and the rotor of transmitter 709 is driven from shaft 710 through unity ratio gears 713 and 714 so that the rotor of transmitter 706 turns at 10 times the speed of the rotor of transmitter 709.

When the altimeter reads zero the GRD, GRD1, GRD2 and GRD3 relays 1000, 1202, 1203 and 805 are operated under the control of the L1 and L3 switches 701 and 700 as previously described and when the simulated flight leaves the ground as indicated by the release of these relays the F relay 1013 is operated in a circuit extending over the lower No. 1 back contact of the GRD relay 1000 and in turn causes the operation of the F1 relay 1014. The operation of these relays represents a condition of flight.

Figure 8:
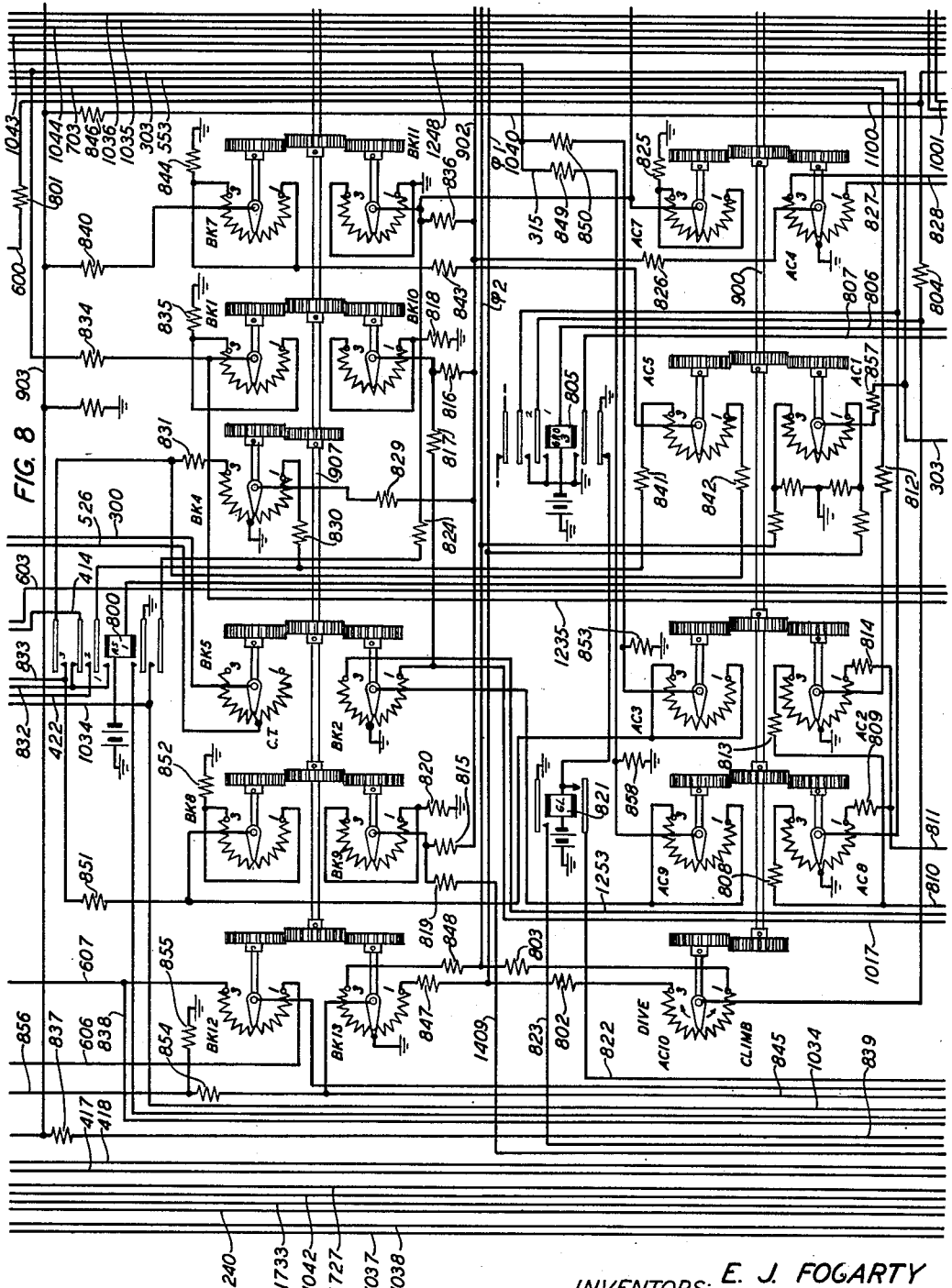
Fig. 8 shows in the upper portion thereof apparatus of the bank motor unit and in the lower portion thereof apparatus of the angle of climb motor unit.
Figure 9:
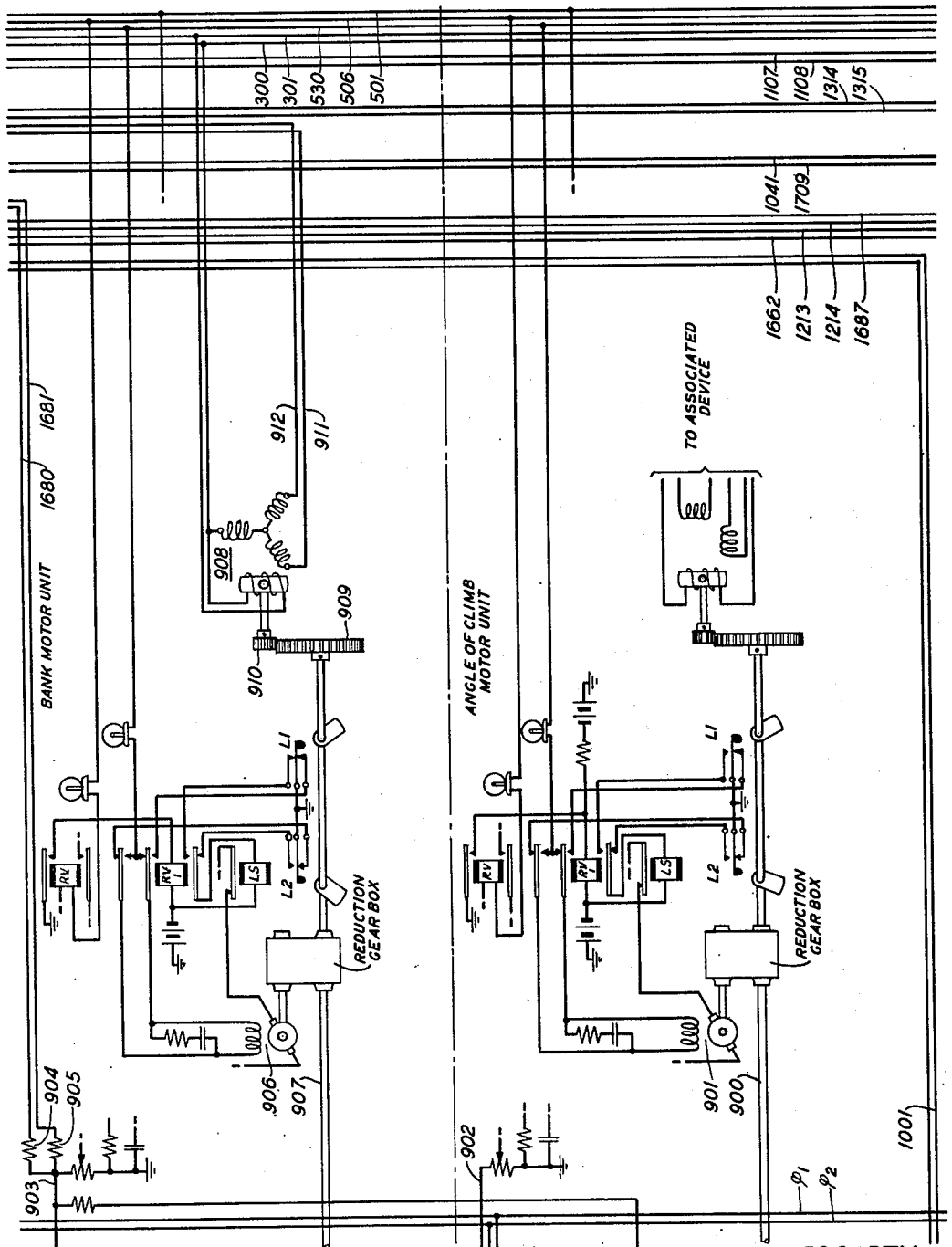
Fig. 9 shows above the dot-dash line a schematic representation of the bank motor control circuit and apparatus of the associated motor unit and below the dot-dash line a schematic representation of the angle of climb motor control circuit and apparatus of the associated motor unit.

The angle-of-climb motor control unit of Figs. 8 and 9, which as previously described is instrumental in controlling the setting of the rate-of-climb indicators and the altimeters, has its motor 901 controlled to rotate the shaft 900 to a position representative of the angle of climb, which is the vertical angle between the flight path and the horizontal, and is primarily a function of the rate of pitch, rate of yaw and bank. The angle of climb may be represented by the following approximate equation:

angle of climb=∫ [rate of pitch×cosine (bank angle) −rate of yaw×sine (bank angle) ]dt With a zero bank, the angle of climb is the integral of the rate of pitch. As the bank angle increases the effect of rate of pitch on angle of climb decreases.

Since there is no rate of pitch circuit provided in the trainer an equivalent term based on the centrifugal forces involved in producing pitching action is used. The derivation of this term involves the forces of lift, weight and air-speed. The final approximate equation for the angle of climb is:

$$\text{Angle of climb} = \int \left[ K1 C_L V_i \cos B - K2 \frac{\cos \theta \cos^2 B}{V_T} - \text{Rate of yaw} \times \sine (B) \right] dt$$

where $V_T$ equals true air-speed; $V_i$ equals indicated air-speed; $C_L$ equals coefficient of lift which is a function of the angle of attack and the position of the wing flaps; $\theta$ equals angle of climb; $B$ equals bank angle and $K1$ and $K2$ are constants. In the circuit shown however the sine function is assumed to be linear having a value of 1.2 at 70 degrees.

The first term of the above equation is represented by the circuits connected through resistors 815 and 816 to control conductor 902 of the angle of climb motor control circuit, where the potential connected through resistor 816 gives the effect of wing flaps while that connected through resistor 815 gives the effect of the wings with $C_L$ being represented by the angle of attack function.

To derive the potential applied through resistor 816, potentials of phase $\varphi1$ and phase $\varphi2$, which are effective as soon as the movement of the airplane is simulated by the operation of the AS relay 1007 are supplied as previously described from the phase $\varphi1$ and phase $\varphi2$ bus bars over the upper No. 2 and lower No. 1 front contacts of relay 1907, through the windings of indicated air-speed variacs IA1 and IA7, respectively, to ground. Potentials of phase φ1 and phase φ2 are then derived from such variacs which potentials increase as the indicated air-speed increases and are applied from the sliders of the indicated air-speed variacs IA1 and IA7, over conductors 1015 and 1016 to the terminals of the windings of angle-of-attack potentiometers AA2 and AA3. The phase φ1 potential is applied to the No. 1 terminal of the winding of potentiometer AA2, through resistor 1231 and through the first 25 per cent of the winding to ground and the phase φ2 potential is applied directly to the No. 3 terminal and the other 75 per cent of the winding to ground so that when the slider is at the tap point of the winding no potential is derived at the slider. The potential on the slider is applied over the inner upper back contact of the stall (S1) relay 1228, over conductor 1017 and through the potential divider comprising resistance 817, the bank potentiometer BK10 and resistor 818 to ground. The terminals of the bank potentiometer are connected together and through resistor 818 to ground so that as its slider moves the potential which is derived at the junction point of resistor 818 and the slider varies in accordance with the cosine of the bank angle. Thus the potential applied through resistor 816 to the angle-of-climb control conductor 902 is of phase φ1 as the angle of attack becomes negative and of phase φ2 as the angle of attack becomes positive and varies with the indicated air-speed and as the cosine of the bank angle.

To derive the potential applied through resistor 815 a potential of phase φ2 is applied over conductor 1016, over the inner lower back contact of stall relay 1228 and conductor 1232, through resistor 1407, through the winding of the wing flaps potentiometer WF3 and through resistor 1408 to ground, and from the slider of the potentiometer WF3 potential is derived and applied over conductor 1409 and through the potential divider comprising resistance 819, the bank potentiometer BK9 and resistor 820 to ground. The terminals of this bank potentiometer BK9 are connected together and through resistor 820 to ground so that as its slider moves, the potential which is derived at the junction point of resistor 820 and the slider is varied in accordance with the cosine of the bank angle. Thus the potential applied through resistor 815 to the angle-of-climb control conductor 902 is of phase φ2 and increases with the indicated air-speed, decreases as the wing flaps are raised towards their "Up" position and varies with the cosine of the bank angle.

The GL or ground lift relay 821 is used to simulate the difference in lifting effect of the air under the wings of an airplane for a given angle of attack as determined by flight on ground operation. Until take-off is simulated relay 821 is unoperated. As soon, however, as the GRD3 relay 805 releases when the simulated flight leaves the ground, relay 821 operates and locks over conductor 822 to ground over the upper contacts of the 0–65 relay 1018 which will have released as soon as an air-speed exceeding 65 knots has been attained. Relay 1018 is operated over conductor 1019 by the 0–65 cam-operated switch 1112 driven from the shaft 1111 of the true air-speed motor unit. Relay 821 upon operating connects ground over its upper contacts and conductor 823 to the No. 1 terminal of the winding of the wing flaps potentiometer WF3 thereby reducing the phase φ2 potential applied through resistor 815 to control conductor 902 of the angle-of-climb motor control circuit. The locking circuit of relay 821 over the contact of relay 1018 is to prevent the simulation of excessive bouncing of the flight during landing until the air-speed is below 65 knots.

The potential applied through resistor 826 to control conductor 902 represents the second term of the equation. To derive this potential, potential of phase φ1 is applied from the φ1 bus bar, through resistor 1026, through the true air-speed potentiometer TA2, over conductor 1034, and through the wing ice rheostat 1726 at the instructor's desk and thence to ground. From a junction point between potentiometer TA2 and rheostat 1726 potential is applied over the lower contacts of the AS1 relay 800 and through the potential divider comprising resistor 824 and the bank potentiometer BK11 to ground and also through the potential divider including resistor 824 the angle-of-climb potentiometer AC7 and resistor 825 to ground. From these potential dividers a derived potential of phase φ1 is applied through resistor 826 to control conductor 902. By the adjustment of the slider of rheostat 1726 toward its No. 1 terminal the instructor may increase the potential of phase φ1 thus simulating the reduction of the lift of the wings due to the formation of wing ice. This potential also decreases as the true air-speed increases after the air-speed exceeds about 65 knots or after take-off.

The potential applied to conductor 902 through resistor 829 from the slider of the bank potentiometer BK4 represents the last term of the equation with rate of turn substituted for yaw. The potentiometer BK4 has the mid-point tap of its winding connected to ground and its outer terminals connected through resistors 830 and 831, over the upper Nos. 1 and 3 contacts of the AS1 relay 800 and over conductors 832 and 833 to the sliders of the rate-of-turn potentiometers RT3 and RT1 respectively. The winding of potentiometer RT1 is bridged by resistors 406 and 407 the junction point between which resistors is connected to ground and is also bridged between the φ1 and φ2 bus bars. The winding of potentiometer RT3 is similarly but reversely bridged between the φ1 and φ2 bus bars and is shunted by resistors 408 and 409, the junction point between which is connected to ground. Thus potentials of opposite phase are applied to the terminals of the bank potentiometer BK4 which vary in magnitude with the rate of turn and which vary in sense with the direction of the turn. No potential is applied from the slider of potentiometer BK4 through resistor 829 if there is no turn or bank.

With a straightforward flight path along the ground and then in the air after take-off is simulated, with no yaw or bank, the potentials of phase φ2 applied to control conductor 902 through resistors 815 and 816 as determined by the indicated and true air-speeds, by the angle of attack and by the position of the wing flaps are effective to cause the motor 901 of the angle-of-climb motor unit to rotate the shaft 900 in a direction to move the sliders of potentiometers driven therefrom from their mid-positions toward the No. 1 terminals of their windings representative of a climbing condition of flight.

To insure that the shaft 900 of the angle-of-climb motor unit will be in the center position when a ground condition of the flight is simulated, the control conductor 902 is connected through resistor 826 to the slider of potentiometer AC4 the winding of which has its mid-tap grounded and its outer terminals connected over conductors 827 and 828, over the Nos. 4 and 5 lower contacts of the GRD relay 1000 and through resistors 1021 and 1022 to the φ1 and φ2 bus bars.

It is to be noted that true air-speed is a factor in determining the angle of climb. This is represented by the motor unit shown in the upper portions of Figs. 10 and 11 and controlled by potentials applied to control conductor 1109 representing the relation between true air-speed, air density, altitude and indicated air-speed as expressed by the equation $$\sqrt{\frac{\text{air density at altitude}}{\text{air density at sea level}}} \times \text{true air speed} = \text{indicated air-speed}$$

In the circuits of the trainer the square root of the density ratio, based on standard atmospheric conditions, is represented by a potentiometer A7 driven by the altimeter motor 702. The winding of this potentiometer is energized in a circuit from the φ2 bus bar, through the potentiometer winding and resistor 602 to ground and thus as the altitude increases the potential of phase φ2 at its slider decreases. This potential is applied over conductor 603 through the winding of the true air-speed potentiometer TA3, from the slider of which the derived potential is applied through resistor 1023 to control conductor 1109 thereby causing the true air-speed motor 1110 to drive the potentiometers driven therefrom to positions representative of a higher true air-speed. A potential of phase φ1 is also applied from the slider of the indicated air-speed potentiometer IA5, through resistor 1024, to control conductor 1109 which increases as the indicated air-speed increases. The first 57 per cent of the winding of potentiometer IA5 is bridged by resistor 1025 and the outer terminals of the winding are connected to the phase φ1 bus bar and through resistor 1026 to ground. This latter potential is not effective until there is air-speed as represented by the operated condition of the AS relay 1007, since until relay 1007 operates the resistor 1024 is connected to ground over the upper back contact of relay 1007. Thus the motor 1110 will be driven by the potential applied through resistor 1023 until such potential is made equal to the potential applied through resistor 1024.

Returning now to a discussion of the movement of the simulated flight along the ground, as the indicated and true air-speed increase, the angle of attack increases also, resulting in the operation of the angle-of-climb motor unit to show a slight angle of climb. As the slider of the angle-of-climb potentiometer AC2 moves toward the No. 1 terminal of its winding representative of a positive angle of climb, the motor 702 of the altimeter unit is operated to show a slight increase in altitude whereupon the cam operated switch 700 opens the previously traced circuit of the GRD relay 1000 which releases in turn releasing the GRD1, GRD2, GRD3 relays 1202, 1203 and 805. When relay 805 releases direct ground is removed from resistor 552 thereby rendering the angle-of-climb potentiometer AC3 effective to control the motor 564 of the rate-of-climb motor circuit to turn the shaft 554 into a position representative of the rate of climb. The rate-of-climb indicators 1515 and 1715 will now show a rate of climb and the altimeters 1517 and 1717 will show an increasing altitude which will indicate to the pilot that the flight is air borne.

With the GRD1 relay 1202 now released a potential is applied through resistor 1206 to control conductor 1302 of the angle of attack motor control circuit which varies with the position of the wing flaps as determined by the position of the slider of wing flaps potentiometer WF5 and by the position of the landing gear as determined by the condition of the LGU relay 1410. To derive this potential the winding of potentiometer WF5 is energized over a circuit extending from the φ2 bus bar, through resistor 1411, through the winding of such potentiometer, through resistor 1412, over conductor 1413 to a junction point between resistors 1233 and 1234, which resistors are connected between the φ1 bus bar and ground. The potential derived at the slider of potentiometer WF5 is applied over conductor 1414 and over the inner upper back contact of the GRD1 relay 1202, through resistor 1206 to conductor 1302. With the wing flaps up, as assumed, and the slider of potentiometer WF5 at the No. 1 terminal of its winding, a potential of phase φ2 is derived which tends to reduce the angle of attack.

The GRD relay 1000 upon releasing permits relays 1013 and 1014 to operate, representative of flight, relay 1013 upon operating closing over its lower No. 2 contacts a shunt over conductors 1215, 1226 and 1027 of the upper No. 2 contacts of the LGD relay 1400, so that the potential of phase φ1 applied through resistor 1403 to control conductor 1100 of the indicated air-speed motor unit is continued after relay 1400 releases when the pilot simulates the retraction of the landing gear.

The pilot will now pull back on the stick 1600 while maintaining a zero rate of turn by use of the rudder pedals 1601 and 1602 so that the rate-of-climb indicators 1515 and 1715 will show a continuous rate of climb. The movement of the stick 1600 results in the movement of the slider of the elevator potentiometer E toward the No. 3 or "Up" terminal of its winding resulting in an increase in the phase φ1 potential applied from the potentiometer the winding of which is energized by potentials of phases φ1 and φ2 applied from bus bars φ1 and φ2 over the back contacts of the GRD2 relay 1203, and under the control of thrust potentiometer T9, through resistor 1204 to control conductor 1302 of the angle-of-attack motor control circuit, whereby the motor 1303 thereof turns shaft 1304 into a position representative of an increase in the angle of attack. As before described, as the result of an increase in the angle of attack the angle-of-attack potentiometer AA2 causes the angle-of-climb motor unit to function to rotate shaft 900 thereof to a position representative of an increase in the angle of climb, which through the adjustment of the angle-of-climb potentiometers AC3 and AC2 causes the rate of climb and altimeter motor units to take new settings representative of the increase in the rate of climb and the increase of altitude incident to the positioning of the stick 1600.

When an altitude of 1000 feet or more has been attained the pilot will operate the landing gear control (not shown) to its "Up" position whereupon the motor 1450 of the landing gear motor unit will be operated in the manner fully described in the Pearsall Patent 2,519,698, hereinbefore referred to, to simulate the retraction of the landing gear and the locking of such landing gear in its retracted position. The retracted condition of the landing gear will be indicated to the pilot and to the instructor by indicators (not shown) and in the circuit of Fig. 14 will be represented by the movement of the sliders of the potentiometers LG3 to LG11, inclusive, to the No. 1 terminals of their windings. With the landing gear retracted and locked the LGU relay 1410 operates and over its upper No. 1 contact short-circuits the 128-ohm resistor 1412 thereby changing the phase φ1 potential applied through resistor 1236 which now functions to cause an increase in the angle of attack, angle of climb and rate of climb.

If it be assumed that the attachment of a droppable fuel tank has been simulated by the operated condition of the DT1 relay 1417 of Fig. 14 then when the pilot simulates the dropping of the tank by operating key 1418 to release relay 1417 the resistor 1234 becomes shunted by ground applied at the back contact of relay 1417 to conductor 1419, thereby decreasing the potential of phase φ2 applied to control conductor 1302 of the angle-of-attack motor unit through resistor 1298 to further increase the angle of attack, angle of climb and rate of climb which would result in an airplane from the removal of the drag effect of the tank.

As a further result of the retraction of the landing gear and the movement of the sliders of the landing gear potentiometers LG7 to LG11 the No. 1 terminals of their windings, the phase φ2 potential applicable to control conductor 1103 of the indicated air-speed motor unit through resistor 1227 will be decreased with the result that the motor 1101 will be operated in a direction representative of the increase in air-speed when the drag effect of extended landing gear is removed.

The rudder trim wheel 1660 is now turned back so that the rate of turn and bank indicators 1509 and 1709 remain at zero with the stick 1690 centered laterally and pressure removed from the rudder pedals 1681 and 1682.

*Climb*

For a continued climbing simulation the propeller governor (not shown) is adjusted until the tachometers read 2550 R. P. M. and the throttle is pulled back until the manifold pressure indicators show a manifold pressure of 44 inches of mercury. This is accomplished in the manner fully set forth in the Germanton Patent 2,564,429. The elevator trim wheel 1656 is now adjusted until an air-speed of 120 knots is indicated on the air-speed indicators 1513 and 1713. The adjustment of the elevator trim potentiometers ET1 and ET2 by the trim wheel 1656 changes the signal potential applied through resistor 1204 to control conductor 1302 of the angle-of-attack motor control circuit so that the angle of attack increases.

As a result of an increase in the angle of attack and the movement of the sliders of angle-of-attack potentiometers AA1 and AA7 towards the No. 3 terminals of their windings, an increase in the drag effect due to the angle of attack of the wings is applied as a potential of phase φ2 through resistor 1230 to control conductor 1100 of the indicated air-speed unit thereby causing the motor 1101 of such unit to rotate shaft 1102 in a direction representative of a slight reduction in indicated air-speed. This reacts upon the angle-of-climb motor control circuit through the indicated air-speed variacs IA1 and IA7 to reduce the potential of phase φ2 applied through resistor 816 to control conductor 902 of the angle-of-climb motor unit thereby causing the motor 901 of such unit to move the shaft 900 to a position indicative of a reduction in the angle of climb. With a reduction in the angle of climb the slider of potentiometer AC10 moves slightly back toward the No. 3 terminal of its winding causing a decrease in the drag effect of the angle of attack of the wings applied through resistor 804 as potential of phase φ2 to control conductor 1100 of the indicated air-speed motor unit which is controlled thereby to represent an increase in the indicated air-speed. The increase in indicated air-speed causes the sliders of variacs IA1 and IA7 to increase the potential of phase φ2 applied through resistor 816 to control conductor 902 of the angle-of-climb motor unit thereby causing the motor of such unit to move shaft 900 to a position representative of an increase in the angle of climb. With an increase in the angle of climb the slider of potentiometer AC10 moves slightly toward the No. 1 terminal of its winding causing an increase in potential of phase φ2 applied through resistor 804 to control conductor 1100 of the indicated air-speed motor unit which operates to a position representative of a reduction in indicated air-speed. Thus the angle of climb and indicated air-speed circuits interact so that a phugoid oscillation effect of a climbing airplane will be simulated in the fluctuations produced in the rate-of-climb indicators 1515 and 1715. These oscillations will gradually die out until the indicators, with the position of the elevator trim wheel 1656 maintained, will show a rate-of-climb of about 5000 feet per minute.

As before described, when the angle of attack increases, potential of phase φ1 is applied from the slider of potentiometer AA4 through resistor 834 to control conductor 303 of the pitch bar motor unit and on a straightforward flight this potential is unaffected by the bank potentiometer BK1. While there is now air-speed yet, if it be assumed that the flight is straightforward and there is no bank, no control potential will be applied to control conductor 303 through resistor 1028 under the control of the ball potentiometers BL1 and BL2, bank potentiometer BK12 and the indicated air-speed potentiometer IA3. The pitch bar motor unit will therefore respond in the manner previously described to the signal potential applied to conductor 303 under the control of the angle-of-attack potentiometer AA4 to cause the horizon bars of the gyro horizon instruments to show nose-up positions.

A further result of the setting of the angle-of-attack motor unit, after a condition of flight has been simulated as represented by the operation of the flight (F and F1) relays 1013 and 1014, is the operation of the accelerometers 1521 and 1721 on the pilot's and instructor's instrument panels under the control of the accelerometer motor unit of Fig. 13. This motor unit is controlled by potentiometers representing the forces acting in the direction of an axis perpendicular to the longitudinal and transverse axes of the airplane. Since it is usual to consider the magnitude of acceleration acting on an airplane in terms of multiples of the normal gravitational acceleration G, the load supported by the wings (lift) in any maneuver is the product of the weight of the airplane by the acceleration indication or $$\text{acceleration} = \frac{\text{lift}}{\text{weight}} = \frac{KC_L V_i{}^2}{W} = K1 C_L V_i{}^2$$

The circuits connected through resistors 1236 and 1237 to control conductor 1308 of the accelerometer motor unit represent this relationship. While on the ground the flight relays 1013 and 1014 are released and the usual lift potentials are removed. Since the weight and lift forces are exactly equal when the airplane is on the ground a circuit is effective when relay 1013 is not operated for applying a potential of phase $\varphi 1$ through resistor 1238 to control conductor 1308. To derive this potential, potential from bus bar $\varphi 1$ is applied through resistor 1239 and over conductor 1240 through resistor 1029 to ground and the potential derived from the junction between point between these resistors is applied through resistor 1238 to control conductor 1308. This potential is sufficient to cause the motor 1309 to drive the shaft 1310 of the accelerometer motor unit to a position representative of the normal setting of the accelerometers 1521 and 1721 or +1g. When this setting is attained the balancing potentiometer ACL1 will have moved its slider to a position such that the potential applied therefrom through resistor 1311 balances the signal potential. The winding of this potentiometer is energized from the $\varphi 1$ and $\varphi 2$ bus bars through resistors 1312 and 1313.

The accelerometers are set by the synchro-receivers 1522 and 1722 associated therewith, the rotor windings of which are energized from the bus bars 300 and 301 and the stator windings of which are connected over bus bar 300 and conductors 1314 and 1315 with the corresponding stator windings of the synchro-transmitter 1316 driven by the shaft 1310 of the accelerometer motor unit.

When a flight condition is being simulated as previously assumed and relays 1013 and 1014 are operated, relay 1013 connects ground over its upper No. 5 contacts to conductor 1240 thereby eliminating the normal control potential applied through resistor 1238. Since there is now assumed air-speed, potentials of phases $\varphi 1$ and $\varphi 2$ are applied over contacts of the operated AS relay 1007 to the windings of the indicated air-speed variacs IA1 and IA7 as previously described and potentials derived at the sliders of such variacs are applied to the windings of the variacs IA2 and IA8 so that the potentials derived at the sliders of the latter variacs vary with the square of the indicated air-speed. The potential of phase $\varphi 1$ derived at the slider of variac IA2 is applied over conductors 1030 and 1031, over the contacts of the F1 relay 1014, over conductor 1032, through resistors 1241 and 1242 to ground and through the upper three quarters of the winding of the angle of attack potentiometer AA8 to ground. The potential of phase $\varphi 2$ derived at the slider of variac IA8 is applied over the upper No. 4 contacts of the F relay 1013, over conductor 1033, through resistor 1243 and the lower one quarter of the winding of potentiometer AA8 to ground. The potential derived at the slider of potentiometer AA8 during the climbing maneuver when the angle of attack is greater than +8 degrees will be of phase $\varphi 1$ and will be applied over the lower No. 2 back contact of the stall relay 1244 and through resistor 1236 to control conductor 1308 of the accelerometer motor unit. This potential thus increases as the air-speed and angle of attack increase.

A further potential of phase $\varphi 1$, derived at the slider of variac IA2, is applied over conductors 1030 and 1031, over the contacts of relay 1014, over conductor 1032, over the upper No. 1 back contact of the stall relay 1244, over conductor 1245, through resistor 1415 and the winding of the wing flaps potentiometer WF4 to ground, whereby the potential derived at the slider of such potentiometer is applied over conductor 1416 and through resistor 1237 to control conductors 1308. Since it is assumed that the wing flaps are up and the slider of potentiometer WF4 is therefore at the No. 1 or ground terminal of its winding, the derived potential will be zero and of no effect.

Should the stalling of the airplane be simulated by the operation of the stall relays 1228 and 1244, the potentials applied through resistors 1236 and 1237 as just described are removed at the upper No. 1 and lower No. 2 contacts of relay 1244 and phase $\varphi 1$ potential is derived at the junction point between resistors 1241 and 1242 and applied over the lower No. 1 contacts of relay 1244 through resistor 1236 to control conductor 1308. This potential is of less value and causes the accelerometer motor unit to operate the accelerometers to show reduced readings representative of the reduction in lift of the wings during stall conditions. The stall relay 1244 is operated over conductor 1252 and the contacts of the L2 limit switch 1317 of the angle of attack motor unit if the angle of attack is increased to +15 degrees during the climbing maneuver and the shaft 1304 of the angle of attack motor unit is driven to the extent of the movement. Relay 1244 in operating establishes an obvious circuit for relay 1228.

*Cruise*

It will now be assumed that after reaching a desired simulated altitude, the pilot levels off before cruising. The pilot will first adjust the propeller governor until the cruising speed of 2150 revolutions per minute is indicated and will then pull the throttle back until the manifold pressure indicator shows 29 inches of mercury as described in the Germanton application hereinbefore referred to. He will next hold the cowl flaps handle in the "Close" position for six seconds to cause the cowl flaps to close as will be represented by the movement of the slider of the cowl flaps potentiometer CF2 to the lowermost terminal of its winding. This will cause a reduction of the phase $\varphi 2$ drag potential applied through resistor 1227 to control conductor 1100 of the indicated air-speed motor unit thereby tending to casue the motor thereof to rotate shaft 1102 in a direction representative of a slight increase in air-speed resultant upon removing the drag of the open cowl flaps.

The pilot will then turn the elevator trim wheel 1656 into a position in which a 0.75 nose-down condition is indicated and will manipulate the stick 1600 so that the rate of climb indicators 1515 and 1715 are stabilized at zero and remain at zero with the stick free. The effect of these control adjustments in the trainer is to move the sliders of the elevator trim potentiometers ET1 and ET2 toward the No. 1 terminals of their windings and to move the slider of the elevator potentiometer E toward the No. 1 terminal of its winding thereby reducing the phase $\varphi 1$ potential applied through resistor 1204 to control conductor 1302 of the angle of attack motor unit. This will result in the motor 1303 of the unit rotating the shaft 1304 into a position representative of a reduction of the angle of attack.

As a result of the movement of sliders of the angle of attack potentiometers AA1 and AA7, the potential of phase $\varphi 2$ applied through resistor 1230 to control conductor 1108 of the indicated air-speed motor unit is reduced resulting in the motor 1101 of that unit rotating the shaft 1102 to a position representative of an increase in indicated air-speed to approximately 185 knots. As the indicated air-speed increases, the movement of the slider of the indicated air-speed potentiometer IA5 towards the No. 3 terminal of its winding will cause an increase in phase $\varphi 1$ potential applied through resistor 1024 to control conductor 1109 of the true air-speed motor unit resulting in the motor of that unit rotating shaft 1111 into a position representative of an increase in true air-speed.

The increase in the indicated air-speed reacts upon the angle-of-climb motor control circuit through the indicated air-speed variacs IA1 and IA7 to increase the potential of phase $\varphi 2$ applied through resistor 816 to the control conductor 902 to cause the motor 901 of the angle of climb motor unit to move the shaft 900 to a position representative of an increase in the angle of climb. With an increase in the angle of climb the slider of potentiometer AC10 moves slightly forward toward the No. 1 terminal of its winding causing an increase in the drag effect of the angle of attack of the wings applied through resistor 804 as potential of phase $\varphi 2$ to control conductor 1108 of the indicated air-speed motor unit which is controlled thereby to represent a decrease in the indicated air-speed. Thus the angle of climb and indicated air-speed circuits interact so that a phugoid oscillation effect of an airplane when changing from a climbing to a level flight will be simulated in the fluctuations produced in the air-speed indicators 1543 and 1713.

As a further result of the movement of the slider of the angle attack potentiometer AA2, the phase $\varphi 2$ potential applied thereby through resistor 816 to control conductor 902 of the angle of climb motor unit is reduced whereupon the motor 901 of that unit turns shaft 900 in a direction representative of a reduction of the angle of climb. With a reduction in the angle of climb, the angle-of-climb potentiometers AC2 and AC3 reduce the potentials of phase $\varphi 1$ applied through resistors 812 and 552 to control conductors 703 and 551 of the altimeter and rate of climb motor control units, respectively, whereby the motors of such units function to cause the rate of climb indicators to show a zero rate of climb and to cause the altimeters to show no further increase in altitude. In a manner previously described, the horizon bars of the gyro horizon instruments 1546 and 1716 will be controlled by the pitch bar motor unit to show a level flight.

As the indicated air-speed increases the movement of the slider of the indicated air-speed potentiometer IA5 toward the No. 3 terminal of its winding will cause an increase in phase $\varphi 1$ potential applied through resistor 1024 to control conductor 1109 of the true air-speed motor unit resulting in the motor of that unit rotating shaft 1111 into a position representative of an increase in true air-speed.

*Turns*

It will now be assumed that the pilot desires to simulate a 3-degree per second right turn. Before doing so he checks the directional gyro compass 1523 with the remote indicating compass 1531. He then depresses the right rudder pedal 1602 and moves the stick 1600 to the right until the needle of the rate of turn indicator 1503 moves to the first mark to the right. The rate of turn indicator 1703 at the instructor's desk will show a similar indication. These instruments are driven by the synchro-receivers 1502 and 1702 which have their rotor windings energized from the bus bars 300 and 301 and have their stator windings connected over bus bar 300 and conductors 1595 and 1596 with the corresponding stator windings of the synchro-transmitter 560, the rotor winding of which is energized from the bus bars 300 and 301 and driven from the shaft 522 of the rate of turn motor unit shown in the upper portion of Figs. 4 and 5.

The rate of turn motor unit is controlled by potentials representing the yawing moments of the airplane. These are the moments produced by the rudder deflection and the yaw angle. The rudder movement is proportional to the rudder deflection, to the square of the indicated air-speed and to the effect of the slip stream on the rudder. This moment is represented by the potentials applied to control conductor 537 from the slider of the rudder trim potentiometer RTR1 over conductor 1664 and through resistor 517; from the slider of the rudder potentiometer R1 over conductor 1665 and through resistor 521; from the slider of the rudder trim potentiometer RTR2 over conductor 1666 and through resistor 523; and from the slider of the rudder potentiometer R2 over conductor 1667 and through resistor 524. The potential applied to control conductor 537 from the slider of the left brake potentiometer LB2 through resistor 1669 or from the slider of the right brake potentiometer RB2 through resistor 1668, thence over conductor 1670 and through resistor 525 to control conductor 537 reproduces the turning moment produced by the operation of one of the braked wheels on the ground and is effective with or without air-speed as long as the slip stream effect is present as represented by the engine thrust.

The yawing moment due to yaw is proportional to the trainer ball deflection and is represented by the potential connected from a point between the slider of the ball potentiometer BL4 and the resistors 608 and 609 forming a potential divider, over conductor 610 and through resistor 410 to control conductor 537. The potential connected from the rough air motor unit 208 of Fig. 2 over conductor 412 and through resistor 411 to control conductor 537 represents a further yawing moment due to random rough air conditions which may be introduced under the control of the instructor.

A balancing potential is applied to conductor 537 through resistor 413, over conductor 414, over the upper No. 2 front contact of the AS1 relay 800 when the flight condition exists, and thence over conductor 422 from the slider of the rate of turn balancing potentiometer RT4 and a centering potential is applied to conductor 537, through resistor 413, over conductor 414 and over the upper No. 2 back contact of relay 800 when there is no air-speed, and over conductor 832 from the slider of the rate of turn potentiometer RT2.

To apply potential through resistor 517 to control conductor 537, the winding of the rudder trim potentiometer RTR1 is bridged over a circuit from the slider of the indicated air-speed variac IA2, over conductor 1035, through resistor 1671, through the winding of potentiometer RTR1, through resistor 1672 and over conductor 1036 to the slider of indicated air-speed variac IA8. Thus as the air-speed varies a potential difference will be produced across the terminals of potentiometer RTR1 and a potential will be derived at the slider of such potentiometer, dependent upon the setting of the trim wheel 1660, which is applicable over the circuit traced through resistor 517 to control conductor 537. This potential will be of phase $\varphi 1$ if the trim is for a right turn or of phase $\varphi 2$ if the trim is for a left turn. It will be assumed that the trim wheel has been set for no trim so that no control potential is applied from the slider through resistor 517.

The winding of the rudder potentiometer R1 is also bridged through resistors 1673 and the 1674 between conductors 1035 and 1036 connected to the sliders of the indicated air speed variacs IA2 and IA8 in such a manner that potential of phase $\varphi 1$ is applied to its No. 3 terminal and potential of phase $\varphi 2$ is applied to its No. 1 terminal. Therefore when the right rudder pedal is depressed and the slider of potentiometer R1 is thereby moved to the right, the potential applied from its slider over the circuit traced through resistor 521 to control conductor 537 will be of phase $\varphi 1$. Had the left rudder pedal been depressed and the slider of potentiometer R1 been moved to the left, the potential applied to the slider through resistor 521 to control conductor 537 would have been of phase $\varphi 2$.

To apply potential through resistor 523 to control conductor 537, the winding of the rudder trim potentiometer RTR2 is bridged over a circuit from the junction point between resistors 1246 and 1247 connected as a potential divider to the slider of thrust variac T7, over conductor 1248, through resistors 1675 and 1676, through the winding of potentiometer RTR2, through resistor 1677, over conductor 1249 to the junction point between resistors 1250 and 1251 forming a potential divider connected to the slider of thrust variac T8.

The winding of the rudder potentiometer R2 is also bridged between conductors 1248 and 1249 connected through potential dividers as previously described to the sliders of the thrust variacs T7 and T8 in such a manner that potential of phase $\varphi 1$ is applied to its No. 3 terminal and potential of phase $\varphi 2$ is applied to its No. 1 terminal. Therefore when the right rudder pedal is depressed and the slider of potentiometer R2 is thereby moved to the right, the potential applied from its slider over the circuit traced through resistor 524 to control conductor 537 will be phase $\varphi 1$. Had the left rudder pedal been depressed and the slider of potentiometer R2 been moved to the left, the potential applied from its slider through resistor 524 to conductor 537 would have been of phase $\varphi 2$. This potential will increase as the simulated thrust increases or in other words as the slip stream increases.

As previously stated the rate of yaw also affects the rate of turn and is represented by a potential of either phase $\varphi 1$ or $\varphi 2$, dependent upon the direction of yaw, applied through resistor 419 to control conductor 537. To derive this potential the winding of the ball potentiometer BL4 is bridged through resistors 611 and 612 between the $\varphi 1$ and $\varphi 2$ bus bars and is bridged by resistors 613 and 614, the junction point between which is connected to ground. The potential derived at the slider of such potentiometer is then applied through the potential divider comprising resistors 608 and 609 to ground, from the junction point between which potential is applied over conductor 610 and through resistor 410 to control conductor 537. If the simulated turn is executed properly the slider will remain at the mid-point of its winding and no potential will be applied through resistor 410.

It will first be assumed that the turn to the right is properly executed so that the only potentials effective to control the rate of turn motor unit are of phase $\varphi 1$ applied through resistors 521 and 524. The summation of these potentials causes the motor 516 of the unit to rotate shaft 522 in a direction representative of a right turn and to a degree representative of the rate of turn. As the shaft turns the slider of the balancing potentiometer RT4 is adjusted until the potential applied thereby through resistor 413 to control conductor 537 balances the signal potentials applied through resistors 521 and 524 whereupon the motor 516 will stop. To derive the balancing potential the terminals of the winding of potentiometer RT4 are connected through resistors 415 and 416 and over conductors 417 and 418 with the sliders of the true air-speed variacs TA1 and TA7, respectively, so that the phase $\varphi 2$ and $\varphi 1$ potentials appearing at the terminals of the winding of potentiometer RT4 will vary with the true air-speed. The winding of potentiometer RT4 is bridged by resistors 419 and 420, the junction point between which is connected to ground. Potential derived at the slider of potentiometer RT4 is applied through resistor 421 to ground and over conductor 422, over the upper No. 2 front contact of the AS1 relay 800, assumed to be operated since air-speed is simulated, and over conductor 414 through resistor 413 to control conductor 537.

The position assumed by shaft 522 is as previously described communicated by the synchrotransmitter 560 to the synchro-receivers 1502 and 1702 which are instrumental in positioning the rate of turn needles of the turn and bank indicators 1503 and 1703.

The movement of the stick 1600 to the right in the execution of a right turn is instrumental in moving the slider of the aileron potentiometer AL to the right and to thereby apply a signal potential to control conductor 903 of the bank motor control unit shown in the upper portions of Figs. 8 and 9. The bank circuit is one of the controlling circuits for the gyro horizon instruments 1510 and 1710 and represents the angular displacement of the horizon bars of these instruments. The angle of the bank is primarily a function of the rolling action of the airplane. However, pitching and yawing motions are contributing factors which tend to change the bank of the airplane because of the rolling moments produced. If the pitch of the airplane is zero yawing will have no effect on the bank angle or if there is no yaw pitching will have no effect on the angle of bank. However, if there is pitch the effect of yawing on the bank angle will be determined by the bank angle, the smaller the angle the greater the effect of yawing. It should be kept in mind that these actions may increase or decrease the bank angle depending upon the direction of the action. These characteristics have been reproduced in the trainer within the limitations of the gyro horizon instrument. Since there is no rate of roll circuit in the trainer the rolling action is represented by the equivalent $$K1V_T \text{ (aileron deflection)} + \frac{K2 \text{ (ball deflection)}}{V_i}$$

The potentials applied through resistors 904 and 905 to control conductor 903 of the bank motor unit represent the aileron deflection multiplied by the true air-speed while the potential applied through resistor 837 represents the amount of ball deflection divided by the indicated air-speed.

To derive the potential applied through resistor 904 potentials of phase $\varphi1$ and phase $\varphi2$ derived at the sliders of the true air-speed variacs TA1 and TA1 are applied over the Nos. 5 and 4 lower contacts of the F relay 1013, over conductors 1037 and 1038 to the terminals of the windings of aileron potentiometer AL, the mid-tap of the winding of which is connected to ground. The potential derived at the slider of this potentiometer is applied over conductor 1688, through resistor 904 to control conductor 993. The potential thus applied to conductor 903 will vary directly as the true air-speed and will be of phase $\varphi1$ if a right bank is made or of phase $\varphi2$ if a left bank is made.

To derive the potential applied to resistor 905 potentials of phase $\varphi1$ and $\varphi2$ applied to conductors 1037 and 1038 from the sliders of the true air speed variacs TA1 and TA2, are applied through resistors 1678 and 1679 to the terminals of the windings of the aileron trim potentiometer AT, the mid-tap of which is grounded. The potential derived at the slider of this potentiometer is applied over conductor 1691, through resistor 905 to control conductor 903.

To derive the potential applied through resistor 837 the winding of the ball variac BL2 is bridged between the $\varphi1$ and $\varphi2$ bus bars and the potential derived at its slider is applied through resistor 695, over conductors 697 and 838, through resistor 1113, through the indicated air-speed potentiometer IA9, over conductor 1114, over the lower No. 3 contacts of the F relay 1013 and through resistor 1039 to ground, and over conductor 839 and through resistor 837 to control conductor 903. This potential will be zero if there is no ball movement, that is, if the turn is properly executed and will be of one or the other phase on an improperly executed turn and of a value which will increase with the degree of slip or skid on the turn and will increase as the indicated air-speed increases after the air-speed has attained a value greater than 86 knots.

The effect of pitch and yaw is simulated by the equation: sine (angle of pitch) × cos (bank angle) × rate of yaw with the sine function assumed to be linear. In the trainer the angle of climb is substituted for the angle of pitch and the rate of turn for yaw. This function is represented by the potential applied to control conductor 903 through resistor 840. To derive this potential, potentials derived at the sliders of rate-of-turn potentiometers RT1 and RT2, which when a turn is being executed will be opposite in phase, are applied over conductors 832 and 833, over the upper Nos. 1 and 3 front contacts of the AS1 relay 800, through resistors 841 and 842 to the terminals of the angle-of-climb potentiometer AC5. If the turn is toward the right, as assumed, potential of phase $\varphi1$ is applied to the No. 1 terminal of bank potentiometer AC5 and potential of phase $\varphi2$ is applied to the No. 3 terminal. On a turn to the left these applied potentials will be reversed. From the slider of potentiometer AC5 the derived potential is applied over the potential divider comprising resistor 843, the bank potentiometer BK7 and resistor 844 to ground, and from the slider of the latter potentiometer the derived potential is then applied through resistor 840 to control conductor 903. This potential is effective only if a turn is being made during a simulated climbing or diving maneuver.

The effect of rough air on the bank is introduced by a potential applied from the rough air motor control unit 208, over conductor 259 and through resistor 815 to control conductor 903 when the unit 208 is controlled from the instructor's desk to simulate random rough air conditions.

During flight, ground is connected over the upper No. 1 back contact of the GRD relay 1000 and over conductor 1040 and resistor 846 to control conductor 903 to shunt the input to the bank motor unit but when a ground condition is simulated and relay 1000 is operated conductor 1040 is connected over the upper No. 1 front contact of relay 1000 and over conductor 845 to the slider of bank potentiometer BK13, the winding of which is bridged through resistors 847 and 848 between the $\varphi1$ and $\varphi2$ bus bars and the center tap of which is grounded, so that potential is applied through resistor 846 to control conductor 903 to cause motor 906 to center the sliders of all potentiometers driven thereby to insure that the horizon bars of the gyro horizon instruments 1510 and 1710 will be leveled.

The horizon bars of the instruments 1510 and 1710 are tipped by the synchro-receivers 1511 and 1711 under the control of the synchro-transmitter 908 so that they show an inclination in a direction and to a degree representative of the assumed banking of the flight, the amount of bank, assumed to be 30 degrees, being indicated by the needles of these instruments. The rotor windings of the synchro-transmitters and synchro-receivers are energized from the bus bars 300 and 301 and the rotor of the transmitter is driven from the shaft 907 through the step-up gears 909 and 910. Corresponding stator windings of the transmitter and receivers are interconnected over the bus bar 300 and conductors 911 and 912.

As soon as a rate of turn, for example, of 3 degrees per second is established, the pilot moves the stick 1600 back approximately to center and decreases the pressure on the right rudder pedal 1601 so as to maintain the rate of turn. The movement of the stick back returns the slider of the aileron potentiometer AL to the center position thereby discontinuing the application of the signal potential through resistor 904 to control conductor 903 of the bank motor control circuit and, with no other control potential assumed to be applied at this time, the motor 906 of the bank motor unit stops to maintain the assumed settings of the gyro horizon instruments to show the assumed 30-degree bank. The position of the shaft 522 of the rate-of-turn motor unit will be maintained by the continued application of control potential to control conductor 537 thereof under the control of the rudder potentiometers R1 and R2 through the continued depression of the right rudder pedal.

With no back pressure on the stick 1600 the rate-of-climb indicators 1515 and 1715 will now show a slight descent. This is due to a loss of lift of the wings of an airplane when one wing is lower than the other on a banked turn. In the trainer when the sliders of the rate-of-turn potentiometers RT1 and RT3 move toward the No. 3 terminals of their windings for the assumed right turn, potentials of phase $\varphi1$ and phase $\varphi2$ are applied to the No. 3 and No. 1 terminals respectively of the bank potentiometer BK4 over the circuits previously traced and with the slider of the latter potentiometer moved toward the No. 3 terminal of its winding for a right wing-down simulation for a right turn, a potential of phase $\varphi1$ is applied through resistor 829 to control conductor 902 of the angle-of-climb motor unit which will result in the operation of the motor 901 of such unit in a direction representative of a slight angle of descent or dive. The slider of the angle-of-climb potentiometer AC8 will therefore be adjusted toward the No. 3 terminal of its winding to apply a potential of phase $\varphi1$ through resistor 552 to control conductor 551 of the rate-of-climb motor unit whereupon the motor 564 thereof turns the shaft 554 in a direction representative of a descending flight which through the synchro-transmitter 563 and synchro-receivers 1516 and 1716 sets the rate-of-climb indicators to show a descending flight.

The operation of the rate-of-turn motor unit is instrumental in operating the compasses on the pilot's and instructor's instrument panels under the control of the compass motor unit of Fig. 3. The compass motor unit is controlled by potentials representing both the speed of change and the degree of change of a compass needle for any flight conditions within the limits of the trainer. The compass heading is a function of the angle of climb, bank angle, the rate of pitch and the rate of yaw. The effect of rate of pitch on the compass heading is dependent on the angle of climb and bank angle. For a given rate of pitch the compass heading change becomes greater as these angles increase. With a zero bank angle the rate of pitch has no effect on the compass heading.

In the trainer the rate of pitch is replaced by the approximate factor $KC_L V_i$, where $C_L$ is the coefficient of lift and $V_i$ is the indicated air-speed. The potential applied through resistor 849 to control conductor 315 of the compass motor unit represents rate-of-pitch effect where $C_L$ is included as an angle of attack function. The circuit for deriving this potential closely approximates $KC_L V_i \times$ sine (bank angle) $\times$ the secant (angle of climb). Under conditions of stall the S1 relay 1228 of the angle-of-attack motor unit operates and changes the circuit to simulate reduced lifting effect of actual flight. To derive this potential, potentials of phase $\varphi1$ and $\varphi2$ are applied as previously described from the sliders of the indicated air-speed variacs IA1 and IA7 to the terminals of the angle-of-attack potentiometers AA2 and AA3, the winding of potentiometer AA3 being reversely connected with respect to the winding of potentiometer AA2, so that potentials of opposite phase are derived at the sliders of such potentiometers when the sliders move away from the ground tap positions. An increase in the angle of attack in a positive direction will apply an increasing potential of phase $\varphi2$ from the slider of potentiometer AA2, over the inner upper back contact of the S1 relay 1228, over conductor 1017 to the No. 1 terminal of the bank potentiometer BK2 and an increasing potential of phase $\varphi1$ from the slider of potentiometer AA3 over the upper back contact of relay 1228, over conductor 1253 to the No. 3 terminal of the bank potentiometer BK2.

With the slider of the BK2 potentiometer moved as assumed towards the No. 3 terminal of its winding for a right wing-down condition, potential of phase $\varphi1$ is applied from its slider to the terminals of the angle-of-climb potentiometer AC9 from the slider of which potential is derived and applied through resistor 858 to ground and through resistor 849 to control conductor 315 of the compass motor unit. The potentiometer BK2 introduces the sine function of the bank angle as a linear function and potentiometer AC9 introduces the secant function of the angle of climb.

The effect of rate of yaw on the airplane heading is also dependent on the angle of climb and bank angle. As the angle of climb increases the effect increases, while as the bank angle increases the effect of rate of yaw decreases becoming zero at an angle of 90 degrees. In the trainer the rate of turn has been used for the rate of yaw and the potential representing the rate of yaw effect is applied to control conductor 315 through resistor 850. The circuit for deriving this potential closely approximates (rate of turn) $\times$ cosine (bank angle) $\times$ secant (angle of climb). To derive this potential the potential derived at the slider of rate-of-turn potentiometer RT1, which will be of phase $\varphi2$ for a left turn and of phase $\varphi1$ for a right turn as assumed, is applied over conductor 833, through resistor 851 to the slider of the bank potentiometer BK8, the terminals of the winding of which are connected through resistor 852 to ground, and to the terminals of the winding of angle-of-climb potentiometer AC3, the slider of which latter potentiometer is connected through resistor 853 to ground and through the resistor 850 to control conductor 815. The potential derived by the rate-of-turn potentiometer RT1 varies with the rate of turn and the potentiometers BK8 and AC3 modify this potential in accordance with the cosine of the bank angle and the secant of the angle of climb respectively.

When the stall relay 1228 is operated to simulate a stall condition the modification of the potentials derived at the sliders of variacs IA1 and IA7 by the angle of attack potentiometers AA2 and AA3 is eliminated and greatly reduced potentials are applied from the sliders of variacs IA1 and IA7 to the terminals of the winding of bank potentiometer BK2 whereby the potential derived from the slider of potentiometer BK2 through resistor 849 to control conductor 315 of the compass motor unit becomes reduced.

The summation of these potentials applied through resistors 849 and 850 controls the operation of the motor 316 of the compass unit to move the shaft 317 into a position representative of the true heading of the simulated flight. When a stall condition is being simulated and the potential applied through resistor 849 is reduced, the motor 316 turns at a slower speed indicative of a slower change in true heading. In actual flight the effect of a stall condition is to reduce the lift of the wings, the reduction in the vertical component of the lift causing the airplane to lose altitude and the reduction in the horizontal component of the lift reducing the opposition to centrifugal force so that the flight course tends to straighten out. In the trainer this is simulated as previously described by the reduction of the potential which is controlling the motor 316 so that the motor turns at a slower rate and thus causes the simulated true heading to change more slowly as indicated by the remote indicating and directional gyro compasses. However, both the remote indicating compasses 1501 and 1701 and the directional gyro compasses 1523 and 1723 are controlled from the compass motor unit in a manner which further simulates actual flight conditions.

The remote indicating compass of an airplane is subject to a turning error which is normally present when turning off a northerly or a southerly course. In the airplane this is due to the action of the vertical components of the earth's magnetic field. On a banked turn off a northerly course the compass may show too slow a turn, no turn at all, or even a turn in the wrong direction, whereas when turning off a southerly course, the compass may show too fast a turn. Slow flat turns will not introduce this error. In the trainer this turning error is simulated in the manner fully disclosed and described in the Patent No. 2,458,586, granted January 11, 1949, to H. A. Giroud. This is accomplished by the introduction of a potential into one leg of the telemetric system by which the compass motor unit controls the remote indicating compasses. The telemetric system comprises a synchro-transmitter 318, the rotor winding of which is driven from the shaft 317 of the compass motor unit, and is energized from the bus bars 300 and 301. Two of the stator windings of this transmitter are connected over conductors 319 and 320 with corresponding stator windings of the synchro-receivers 1500 and 1700 associated with the remote indicating compasses. The third stator winding of the transmitter 318 is connected over conductors 321 and 526 to the mid-tap of the winding of bank potentiometer BK5, thence over the slider of such potentiometer to bus bar 300 and, in parallel with potentiometer BK5, from conductor 321, through the stator windings of the rate-of-turn synchro-transmitter 550 to bus bar 300, and thence to the third stator windings of the receivers 1500 and 1700. If the bank angle is zero as represented by the position of the slider of potentiometer BK5 at the mid-tap of its winding, the rate-of-turn synchro-transmitter 550 is without effect but if there is bank the slider of potentiometer BK5 will be moved away from the center tap and will include the portion of the winding of such potentiometer between the center tap and the slider in parallel with the stator windings of the rate-of-turn synchro-transmitter 550 in the circuit interconnecting the third windings of the compass synchro-transmitter 318 and synchro-receivers 1500 and 1700.

As a turn is made from a northerly or a southerly course the synchro-transmitter 550 will apply a potential through the circuit just traced interconnecting the synchro-transmitter 318 and the synchro-receivers 1500 and 1700 which will vary with the rate-of-turn and with the bank angle so that the receivers 1500 and 1700 will control the remote indicating compasses 1501 and 1701 to show the compass error due to a fast rate-of-turn.

The directional gyro-transmitter 322 driven from the shaft 317 of the compass motor unit operates the synchro-receivers 1524 and 1724 which drive the gyro compasses 1523 and 1723. These instruments are not affected by the turning error but do have a tendency to drift away from the correct setting at the rate of 6 degrees every 15 minutes. In the actual airplane instrument this is caused by a phenomenon common to gyroscope instruments called "precession" and it requires the instrument to be reset periodically to agree with the magnetic compass. This drift is created in the trainer by a small slow speed continuously running motor 323 connected through reduction gearing to one input shaft 324 of a differential gear box 325, the other input shaft of which gear box is driven through gearing from the compass motor unit shaft 317. The output shaft 326 of the gear box is connected by gearing with the rotor shaft of the gyro-transmitter 322. The rotors of transmitter 322 and receivers 1524 and 1724 are energized from bus bars 300 and 301 and the stator windings of transmitter 322 are connected over bus bar 300 and conductors 327 and 328 with the corresponding stator windings of the receivers.

*Excessive bank*

It will now be assumed that the pilot moves the stick 1680 to the right while maintaining the same pressure on the right rudder pedal 1602. The movement of the stick to the right moves the slider of the aileron potentiometer AL towards the No. 1 terminal of its winding to reapply potential of phase φ1 through resistor 904 to control conductor 903 of the bank motor unit resulting in the operation of the motor 906 of that unit to rotate the shaft 907 to a position representative of a further bank or simulation of the further lowering of the right wing. When the new turning condition has been established the pilot returns the stick to neutral thereby removing the signal potential from conductor 903. The ball motor unit of Figs. 6 and 7 will now respond to cause the balls of the turn and bank indicators to move to the right indicating an excessive right bank.

In an airplane the ball of the bank indicator is an inclinometer consisting of a liquid-filled curved glass tube containing a ball. The position of the ball is determined by the curvature of the tube and the various forces acting on the ball. Its position is an indication of the lateral attitude of the airplane. If the ball is centered it indicates a properly banked turn while if it is in any other position it is an indication of the amount by which the actual bank differs from the correct angle.

Because the trainer is motionless a special instrument is used in which the ball is arranged to be moved by a synchro-receiver under the control of controlling potentiometers and simulates the airplane attitude. The balls of the turn and bank indicators 1503 and 1703 are operated by the synchro-receivers 1504 and 1704 under the control of the synchro-transmitter 715 associated with the ball motor unit. The rotor windings of the transmitters and receivers are energized from the bus bars 300 and 301 and their corresponding stator windings are interconnected over bus bar 300 and conductors 716 and 717.

In the trainer the ball movement is closely approximated by a potential equation representing the following:

$$\sin(\text{ball angle}) = \sin(\text{bank angle}) - \frac{V_T}{K}(\text{rate of turn})$$

where the sine functions are assumed to be linear to a value of 1.2 at 70 degrees.

The potential applied to control conductor 718 through resistor 616 represents the bank angle term. To derive this potential, potential which is derived at the slider of the bank potentiometer BK13 as previously described, is applied through a potential divider comprising resistors 854 and 855 to ground and the potential derived at the junction point of these resistors is applied over conductor 856 and through resistor 616 to control conductor 718. This potential will be of phase $\varphi 1$ on a left wing-down bank or of phase $\varphi 2$ on a right wing-down bank.

The potential applied to control conductor 718 through resistor 617 represents the second term of the equation which is the product of the true air-speed and the rate of turn. To secure this potential, potentials of phases $\varphi 1$ and $\varphi 2$ are derived as previously described at the sliders of the true air-speed variacs TA1 and TA7, the windings of which are energized from the $\varphi 1$ and $\varphi 2$ bus bars, and are applied over the conductors 418 and 417 through resistors 423 and 424 to the terminals of the winding of rate-of-turn potentiometer RT2. The winding of this potentiometer is shunted by the resistance bridge comprising resistors 425 and 426, the junction point of which resistors is connected to ground. The potential derived at the slider of potentiometer RT2 is applied over conductor 427, through resistor 617 to control conductor 718. The value of this potential is diminished in accordance with the constant K by the resistor 428 connected between conductor 427 and ground. The potential applied through resistor 617 will therefore be of phase $\varphi 1$ on a turn to the right, of phase $\varphi 2$ on a turn to the left and will be of a magnitude dependent on the rate of turn and on the true air-speed.

On a properly executed turn to the right, as previously described, when the degree of bank is just right for the rudder deflection, the potential of phase $\varphi 1$ applied through resistor 617 to control conductor 718 by the rate-of-turn potentiometer RT2 will exactly balance the potential of phase $\varphi 2$ applied through resistor 616 to control conductor 718 by the bank potentiometer BK13, and the motor 719 of the ball motor unit will receive no driving impulses and therefore the shaft 720 will not be rotated to move the balls of the turn and bank indicators 1503 and 1703 from the central positions of the ball tubes.

However, if, as now assumed, the pilot banks excessively on a turn to the right, the potential of phase $\varphi 2$ applied through the resistor 616 under the control of the bank potentiomter BK13 will overbalance the potential of phase $\varphi 1$ applied under the control of the rate-of-turn potentiometer RT2 and the motor 719 of the ball motor unit will now rotate the shaft 720 in a direction to cause the sliders of the potentiometers driven thereby to move towards the No. 1 terminals of their windings or to the ball right position and, through the operation of the synchro-transmitter 715 and synchro- receivers 1504 and 1704 to move the balls of the instruments 1503 and 1703 to ball right positions. The shaft 720 will thus rotate until the slider of the balancing potentiometer BL4 reaches a position in which the potential of phase $\varphi 1$ derived at a point between resistors 608 and 609 and applied through resistor 618 to control conductor 718 balances the summation of the signal potentials applied through resistors 616 and 617. Thereupon the motor 719 will stop and arrest the movement of the shaft.

The ball circuit is designed to represent a maximum incorrect bank of 70 degrees in either direction. Since the limit of the ball movement in the instrument is approximately a 10-degree incorrect bank in either direction, the right limit switch RL and the left limit switch LL are operated by cams carried by shaft 720 when the shaft has rotated 10 degrees to the right or 10 degrees to the left of its normal position and in turn cause the operation of the RL relay 721 and the LL relay 722. The operation of either one of these relays causes the control of the synchro-receivers associated with the ball indicators of the turn and bank instruments 1503 and 1703 to be removed from the synchro-transmitter 715 and placed under the control of the manually adjustable synchro-transmitter 723 which may be adjusted or hold the balls at the limits of their travel so long as the ball angle is approximately 10 degrees or more.

One effect of the application of excessive bank and the movement of the slider of the ball potentiometer BL4 to a ball right position is to apply potential of phase $\varphi 1$ over the circuits previously traced through resistor 410 to control conductor 537 of the rate-of-turn motor unit thereby causing the motor 516 of such unit to turn the shaft 522 in a direction representative of an increase in the rate of turn to the right. A further effect of excessive bank and the movement of the slider of the ball potentiometer BL2 to a ball right position is to apply potential of phase $\varphi 2$ under the control of the indicated air-speed potentiometer IA9 over the circuit previously traced through resistor 837 to control conductor 903 of the bank motor unit thereby causing the motor 806 of such unit to turn the shaft 907 in a direction representative of a reduction in bank. A still further effect of excessive bank and the movement of the slider of ball potentiometer BL5 to a ball right position is to introduce a yaw effect into the control of the indicated air-speed motor unit which will be a drag potential of phase $\varphi 2$ applied as previously described under the control of the ball potentiometer BL5 and through resistor 891 to control conductor 1100 of the indicated air-speed motor unit. This drag potential will cause a slight decrease in indicated air-speed which will react as previously described on the angle of attack motor unit to cause a decrease in angle of attack resulting in a decrease in angle of climb. The decrease in angle of climb appears as a negative rate of climb on the rate-of-climb indicators 1515 and 1715 and as a nose-down position of the horizon bars of the gyro horizon instruments 1510 and 1710.

The ball circuit functions in the same manner on an excessive bank to the left except that in such case the rate-of-turn potentiometer RT2 will have been set for a left turn and the bank potentiometer BK13 will have been set for a left wing-down condition and consequently the ball motor unit will be operated to represent a ball left condition.

*Insufficient bank*

If the pilot banks insufficiently on a right turn the potential of phase $\varphi 1$ applied to control conductor 718 of the ball motor unit through resistor 617 under the control of the rate-of-turn potentiometer RT2 will be greater than the potential of phase $\varphi 2$ applied through resistor 616 under the control of a bank potentiometer BK13 and as a consequence the motor 719 will rotate shaft 720 of the ball motor unit in a direction representative of a ball left condition thereby causing the balls of the turn and bank indicators 1503 and 1703 to move toward the left until the balancing potentiometer BL4 applies sufficient balancing potential of phase $\varphi 2$ to control conductor 718 to stop the motor 719 and bring the shaft 720 to rest.

The effect of the ball left condition on the rate-of-turn motor unit, as controlled by the ball potentiometer BL4, is to apply a potential of phase φ2 through resistor 410 to control conductor 537 of such unit resulting in a slight reduction of the rate of turn. The effect on the bank motor unit as determined by the ball potentiometer BL2 is to apply a potential of phase φ1 under the control of the air-speed potentiometer IA9 through resistor 837 to control conductor 903 of such unit thereby causing the shaft 907 to be driven in a direction representative of an increase in bank. The effect on the indicated air-speed motor unit is, as for an excessive bank, to cause a reduction in air-speed and a decrease in the angle of climb.

The ball circuit functions in the same manner on an insufficient bank to the left except that in such case the rate-of-turn potentiometer RT2 will have been set for a left turn and the bank potentiometer BK13 will have been set for a left wing-down condition and consequently the ball motor unit will be operated to represent a ball right condition.

*Climbing while turning*

It will now be assumed that on a climbing flight previously described the pilot also moves the stick 1600 to the right and depresses the right rudder pedal 1602 so that a climbing right turn is executed with the correct angle of bank for the turn. When the desired rate of turn has been attained the pilot will, as previously described, return the stick to its neutral position. It will be recalled that on a climbing maneuver without any turn the potentials which affected the angle of climb were both of phase φ2 and were applied under control of the angle-of-attack potentiometer AA2 through resistor 816, and under the control of the wing flaps potentiometer WF3 through resistor 815 to control conductor 902 of the angle-of-climb motor unit and that these potentials were unmodified by the bank potentiometers BK10 and BK9. Now, however, with a bank angle the latter potentiometers decrease the potential as the bank angle increases. At the same time a potential of phase φ1 is derived by the movement of the slider of the bank potentiometer BK4 from its center tap position which potential increases as the rate of turn increases and as the bank angle increases. The outer terminals of potentiometer BK4 are connected over the upper Nos. 1 and 3 front contacts of relay 809 and conductors 832 and 833 with the sliders of rate of turn potentiometers RT3 and RT1, the windings of which latter potentiometers are bridged between the φ1 and φ2 bus bars and thus potentials of opposite phase are applied to the Nos. 1 and 3 terminals of bank potentiometer BK4 which vary with the rate of turn. This potential of phase φ1 derived at the slider of potentiometer BK4 is applied to control conductor 902 through resistor 829. The change in these potentials is additive to cause a reduction in the potential of phase φ1 on control conductor 902 which results in the motor 901 of the angle-of-climb motor unit rotating shaft 900 into a position representative of a reduction in the angle of climb.

The reduction in the angle of climb causes the rate-of-climb and altimeter motor units to readjust their shafts to positions representative of a slower rate of climb and a slower increase in altitude as indicated by the rate-of-climb indicators 1515 and 1715 and the altimeters 1517 and 1717 driven telemetrically by the shafts of the rate-of-climb and altimeter motor units.

Another effect of banking while climbing is to cause a potential of phase φ1 to be applied from the slider of the angle of climb potentiometer AC5 through the potential divider comprising resistor 843, the bank potentiometer BK7 and resistor 844 whereby the potential which is derived at the slider of bank potentiometer BK7 and applied through resistor 840 to control conductor 903 of the bank motor unit varies as the cosine of the angle of bank and as the angle of climb. This potential has the effect of causing the motor 906 of the bank motor unit to rotate shaft 907 into a position representative of an increase in the angle of the bank. This increase will be smaller the greater the angle of bank and will further decrease as the angle of climb decreases due to the bank.

A further result of the reduction of the angle of climb due to making a turn while climbing is to reduce the phase φ2 potential applied as previously described from the slider of the angle of climb potentiometer AC10, through resistor 804 to control conductor 1100 of the indicated air-speed motor unit. This reduction in drag potential causes the motor 1101 of the unit to move shaft 1102 into a position representative of a slight increase in air-speed. The indicated air-speed and angle of attack circuits now interact in the manner previously described until a stabilized condition is reached and the angle of climb motor unit becomes reset to a stabilized angle of climb and a steady rate of climb is indicated by the rate of climb indicators 1515 and 1715.

*Return to straight flight from a right turn*

It will be assumed that when the pilot has made a turn of a desired amount, he moves the stick 1600 to the left and depresses the left rudder pedal 1601 to its normal position. It will be assumed that at this time a level flight is being flown. The depression of the left rudder pedal moves the sliders of rudder potentiometers R1 and R2 to the center positions of their windings, whereby the potentials of phase φ1 derived in the manner previously described and applied through resistors 521 and 524 to control conductor 537 of the rate of turn motor unit are removed. The potential of phase φ2 applied from the slider of balancing potentiometer RT4 now becomes effective to cause the motor 516 to turn shaft 522 of the rate of turn motor unit back to its normal position whereupon the slider of potentiometer RT4 will be at the grounded center tap of its winding and the motor 516 will stop. Through the return of shaft 522 to its normal position, the rate of turn needles of the turn and bank indicators 1503 and 1703 will be operated to show a zero rate of turn.

The movement of the stick 1600 to the left moves the slider of aileron potentiometer AL toward the left or No. 3 terminal of its winding whereby potential of phase φ2 is applied over the circuit previously traced through resistor 904 to control conductor 903 of the bank motor unit. This potential causes the motor 906 to turn the shaft 907 of such unit towards its normal position. As this normal position is approached the horizon bars of the gyro horizon instruments 1510 and 1710 will become more level. When the pilot sees that the right bank angle has been reduced to zero and horizon bar of the gyro horizon instrument 1510 is level, he returns the stick to its neutral position in which the signal potential applied from the slider of potentiometer AL is removed and the motor 906 comes to rest. At this time the slider of bank potentiometer BK13 should be centered at the mid-tap position of its winding and the shaft 907 of the bank motor unit will be held in its normal or neutral position.

The return of the rate of turn and bank motor units to their normal positions causes the removal of control potential from control conductor 315 of the compass motor unit so that the shaft 317 thereof comes to rest and the remote indicating compasses 1591 and 1701 and the gyro compasses 1523 and 1723 come to rest except for the gyro drift imparted to the latter compasses by the continued operation of motor 323 of the compass unit.

Descent

A diving descent or a more gradual settling descent of the flight may be simulated in the trainer. It will first be assumed that the simulated flight is at a high altitude and that the pilot desires to descend rapidly. To do so he suddenly pushes the stick 1600 forward and holds it forward. This will result in the movement of the slider of elevator potentiometer E towards the No. 1 terminal of its winding thereby changing the potential applied over conductor 1602 through the winding of thrust potentiometer T9 from phase $\varphi 1$ to phase $\varphi 2$, and with the throttle still open and large engine thrust developed as represented by the position of the slider of thrust potentiometer T9 near the No. 3 terminal of its winding, the potential applied through resistor 1204 to control conductor 1302 of the angle of attack motor unit will be changed from a phase $\varphi 1$ to a phase $\varphi 2$ potential. As a result the motor 1303 of the angle of attack motor unit will drive the shaft 1304 from a position representative of a positive angle of attack to a position representative of a negative angle of attack or into a position in which the angle of attack potentiometer AA9 has been adjusted to apply a potential of phase $\varphi 1$ through resistor 1205 to control conductor 1302 which balances the signal potential.

The readjustment of the angle of attack potentiometers AA1 and AA7 now applies a much reduced drag potential of phase $\varphi 2$ through resistor 1230 to control conductor 1100 of the indicated air-speed motor unit whereupon the motor 1101 thereof rotates the shaft 1102 into a position representative of an increased air-speed which will be indicated by the air-speed indicators 1513 and 1713.

A further result of the change of the angle of attack to a negative value is the change in the potential applied through resistor 1236 to control conductor 1308 of the accelerometer motor unit from a phase $\varphi 1$ to a phase $\varphi 2$ potential whereupon the motor 1309 of that unit under the control of the angle of attack potentiometer AA8 drives the shaft 1310 into a position representative of a negative value of acceleration which will be indicated by the accelerometers 1521 and 1721. This negative acceleration indication will increase as the air-speed increases and the sliders of the air-speed variacs IA2 and IA8 move toward the No. 4 terminals of their windings and the signal potential of phase $\varphi 2$ applied through resistor 1236 to control conductor 1308 thereby increases.

With the change of the angle of attack to a negative value the potential applied to control conductor 902 of the angle of climb motor unit through resistor 816 changes under the control of the angle of attack potentiometer AA2 from a phase $\varphi 1$ to a phase $\varphi 2$ value, which increases as the air-speed increases due to the movement of the sliders of the variacs IA1 and IA7 toward the No. 4 terminals of their windings and with the increase in air-speed, the phase $\varphi 2$ potential applied to control conductor 902 through resistor 815 also increases with the result that motor 901 of the angle of climb motor unit rotates shaft 900 in a direction representative of a change of the angle of climb to a negative or dive value.

The change on the angle of climb to a negative value moves the slider of angle of climb potentiometers AC2 and AC8 towards the No. 3 terminals of their windings thereby changing the potentials applied through resistors 812 and 552 to control conductors 703 and 551 of the altimeter and rate of climb motor units from phase $\varphi 1$ to phase $\varphi 2$ potentials which increase as the true air-speed increases and the sliders of variacs TA1 and TA7 move toward the No. 4 terminals of their windings. As previously described the true air-speed motor unit is controlled to assume a position representative of an increase in true air-speed as the indicated air-speed increases. In response to the application of phase $\varphi 2$ signal potential to control conductor 551 of the rate of climb motor unit, the motor 564 thereof rotates the shaft 554 into a position representative of a negative rate of climb or dive and the rate of climb indicators 1515 and 1715 controlled thereby therefore show a negative rate of climb. In response to the application of phase $\varphi 2$ signal potential to control conductor 703 of the altimeter motor unit, the motor 702 thereof rotates shaft 710 in a direction representative of a rapidly decreasing altitude which will be indicated by the altimeters 1517 and 1717 controlled from such shaft.

With the change in angle of attack the potential now applied under the control of angle of attack potentiometer AA4 through resistor 834 to control conductor 303 of the pitch bar motor circuit becomes phase $\varphi 2$ and the potential applied under the control of the angle of climb potentiometer AC1 through resistor 857 to control conductor 303 also becomes phase $\varphi 2$ and the motor 304 of such unit therefore rotates shaft 314 in a direction representative of a nose-down condition and the horizon bars of the gyro horizon instruments 1519 and 1719 are thereupon controlled by the movement of shaft 314 to show such nose-down condition.

As the indicated air-speed increases the movement of the sliders of the indicated air-speed variacs IA7 and IA8 toward the No. 4 terminals of their windings will increase the potentials of phase $\varphi 2$ applied through resistor 1230 under the control of angle of attack potentiometers AA1 and AA7 and through resistor 1227 under the control of landing gear potentiometer LG10 and wing flaps potentiometer WF1 over the circuits previously traced to control conductor 1100 of the indicated air-speed motor unit, since at the high speed the drag effects imposed by the wings and the wing flaps will materially increase. However, with the negative or diving angle of climb represented by the position of the slider of angle of climb potentiometer AC10, a thrust potential of phase $\varphi 1$ will be applied through resistor 804 to conductor 1100 which will assist the thrust potential applied from the thrust variac T7 through resistor 1403, so that the net result will be to cause the motor 1101 to rotate shaft 1102 of the indicated air-speed motor unit to a position representative of a further increase in air-speed which will be shown by the air-speed indicators 1513 and 1713.

To come out of the dive the pilot pulls back on the stick 1600 thereby moving the slider of elevator potentiometer E to a position in which potential of phase $\varphi 1$ is applied through resistor 1204 to control conductor 1302 of the angle of attack motor unit and such unit moves its shaft 1304 into a position representative of a positive angle of attack. The readjustment of the angle of attack potentiometers AA1 and AA7 now applies an increased drag potential of phase $\varphi 2$ through resistor 1230 to control conductor 1100 of the indicated air-speed motor unit which increase will be large because of the high air-speed setting of the indicated air-speed variacs IA7 and IA8, since the wings will now have a much higher drag effect. This potential will cause the motor 1101 of the indicated air-speed motor unit to rotate shaft 1102 in a direction representative of a reduction in air-speed which will be indicated by the air-speed indicators 1513 and 1713.

As a further result of the change of the angle of attack to a positive value, the potential applied through resistor 1236 to control conductor 1308 of the accelerometer motor unit will change from a phase $\varphi 2$ to phase $\varphi 1$ potential whereupon the motor 1309 of such unit, under the control of the angle of attack potentiometer AA8, drives the shaft 1310 into a position representative of a positive value of acceleration which will be indicated by the accelerometers 1521 and 1721. This positive value of acceleration will decrease as the indicated air-speed decreases and the sliders of the air-speed variacs IA2 and IA8 move toward the No. 2 terminals of their windings and the signal potential of phase $\varphi 1$ applied through resistor 1236 to control conductor 1308 decreases.

With the change of the angle of attack to a positive value, the potential applied to control conductor 902 of the angle of climb motor unit through resistor 816 changes under the control of the angle of attack potentiometer AA2 from a phase $\varphi 2$ to a phase $\varphi 1$ potential which decreases as the air-speed decreases due to the movement of the sliders of the variacs IA1 and IA7 toward the No. 2 terminals of their windings, and with the decrease in air-speed and phase $\varphi 2$ potential applied to control conductor 902 through resistor 815 also decreases with the result that the motor 991 of the angle of climb motor unit rotates shaft 900 in a direction representative of a change of the angle of climb to a positive or climb value.

The change in the angle of climb to a positive value moves the sliders of angle of climb potentiometers AC2 and AC8 toward the No. 1 terminals of their windings thereby changing the potentials applied through resistors 812 and 552 to control conductors 703 and 551 of the altimeter and rate of climb motor units from phase $\varphi 2$ to phase $\varphi 1$ potentials which decrease as the true air-speed decreases and the sliders of the true air-speed variacs TA1 and TA7 move toward the No. 2 terminals of their windings. In response to the application of phase $\varphi 1$ signal potential to control conductor 551, the motor 564 rotates shaft 554 of the rate of climb motor unit into a position representative of a positive rate of climb which will be indicated by indicators 1515 and 1715. In response to the application of phase $\varphi 1$ potential to control conductor 703 of the altimeter motor unit, the motor 702 thereof rotates shaft 710 in a direction and at a speed representative of an increasing altitude which will be indicated by altimeters 1517 and 1717.

With the change in angle of attack to a positive value, the potential now applied under the control of angle of attack potentiometer AA4 through resistor 834 to control conductor 303 of the pitch bar motor unit becomes phase $\varphi 1$ and the potential applied under the control of the angle of climb potentiometer AC1 through resistor 857 to control conductor 303 also becomes phase $\varphi 1$. The motor 304 of such unit therefore rotates shaft 314 in a direction representative of a nose-up condition and the horizon bars of the gyro horizon instruments 1510 and 1710 are thereby controlled to show such nose-up condition.

As the indicated air-speed decreases the movement of the sliders of the indicated air-speed variacs IA7 and IA8 towards the No. 2 terminals of their windings will decrease the potentials of phase $\varphi 2$ applied through resistors 1230 and 1227 to control conductor 1100 of the indicated air-speed motor unit but, at the same time with a positive angle of climb, the potentiometer AC10 will apply a drag potential of phase $\varphi 2$ through resistance 804 to control conductor 1100 which will oppose the thrust potential of phase $\varphi 1$ applied from the thrust variac T7 through resistor 1401, with the result that the motor 1101 of the indicated air-speed motor unit will now drive shaft 1102 to a position representative of a further reduction in air-speed which will be shown by the air-speed indicators 1513 and 1713.

It will now be assumed that the flight is in a position in which the pilot desires to simulate a descent for landing. To descend the pilot now closes the throttle thereby reducing the engine thrust which will be represented in the trainer by the movement of the sliders of the thrust variacs T7 and T8 and thrust potentiometer T9 toward the No. 1 terminals of their windings. The elevator trim wheel 1656 is now adjusted in an up direction until the indicated air-speed becomes, for example, 200 knots. The reduction in the thrust potential applied from the sliders of thrust variacs T7 and T8 through the elevator trim potentiometers ET1 and ET2 causes a reduction of the potential applied to the terminals of the elevator potentiometer E and the adjustment of the sliders of the trim potentiometers ET1 and ET2 will cause a reduction in the phase $\varphi 1$ potential applied through resistor 1204 to control conductor 1302 of the angle of attack motor unit. This will cause the motor 1303 of such unit to rotate shaft 1304 in a direction representative of a reduction in the angle of attack but this angle of attack will still remain slightly positive.

The reduction in engine thrust, as represented by the movement of the slider of the thrust variac T7 toward the No. 1 terminal of its winding, results in a large reduction of the phase $\varphi 1$ potential applied through resistor 1403 to control conductor 1100 of the indicated air-speed motor unit and the closing of the throttle will through the throttle rheostat TR5 increase the drag potential of phase $\varphi 2$ applied through resistor 1012 to control conductor 1100. At the same time the reduction of the angle of attack will through the resetting of the sliders of angle of attack potentiometers AA1 and AA7 reduce the drag potential of phase $\varphi 2$ applied through resistor 1230 to conductor 1100 and, as the angle of climb becomes negative, a thrust potential of phase $\varphi 1$ will be applied under the control of the angle of climb potentiometer AC10 through resistor 804 to conductor 1100 as will be later described. The reduction of the thrust potential of phase $\varphi 1$ by the thrust variac T7 will, however, be controlling at this time and cause motor 1101 of the indicated air-speed motor unit to be effective to reduce the air-speed to the desired 200 knots.

The reduction in the indicated air-speed, as represented by the movement of sliders of variacs IA1 and IA7 toward the No. 2 terminals of their windings, causes a reduction of the potential of phase $\varphi 2$ applied through resistor 815 to control conductor 902 of the angle of climb motor unit and in addition the reduction of the angle of attack, as represented by the movement of the slider of potentiometer AA2 towards the ground tap position of its winding, causes a reduction of the phase $\varphi 2$ potential applied through resistor 816 to control conductor 902 which reduction is further augmented as the air-speed decreases. At the same time, the movement of the slider of true air-speed potentiometer TA2 towards the No. 1 terminal of its winding as the air-speed decreases, increases the potential of phase $\varphi 1$ applied through resistor 824 to control conductor 902 to such an extent that, with the air-speed reduced to 200 knots and with the slight positive angle of attack, the phase $\varphi 1$ potential on conductor 902 is greater than the summation of the phase $\varphi 2$ potentials and the motor 901 of the angle of climb motor unit will therefore rotate shaft 900 in a direction representative of a negative angle of climb.

With a negative angle of climb the angle of climb potentiometers AC8 and AC2 will control the rate of climb and altimeter motor units in the manner previously described so that the rate of climb indicators 1515 and 1715 will show a negative rate of climb and the altimeters 1517 and 1717 will show a decreasing altitude.

*Approach and landing*

When the altimeter reading has decreased to 2,000 feet, the throttle is opened until the manifold pressure indicators read 16 inches of mercury and the elevator trim wheel 1656 is adjusted in the nose-up direction. The operation of the trim wheel causes an increase in the phase $\varphi 1$ potential applied through resistor 1204 to control conductor 1302 of the angle of attack motor unit which thereupon responds to rotate the shaft 1304 into a position representative of an increase of angle of attack. This increase in angle of attack through the potentiometers AA1, and AA7 reduces the phase $\varphi 2$ wing drag potential applied through resistor 1230 to control conductor 1100 of the indicated air-speed motor unit whereupon the air-speed becomes reduced to about 120 knots.

The wing flaps control is now operated to the "Down" position resulting in the operation of the wing flaps motor unit of Fig. 14 into a position representative of the lowering of the wing flaps in the manner fully disclosed in the Pearsall Patent 2,519,698. With the wing flaps down the sliders of wing flaps potentiometers WF1 to WF4, inclusive, will be at the No. 3 terminals of their windings. With the slider of potentiometer WF1 at the No. 3 terminal of its winding, the drag potential of phase $\varphi 2$ applied through resistor 1227 to control conductor 1100 of the indicated air-speed motor unit becomes increased resulting in the operation of motor 1101 of such unit to rotate shaft 1102 in a direction representative of a further reduction of air-speed incident to the braking effect of the lowered wing flaps. The pilot will then pull back on the stick 1600 to increase the angle of attack thereby increasing the drag potential of phase $\varphi 2$ applied under control of the angle of attack potentiometers AA1 and AA7 through resistor 1230 to control conductor 1100 until the indicated air-speed motor unit operates to cause the air-speed indicators 1513 and 1713 to show the air-speed reduced to about 100 knots.

The pilot then operates the landing gear control to the "Down" position whereupon the landing gear motor unit of Fig. 14 is operated to a position representative of the condition in which the landing gear is down and locked. This condition is represented by the operation of the LGD relay 1400 and the adjustment of the sliders of potentiometers LG7 to LG11 inclusive, to the No. 3 terminals of their windings. The movement of the sliders of potentiometers LG10 and LG11 further reduces the drag potential of phase $\varphi 2$ applied through resistor 1227 to control conductor 1100 of the indicated air-speed motor unit resulting in the operation of such unit in a manner representative of a further reduction in air-speed to about 80 knots as will be indicated by the air-speed indicators 1513 and 1713.

With the stick 1600 held in position to produce the increased angle of attack, the potential of phase $\varphi 2$ applied under the control of angle of attack potentiometer AA2 through resistor 816 to control conductor 902 is increased but, with the indicated air-speed decreased to 80 knots, the potential phase $\varphi 1$ applied under the control of the true air-speed potentiometer TA2 through resistor 824 to conductor 902 is increased so that the summation potential of phase $\varphi 1$ appearing on the control conductor 902 is decreased thereby causing the motor 901 of the angle of climb motor unit to rotate shaft 900 to a position representative of a decrease in the negative angle of climb. With the reduction in the negative angle of climb the rate of climb motor unit is controlled in the manner previously described to show a reduction in the negative rate of climb which is indicated by the rate of climb indicators 1515 and 1715 as about 300 feet per minute down. The altimeter motor unit is also controlled from the angle of climb motor unit to control the altimeters 1517 and 1717 to show a more slowly decreasing altitude.

As soon as the altimeter reading reaches zero the pilot closes the throttle. With the altitude at zero the L1 and L3 limit switches 701 and 700 of the altimeter motor unit operate to their alternate positions thereby causing the reoperation of the GRD, GRD1, GRD2 and GRD3 relays 1000, 1202, 1203 and 805 and the release of the F and F1 relays 1013 and 1014. The GRD relay 1000 over its lower Nos. 4 and 5 contacts connects phase $\varphi 1$ and $\varphi 2$ potentials over conductors 827 and 828 to the terminals of the winding of the angle of climb balancing potentiometer AC4 which results in the application of a balancing potential through resistor 826 to control conductor 902 of the angle of climb motor unit which causes the motor thereof to bring the sliders of all potentiometers controlled thereby to the center positions of their windings. With the GRD3 relay 805 operated, ground is connected over the upper No. 2 contacts of such relay through resistor 552 to control conductor 551 of the rate of climb motor unit whereupon the balancing potentiometer RC7 causes the motor 564 to return the shaft of such unit to its normal position in which position the rate of climb indicators 1515 and 1715 will show a zero rate of climb.

Relay 1014 being slow to release will maintain the application of phase $\varphi 1$ potential from the slider of indicated air speed variac IA2 through resistors 1237 and 1236 to the control conductor 1308 of the accelerometer motor unit for a short interval after relay 1013 has released and permitted the application of phase φ1 potential to conductor 1308 through resistor 1238 thereby adding the positive acceleration potentials through resistors 1236 and 1237 to that through resistor 1238 to create a momentary increase in the readings of the accelerometers 1521 and 1721 at the instant of landing.

With the landing gear down, as represented by the energization of the LGD relay 1400, and the F relay 1013 released, the thrust potential of phase φ1 applied under the control of the thrust variac T7 through resistor 1403 to control conductor 1100 of the indicated air-speed motor unit is again effective but with the engine throttled down and the slider of thrust variac T7 near the No. 1 terminal of its winding, this potential is so reduced that the drag potentials applied through resistors 1012, 1230 and 1227, representative of the drags due to low propeller speed, due to angle of attack of the wings and lowered landing gear and wing flaps, are effective to cause the indicated air-speed motor unit to function in a manner representative of a further reduction of air-speed. To reduce the air-speed to zero in simulation of the arresting of the rolling movement of an airplane on landing, the pilot may apply the brakes evenly thus moving the sliders of both potentiometers RB1 and LB1 toward the No. 3 terminals of their windings. With the GRD relay 1000 operated, potential is applied from the φ2 bus bar, over the upper No. 2 contacts of relay 1000, over conductor 1041, through resistor 1682 and through the winding of the brake potentiometer LB1 and in parallel from conductor 1041 through resistor 1683 and through the winding of brake potentiometer RB1, and thence through resistor 1684 to ground. Potentials of phase φ2 derived at the sliders of these potentiometers are applied through resistors 1685 and 1686, conductor 1687 and through resistor 1115 to control conductor 1100 of the indicated air-speed motor unit. The value of this potential applied by the depression of the brake pedals will be sufficient to completely overcome the thrust potential of phase φ1 and the motor of the indicated air-speed motor unit will come to rest when the L1 limit switch 1103 operates. The air-speed indicators 1513 and 1713 will now show a zero air-speed.

Upon the release of the GRD relay 1000 and the GRD2 relay 1203 and the reduction of the air-speed to zero the angle of attack motor unit is controlled in the manner previously described to represent the attitude of an airplane with all of its landing wheels on the ground, that is, with the sliders of the potentiometers adjusted to a position representative of an angle of attack of about +8 degrees or until the L3 relay 1231 is operated. With relay 1201 and the GRD1 relay 1202 both operated the LS relay 1318 of the angle of attack motor unit is now energized over a circuit from ground over the lower front contacts of relays 1201 and 1202, over conductor 1254, over the lower back contact of the RV1 relay 1319 of the angle of attack motor unit and through the winding of LS relay 1318 to battery. Relay 1318 thereupon operates to stop the motor 1303.

If a landing is simulated in which the landing wheels are in the up position or not fully down, in which situation the LGD relay 1400 will not be operated, then when the GRD relay 1000 operates to simulate the grounded condition of the flight, a heavy drag potential of phase φ2 will be applied over the upper No. 2 contacts of relay 1000, over conductor 1006, over the upper No. 3 back contact of the LGD relay 1400, over conductor 1224 and through resistor 1225 to control conductor 1100 of the indicated air-speed motor unit and with the thrust potential of phase φ1 from the thrust variac T7 removed by the release of the F relay 1013, the indicated air-speed motor unit causes a rapid reduction in the air-speed as shown by the air-speed indicators 1513 and 1713 in simulation of a crash landing.

If during landing the pilot desires to simulate the turning of an airplane while it is taxiing to its revetment, he will press on one of the brake pedals. For example if he desires to simulate a left turn he will press on the left brake pedal thereby moving the slider of brake potentiometer LB2 to the No. 3 terminal of its winding. With the flight assumed to be grounded and GRD relay 1000 therefore operated potentials of phases φ1 and φ2 derived at the sliders of the indicated air-speed variacs IA2 and IA3 and at the sliders of the thrust variacs T7 and T8 will be added and applied over the lower Nos. 2 and 3 contacts of relay 1000, over conductors 1034 and 1044, through the windings of potentiometers RB2 and LB2 to ground. With the slider of potentiometer LB2 assumed to be at the No. 3 terminal of its winding, potential of phase φ2 will be applied therefrom through resistor 1669, over conductor 1670 and through resistor 525 to control conductor 537 of the rate of turn motor unit. This will result in the motor 564 turning the shaft 554 in a direction representative of a left turn as will be indicated by the rate-of-turn indicators 1503 and 1703.

At the same time the left brake potentiometer LB1 will in the manner previously described apply potential of phase φ2 to control conductor 1100 of the indicated air-speed motor unit to cause a reduction in the indicated air-speed.

*Operation of the flight recorder*

For the purpose of recording the simulated flight which is conducted in response to directions given by the instructor, a flight recorder 1750 is provided at the instructor's desk which is capable of movement over a chart placed on the upper surface of the desk. To start the flight recorder the instructor operates the switch 1725 which is effective to cause the operation of the FR relay 1726 as soon as there is simulated flight. The circuit of relay 1726 may be traced from battery through its winding, over contacts of key 1725, over conductor 1727 and over the upper No. 3 contacts of the F relay 1013 to ground.

The ground speed of an airplane in flight is determined by the true air-speed as modified by the effects of the wind velocity, and the direction of the actual track of the airplane is determined by the bearing of the airplane as modified by the wind direction. In the trainer the true air-speed of the simulated flight is determined by the true air-speed motor unit of Figs. 10 and 11 as previously described which is instrumental in positioning the shaft 1111 and thus adjusting variac TA7 in accordance with the true air-speed. The bearing of the simulated flight, as determined by the steering controls of the trainer is determined by the compass motor unit of Fig. 3 which is instrumental in positioning the shaft 317 and through gears 331 and 332 in positioning the rotor of the rotatable transformer 330. The winding of the variac TA1 is energized from the φ2 bus bar and potential of φ2 derived at its slider is applied over conductor 418 and through the rotor winding of transformer 330 to ground. The rotation of the rotor of this transformer by the compass motor unit causes a variation of potential induced into its two stator windings in a measure proportional to the rate of change of the compass bearing and causes the strength of such potential to be varied proportionally to the change in the true air-speed.

Since the track of the simulated flight is determined not only by the air-speed and flight bearing but also by the wind velocity and direction, provision is also made for introducing these factors into the control of the flight recorder. For this purpose the variac WV, the slider of which is adjustable in accordance with the assumed wind velocity, and a wind direction rotatable transformer WD, the rotor of which is rotatable in accordance with the assumed wind direction, are provided at the instructor's desk. Potential of phase φ2 is applied from bus bar φ2 through the winding of calibrating variac CAL and potential derived at its slider is applied to the winding of variac WV, the potential derived in the slider of the latter variac being applied through the rotor winding of the transformer WD. The adjustment of the slider of the variac WV and the rotation of the rotor of the transformer WD cause a variation of the potentials induced into the two stator windings of the transformer WD in a measure proportional to the change in the wind direction and cause a change in the strength of such potential proportionally to the change in the wind velocity.

The stator windings of the transformers WD and 330 are connected in multiple with the corresponding stator windings of the control transformers GT and GS of the ground track motor unit of Fig. 2. The right terminals of the horizontal stator windings of transformers WD and 330 are connected together over conductor 1728 and to ground. The right terminals of the horizontal stator windings of transformers GT and GS are also connected to ground. The left terminal of the horizontal stator winding of transformer WD is connected over conductor 1729 through resistor 334 to conductor 337 and the left terminal of the horizontal stator winding of transformer 330 is also connected through resistor 333 to conductor 337, which in turn is connected through resistors 211 and 212 to the left terminals of the stator windings of control transformers GS and GT. The upper terminals of the vertical stator windings of transformers WD and 330 are connected together over conductor 1731 and to ground. The upper terminals of the vertical stator windings of transformers GT and GS are also connected to ground. The lower terminal of the vertical stator winding of transformer WD is connected over conductor 1730 through resistor 336 with conductor 338 and the lower terminal of the vertical stator winding of transformer 330 is also connected through resistor 335 to conductor 338, which is connected through resistors 213 and 214 with the lower terminals of the vertical stator windings of transformers GS and GT whereby the potentials in the corresponding stator windings of transformers WD and 330 are added and applied to the corresponding stator windings of the control transformers. The rotors of the control transformers are driven through gears from the shaft 210 of the ground track unit, which is driven through the reduction gear box 215 and the gears 216 and 217 by the servomotor M2. The gear trains which drive the rotors of transformers GS and GT have the same ratio and therefore the rotors are driven at the same speed but they are positioned in quadrature with respect to each other.

The addition and distribution of potentials through the resistors 333 to 336, inclusive, and 211 through 214, inclusive, cause the currents in the transformer circuits to be limited and a phase shift of practically 90 degrees from the initial potential applied to the input of the ground track motor control circuit of Fig. 1 to be attained. This phase shift is necessary for the operation of the two-phase motor M2 connected to the output of the ground track motor control circuit.

The potential induced into the rotor winding of the control transformer GT is applied over conductors 218 and 219 to the input circuit of the amplifier circuit AMP1 comprising the two voltage amplifier tubes VT1 and VT2 connected in cascade, a dual triode tube VT3, one unit of which serves to invert a portion of the output of the other unit thereof, and two amplifier tubes VT4 and VT5 connected in push-pull relationship between the output circuits of tube VT3 and the primary windings of the output transformer 100.

Filament heating current is supplied to the tubes of amplifier AMP1 and to the corresponding tubes of amplifier circuit AMP2 from the secondary windings S1 and S2 of the power transformer 101, the primary winding P1 of which is energized from the 115-volt alternating current bus bar 501 when the switch 102 is closed. Plate potentials for the amplifier tubes VT4 and VT5 and the corresponding tubes of amplifier circuit AMP2 are supplied from the secondary winding S3 of transformer 101 through rectifier tube VT6, and screen grid potential is supplied to the tubes VT4 and VT5 and to the corresponding tubes of amplifier circuit AMP2 through the rectifier tube VT6 and the rheostat 103. The filaments of the rectifier tube VT6 are heated by current supplied through the secondary winding S4 of transformer 101. Plate potential for tubes VT1, VT2 and VT3 and the corresponding tubes of amplifier circuit AMP2 is supplied from the plate battery 104.

The potential amplified by the amplifier circuit AMP1 and impressed upon the primary windings of output transformer 100 is applied from the secondary winding of such transformer over conductors 105 and 106 across the control phase winding of the stator of servomotor M2, the other stator winding of which motor is energized in series with the corresponding stator winding of servomotor M1 over a circuit from ground therethrough to the φ2 bus bar. So long as there is an output potential from the amplifier circuit AMP1, both phase windings of motor M2 will be energized and the motor will operate, rotating the shaft 210 at a slow speed in one direction or the other dependent upon the polarity of the potential received from the rotor winding of the control transformer GT with respect to the instant polarity of the potential applied to the other phase winding of motor M2. The rotation of shaft 210 results in the rotation of the rotor of control transformer GT until it assumes a position in which the potential induced into its rotor winding becomes zero at which time the control phase winding of motor M2 receives no potential and the motor comes to rest.

To prevent the inertia of the motor unit from causing the motor M2 to oscillate or hunt before a balance is reached, the motor M2, through the gears 217, 216 and 220 drives a second two-phase induction motor G2 as a generator which feeds back potential from one of its stator windings over conductors 221 and 222 into the input of the amplifier circuit AMP1 of such phase that it stabilizes the operation of the motor M2. The other stator winding of generator G2 is energized over conductors 223 and 224 by power supplied from the secondary winding S1 of power transformer 101.

The rotation of shaft 210 also through the gears 205 and 206 drives the rotor of synchro-transmitter 207, the rotor winding of which is connected over conductors 225 and 226 with the secondary winding of power transformer 1507 and the stator windings of which are connected over conductors 225, 227 and 228 with the corresponding stator windings of the synchro-receiver 1707 which orients the steering wheels of the flight recorder 1750 of Fig. 17. The rotor winding of the receiver 1707 is also energized over conductors 225 and 226 from the secondary winding of the transformer 1507. This synchro-receiver is thus controlled by the synchro-transmitter 207 to orient the steering wheels of the flight recorder in accordance with the true track of the simulated flight course.

At the time the rotor of control transformer GT is rotating to a position in which the potential induced into its winding is reduced to zero, the rotor of control transformer GS being mounted in quadrature with respect to the rotor of transformer GT receives an increasing induced potential from its associated stator windings. This potential is applied over conductors 229 and 230 across the input side of the amplifier circuit AMP2, is amplified thereby and impressed through the output transformer 107 and over conductors 108 and 109 across the control phase stator winding of the servomotor M1. The other phase stator winding of the motor is supplied with potential from the $\varphi 2$ bus bar. The motor therefore operates and through the gears 231 and 232, reduction gear box 201 and gears 202 and 203 rotates the rotor of the synchro-transmitter 200.

The motor M1 will rotate the rotor of transmitter 200 in one or the other direction dependent upon the polarity of the potential received from the rotor winding of transformer GS as amplified by the amplifier circuit AMP2 and impressed upon the control phase winding of motor M1 with respect to the instant polarity of the potential applied to the other phase winding of the motor. This polarity difference will in turn depend upon whether the summation of the movements of the rotors of transformers WD and 330 are in one or the other sense. The motor M1 will run as long as air-speed is maintained. In order to provide stable speed control for this motor a second motor G1 is geared thereto through gears 231, 232 and 233 and runs as a generator to feedback potential from one of its stator windings over conductors 234 and 229 to the input of the amplifier circuit AMP2 which potential is approximately 180 degrees out of phase with the control signal applied to such input. The other stator winding of this motor is energized from the secondary winding of power transformer 110, over conductors 236 and 237. If the motor M1 speeds up a larger feedback potential is generated. This reduces the total input signal and the motor slows down. If the motor slows down, the reverse action is true. In this way very stable speed control is secured. Resistor 111 and condenser 112 are used to secure the proper phase shift for the feedback potential, and potentiometer CAL1 is used to calibrate the system.

As the rotor of synchro-transmitter 200 rotates, the rotor winding of which is energized over conductors 225 and 226 from the secondary winding of transformer 1507, varying potentials are induced into its stator windings which are connected over conductors 225, 238 and 239 and over contacts of the FR relay 1726 with the corresponding stator windings of the synchro-receivers 1705 and 1706. The rotor windings of these receivers are energized over a circuit including contacts of relay 1726 and conductors 225 and 226 connected with the secondary winding of transformer 1507. With varying potentials applied to the stator windings of the synchro-receivers, the rotors of such receivers synchronously follow the rotation of the rotor of transmitter 200 and through suitable gearing drive associated tractor wheels of the flight recorder 1750. The flight recorder therefore advances at a speed commensurate with the true air-speed of the simulated flight as modified by the direction of the assumed wind.

*Rough air*

The instructor may cause the simulation of rough air conditions by closing the rough air key 1732 and adjusting the rough air intensity control at his desk. The closure of the key establishes a circuit from ground over the inner upper contacts of such key, over conductor 1733, over the lower No. 3 contacts of the AS relay 1007 and over conductor 1042 to the rough air motor control unit 208 of Fig. 2 which results in the starting of the driving motors of the rough air unit in the manner fully disclosed in the Germanton Patent 2,460,743 previously referred to. The adjustment of the intensity control adjusts the sliders of potentiometers RA1 and RA2, the windings of which are energized from the $\varphi 1$ and $\varphi 2$ bus bars, respectively, through resistors 1734 and 1735. The potentials of phase $\varphi 2$ and $\varphi 1$ derived at the sliders of these potentiometers are applied over contacts of key 1732 and over conductors 1736 and 1737 to the rough air motor unit 208 and are distributed through the operation of the motor unit over conductor 412 and through resistor 411 to control conductor 537 of the rate of turn motor unit; over conductor 209 and through resistor 615 to control conductor 903 of the bank motor unit; and over conductor 240 and through resistor 1255 to control conductor 1302 of the angle of attack motor unit. These random impulses which may be phase $\varphi 1$ or $\varphi 2$ change the bank angle, the rate of turn and the angle of attack, the angle of attack in turn controlling the rate of climb.

What is claimed is:

1. In an aircraft trainer wherein the flight operations of an airplane are simulated, simulated landing wheel brake pedals, a source of current, a control conductor, means for deriving a potential from said source commensurate with the simulated thrust of the airplane propeller and for applying it to said conductor, a relay operable to simulate the landed position of the airplane, potentiometers controlled respectively by said brake pedals for deriving potentials from said source opposite in polarity to said first potential and commensurate with the braking effect applied by said pedals and for applying said potential to said conductor if said relay has been operated, a motor responsive to the summation of the potentials applied to said conductor, an instructor's desk and instruments at the pilot's station in said trainer and at said desk controlled by said motor for indicating the simulated indicated air-speed of the simulated flight.

2. In an aircraft trainer wherein the flight operations of an airplane are simulated, a relay operable in simulation of the extended and locked position of the landing gear of an airplane, a source of current, a control conductor, means for deriving a potential from said source commensurate with the simulated thrust of the airplane propeller and for applying it to said conductor, a relay operable to simulate the landed position of the airplane, a circuit effective to apply a potential from said source to said conductor opposite in polarity to said first potential if said first relay is not operated and said second relay is operated in simulation of the crash landing of an airplane, a motor responsive to the summation of the potentials applied to said conductor, an instructor's desk and instruments at the pilot station in said trainer and at said desk controlled by said motor for indicating the simulated indicated air-speed of the simulated flight.

3. In an aircraft trainer wherein the flight operations of an airplane are simulated, a source of current, a control conductor, means for deriving a potential from said source commensurate with the simulated thrust of the airplane propeller, a relay operable in simulation of the extended and locked position of the landing gear of an airplane for applying said potential to said conductor, a relay operable in simulation of an airborne condition of an airplane for continuing the application of said potential to said conductor following the simulation of the retraction of the landing gear as represented by the release of said first relay, means for deriving potentials from said source opposite in polarity to said first potential in simulation of the drag effects imposed in an airplane against the production of air-speed and for applying said potentials to said conductor, a motor responsive to the summation of the potentials applied to said conductor, an instructor's desk and instruments at the pilot's station in said trainer and at said desk controlled by said motor for indicating the simulated indicated air-speed of the simulated flight.

4. In an aircraft trainer wherein the flight operations of an airplane are simulated, a source of current, a control conductor, means for deriving a potential from said source commensurate with the simulated thrust of the airplane propeller and for applying it to said conductor, a relay operable to simulate the chocked condition of the landing wheels of the airplane, a relay operable to simulate the grounded condition of the airplane, a circuit established when both of said relays are operated for applying a potential from said source opposite in polarity to said first potential in simulation of the drag effect opposing the development of air-speed when the landing wheels are chocked, a motor responsive to the summation of the potentials applied to said conductor, an instructor's desk and instruments at the pilot's station in said trainer and at said desk controlled by said motor for indicating the simulated indicated air-speed of the simulated flight.

5. In an aircraft trainer wherein the flight operations of an airplane are simulated, a source of current, a control conductor, means for deriving a potential from said source commensurate with the simulated thrust of the airplane propeller and for applying it to said conductor, a simulated throttle control, a rheostat operable thereby for deriving a potential from said source opposite in polarity to said first potential when said throttle is less than half open and for applying said potential to said conductor in simulation of the drag effect opposing the development of air-speed due to low propeller power, a motor responsive to the summation of the potentials applied to said conductor, an instructor's desk and instruments at the pilot's station in said trainer and at said desk controlled by said motor for indicating the simulated indicated air-speed of the simulated flight.

6. In an aircraft trainer wherein the flight operations of an airplane are simulated, a source of current, a control conductor, means for deriving a potential from said source commensurate with the simulated thrust of the airplane propeller and for applying it to said conductor, means for deriving a potential from said source opposite in polarity to said first potential and for applying it to said conductor, which latter potential increases as the simulated indicated air-speed of the simulated flight increases and varies in accordance with the simulated position of the landing gear, a motor responsive to the summation of the potentials applied to said conductor, an instructor's desk and instruments at the pilot's station in said trainer and at said desk, controlled by said motor for indicating the simulated indicated air-speed of the simulated flight.

7. In an aircraft trainer wherein the flight operations of an airplane are simulated, a source of current, a control conductor, means for deriving a potential from said source commensurate with the simulated thrust of the airplane propeller and for applying it to said conductor, means for deriving a potential from said source opposite in polarity to said first potential which varies directly as the square of the simulated indicated air-speed of the simulated flight, means for modifying said latter potential in accordance with the simulated position of the landing gear of the airplane and for applying said modified potential to said conductor, whereby the drag effect imposed by the landing gear against the production of air-speed is simulated, a motor responsive to the summation of the potentials applied to said conductor for controlling said second-named means, an instructor's desk and instruments at the pilot's station in said trainer and at said desk controlled by said motor for indicating the simulated indicated air-speed of the simulated flight.

8. In an aircraft trainer wherein the flight operations of an airplane are simulated, a source of current, a control conductor, means for deriving a potential from said source commensurate with the simulated thrust of the airplane propeller and for applying it to said conductor, means for deriving a potential from said source opposite in polarity to said first potential and for applying it to said conductor, which latter potential increases as the simulated indicated air-speed increases and varies in accordance with the simulated position of the wing flaps, a motor responsive to the summation of the potentials applied to said conductor, an instructor's desk and instruments at the pilot's station in said trainer and at said desk controlled by said motor for simulating the simulated indicated air-speed of the simulated flight.

9. In an aircraft trainer wherein the flight operations of an airplane are simulated, a source of current, a control conductor, means for deriving a potential from said source commensurate with the simulated thrust of the airplane propeller and for applying it to said conductor, means for deriving a potential from said source opposite in polarity to said first potential which varies directly as the square of the simulated indicated air-speed of the simulated flight, means for modifying said latter potential in accordance with the simulated position of the wing flaps of the airplane and for applying said modified potential to said conductor, whereby the drag effects imposed by the wing flaps opposing the development of air-speed is simulated, a motor responsive to the summation of the potentials applied to said conductor for controlling said second-named means, an instructor's desk and instruments at the pilot's station in said trainer and at said desk controlled by said motor for indicating the simulated indicated air-speed of the simulated flight.

10. In an aircraft trainer wherein the flight operations of an airplane are simulated, a source of current, a control conductor, means for deriving a potential from said source commensurate with the simulated thrust of the airplane propeller and for applying it to said conductor, means for deriving a potential from said source opposite in polarity to said first potential and for applying it to said conductor, which latter potential increases as the simulated indicated air-speed increases and varies in accordance with the simulated position of the engine cowl flaps, a motor responsive to the summation of the potentials applied to said conductor, an instructor's desk and instruments at the pilot's station in said trainer and at said desk controlled by said motor for simulating the indicated air-speed of the simulated flight.

11. In an aircraft trainer wherein the flight operations of an airplane are simulated, a source of current, a control conductor, means for deriving a potential from said source commensurate with the simulated thrust of the airplane propeller and for applying it to said conductor, means for deriving a potential from said source opposite in polarity to said first potential which varies directly as the square of the simulated indicated air-speed of the simulated flight, means for modifying said latter potential in accordance with the simulated position of the engine cowl flaps of the airplane and for applying said modified potential to said conductor, whereby the drag effect imposed by the cowl flaps in opposition to the production of air-speed is simulated, a motor responsive to the summation of the potentials applied to said conductor for controlling said second-named means, an instructor's desk and instruments at the pilot's station in said trainer and at said desk controlled by said motor for indicating the simulated indicated air-speed of the simulated flight.

12. In an aircraft trainer wherein the flight operations of an airplane are simulated, a source of current, a control conductor, means for deriving a potential from said source commensurate with the simulated thrust of the airplane propeller and for applying it to said conductor, means for deriving a potential from said source opposite in polarity to said first potential which varies directly as the square of the simulated indicated air-speed of the simulated flight, means for modifying said latter potential in accordance with the simulated position of the landing gear, in accordance with the simulated position of the wing flaps and in accordance with the simulated position of the engine cowl flaps, and for applying said modified potential to said conductor whereby the drag effects imposed by the landing gear, wing flaps and cowl flaps in opposition to the development of air-speed are simulated, a motor responsive to the summation of potentials applied to said conductor for controlling said second-named means, an instructor's desk, instruments at the pilot's station in said trainer and at said desk controlled by said motor for indicating the simulated indicated air-speed of the simulated flight, and a relay operable to represent a stall condition of flight for increasing said modified drag potential.

13. In an aircraft trainer wherein the flight operations of an airplane are simulated, a source of current, a control conductor, means for deriving a potential from said source commensurate with the simulated thrust of the airplane propeller and for applying it to said conductor, a potentiometer for deriving a potential opposite in polarity to said first potential which varies in accordance with the sine of the angle of the simulated ball deflection error and for applying it to said conductor whereby the drag effect imposed by the execution of an improperly banked turn is simulated, a motor responsive to the summation of the potentials applied to said conductor, an instructor's desk and instruments at the pilot's station in said trainer and at said desk controlled by said motor for indicating the simulated indicated air-speed of the simulated flight.

14. In an aircraft trainer wherein the flight operations of an airplane are simulated, a source of current, a control conductor, means for deriving a potential from said source commensurate with the simulated thrust of the airplane propeller and for applying it to said conductor, a potentiometer for deriving a potential from said source which is either aiding or in opposition to said first potential in accordance with whether the simulated angle of climb of a simulated flight is negative or positive, respectively, a motor responsive to the summation of the potentials applied to said conductor, an instructor's desk and instruments at the pilot's station in said trainer and at said desk controlled by said motor for indicating the simulated indicated air-speed of the simulated flight.

15. In an aircraft trainer wherein the flight operations of an airplane are simulated, a source of current, means for simulating the indicated air-speed of an airplane, means for simulating the true air-speed of said airplane, means for simulating the positions of the wing flaps of said airplane, means for simulating the angle of attack of said airplane, means for simulating the banking of said airplane, means for simulating the rate of turn of the simulated flight, means responsive to said preceding means for deriving potentials from said source of current, and means operative in response to the summation of said derived potentials to a degree commensurate with the simulated angle of climb of the simulated flight.

16. In an aircraft trainer wherein the flight operations of an airplane are simulated, a source of current, a control conductor, means for simulating the indicated air speed of an airplane, means for simulating the angle of attack of said airplane, means for deriving a first potential from said source which varies as the indicated air-speed of the simulated flight and as the angle of attack, said potential being of one or the opposite phase dependent upon whether the angle of attack is positive or negative, means for modifying said potential in accordance with the cosine of the simulated angle of bank of the simulated flight and for applying said modified potential to said conductor, means for deriving a second potential from said source of said one phase which varies as the indicated air-speed, means for modifying said latter potential in accordance with the simulated position of the wing flaps of the airplane, means for further modifying said latter potential in accordance with the cosine of the bank angle and for applying said modified potential to said conductor, means for deriving a third potential from said source of said other phase which decreases as the true air-speed increases, means for modifying said latter potential in accordance with the square of the cosine of the bank angle and in accordance with the cosine of the simulated angle of climb and for applying said modified potential to said conductor, means for deriving a fourth potential from said source which varies in phase and magnitude with the simulated direction and rate of turn and for applying it to said conductor, a motor responsive to the summation of the potentials applied to said conductor and means controlled by said motor for introducing integration factors into other motor control circuit networks of the trainer representative of the angle of climb of the simulated flight.

17. In an aircraft trainer wherein the flight operations of an airplane are simulated, a source of current, means for simulating the indicated air-speed of an airplane, means for simulating the true air-speed of said airplane, means for simulating the position of the wing flaps of said airplane, means for simulating the angle of attack of said airplane, means for simulating the banking of said airplane, means for simulating the rate of turn of the simulated flight, means responsive to said preceding means for deriving potentials from said source of current, means for reducing one of said derived potentials in simulation of the reduction in lift of an airplane when it leaves the ground, means for causing the increase of said latter potential when a landing is simulated and the simulated air-speed becomes reduced to a determined value, and means operative in response to the summation of said derived potentials to a degree commensurate with the simulated angle of climb of the simulated flight.

18. In an aircraft trainer wherein the flight operations of an airplane are simulated, a source of current, a control conductor, means for deriving potentials from said source commensurate with the simulated lift factors of the simulated flight and for applying said potentials to said conductor, means for deriving potentials from said source commensurate with the simulated down force factors of the simulated flight and for applying said potentials to said conductor, a motor responsive to the summation of the potentials applied to said conductor, apparatus operable by said motor to a degree representative of the angle of climb of the simulated flight, a potentiometer operable by said motor for deriving a potential from said source and for applying it to said conductor, means operable only when the landed condition of said flight is simulated for rendering the derivation of said latter potential effective to insure the operation of said motor to return the apparatus operated thereby to the normal position representative of a zero angle of climb.

19. In an aircraft trainer wherein the flight operations of an airplane are simulated, a source of current, a control conductor, means for deriving potentials from said source of current commensurate with the simulated lift factors of the simulated flight and for applying said potentials to said conductor, means for deriving potentials from said source commensurate with the simulated down force factors of the simulated flight and for applying said potentials to said conductor, a motor responsive to the summation of the potentials applied to said conductor, apparatus operable by said motor to a degree representative of the angle of climb of the simulated flight, and means for reducing the value of the lift potentials applied to said conductor when the simulated angle of attack becomes increased to a degree representative of a stall condition whereby said down force potentials become effective to cause said motor to operate said apparatus in a direction representative of a negative angle of climb.

20. In an aircraft trainer wherein the flight operations of an airplane are simulated, a source of current, a control conductor, means for deriving a potential from said source commensurate with the simulated true air-speed of the simulated flight, a potentiometer for modifying said derived potential in accordance with the simulated angle of climb of the simulated flight and for applying said modified potential to said conductor, a motor responsive to the potential applied to said conductor for integrating the product of the angle of climb and the true air-speed with respect to time, an instructor's desk and simulated electrically driven altimeters at the pilot's station in said trainer and at said desk controlled by said motor for indicating the instant altitude at which the simulated flight is being flown.

21. In an aircraft trainer wherein the flight operations of an airplane are simulated, a source of current, a control conductor, two variable transformers for deriving equal potentials of opposite phase from said source which are commensurate with the simulated true air-speed of the simulated flight, a potentiometer having a winding with a grounded center tap to the outer terminals of which winding said derived potentials are applied and the slider of which potentiometer is positioned to one or the other side of said center tap in accordance with the positive or negative value of the simulated angle of climb, a circuit for applying the potential derived at said slider to said conductor, a motor responsive to the potential applied to said conductor for integrating the product of the angle of climb and true air-speed with respect to time, an instructor's desk and simulated electrically driven altimeters at the pilot's station in said trainer and at said desk controlled by said motor for indicating the instant altitude at which the simulated flight is being flown.

22. In an aircraft trainer wherein the flight operations of an airplane are simulated, a source of current, a control conductor, means for deriving a potential from said source commensurate with the simulated true air-speed of the simulated flight, a potentiometer for modifying said derived potential in accordance with the simulated angle of climb of the simulated flight and for applying it to said conductor, a balancing potentiometer for deriving a potential opposite in phase to said first potential and for applying it to said conductor, a motor responsive to the summation of the potentials applied to said conductor for adjusting said balancing potentiometer until the sum of the potentials applied to said conductor becomes zero, an instructor's desk, and instruments at the pilot's station in said trainer and at said desk controlled by said motor to indicate the simulated rate of climb of the simulated flight.

23. In an aircraft trainer wherein the flight operations of an airplane are simulated, a source of current, a control conductor, two variable transformers for deriving equal potentials of opposite phase from said source which are commensurate with the simulated true air-speed of the simulated flight, a potentiometer having a winding with a grounded center tap to the outer terminals of which winding said derived potentials are applied and the slider of which potentiometer is positioned to one or the other side of said center tap position in accordance with the positive or negative value of the simulated angle of climb, a circuit for applying the potential derived at said slider to said conductor, a balancing potentiometer for deriving a potential from said source and for applying it to said conductor opposite in phase to the first potential applied to said conductor, a motor responsive to the summation of the potentials applied to said conductor for adjusting said balancing potentiometer until the sum of the potentials applied to said conductor becomes zero, an instructor's desk and instruments at the pilot's station in said trainer and at said desk controlled by said motor to indicate the simulated rate of climb of the simulated flight.

24. In an aircraft trainer wherein the flight operations of an airplane are simulated, a source of current, a control conductor, a potentiometer for deriving a potential from said source commensurate with the simulated angle of climb of the simulated flight and for applying it to said conductor, a potentiometer for deriving a potential from said source commensurate with the simulated angle of attack of the simulated flight, means for modifying said latter potential in accordance with the cosine of the simulated angle of bank of the simulated flight and for applying said modified potential to said conductor, a balancing potentiometer for deriving a potential from said source and for applying it to said conductor, a motor responsive to the summation of the potentials applied to said conductor for adjusting said balancing potentiometer until the sum of the potentials applied to said conductor becomes zero, an instructor's desk, simulated gyro horizon instruments at the pilot's station in said trainer and at said desk having movable horizon bars and means controlled by said motor for elevating or depressing the horizon bars of said instruments to indicate the nosing-down, nosing-up or level condition of the simulated flight.

25. In an aircraft trainer wherein the flight operations of an airplane are simulated, a source of current, a control conductor, a potentiometer for deriving a potential from said source commensurate with the simulated angle of climb of the simulated flight and for applying it to said conductor, a potentiometer for deriving a potential from said source commensurate with the simulated angle of attack of the simulated flight, means for modifying said latter potential in accordance with the cosine of the simulated angle of bank of the simulated flight and for applying said modified potential to said conductor, means for deriving a potential from said source if an incorrectly banked turn is simulated and for applying it to said conductor, a balancing potentiometer for deriving a potential from said source and for applying it to said conductor, a motor responsive to the summation of the potentials applied to said conductor for adjusting said balancing potentiometer until the sum of the potentials applied to said conductor becomes zero, an instructor's desk, simulated gyro-horizon instruments at the pilot's station in said trainer and at said desk having movable horizon bars and means controlled by said motor for elevating or depressing the horizon bars of said instruments to indicate the nosing-down, nosing-up or level condition of the simulated flight.

26. In an aircraft trainer wherein the flight operations of an airplane are simulated, a source of current, a control conductor, a potentiometer for deriving a potential from said source commensurate with the simulated angle of climb of the simulated flight and for applying it to said conductor, a potentiometer for deriving a potential from said source commensurate with the simulated angle of attack of the simulated flight, means for modifying said latter potential in accordance with the cosine of the simulated angle of bank of the simulated flight and for applying said modified potential to said conductor, two variable transformers for deriving equal potentials of opposite phase from said source which vary in value and in sense in accordance with the divergence of a turn from the correct banked condition, a potentiometer to the terminals of which said latter potentials are applied and the slider of which is controlled in accordance with the direction and amount of the angle of bank, means for modifying the potential derived at the slider of said latter potentiometer in accordance with the simulated indicated air-speed of the simulated flight and for applying said modified potential to said conductor, a balancing potentiometer for deriving a potential from said source and for applying it to said conductor, a motor responsive to the summation of the potentials applied to said conductor for adjusting said balancing potentiometer until the sum of the potentials applied to said conductor becomes zero, an instructor's desk, simulated horizon instruments at the pilot's station in said trainer and at said desk having movable horizon bars, and means controlled by said motor for elevating or depressing the horizon bars of said instruments to indicate the nosing-down, nosing-up or level condition of the simulated flight.

27. In an aircraft trainer wherein the flight operations of an airplane are simulated, a source of current, a control conductor, means for deriving potentials of opposite phase from said source which vary in accordance with the simulated thrust developed by the airplane propeller, means for deriving potentials of opposite phase from said source which vary with the simulated indicated air-speed of the simulated flight, means for summing the similarly phased potentials, two simulated brake pedals, a potentiometer controlled by one of said brake pedals for modifying the summed potential of one phase, a potentiometer controlled by the other of said brake pedals for modifying the summed potential of said other phase, means rendered effective for applying either of said modified potentials to said control conductor when a ground condition of flight is simulated, a balancing potentiometer for deriving a potential from said source and for applying it to said conductor, a motor responsive to the summation of the potentials supplied to said conductor for adjusting said balancing potentiometer until the sum of the potentials applied to said conductor becomes zero, an instructor's desk, indicators at the pilot's station in said trainer and at said desk operable by said motor for representing the simulated rate of turn incident to the application of one of the brakes of an airplane when taxiing on the ground and means operated by said motor for introducing integration factors into other motor control circuit networks of the trainer representative of the rate of turn.

28. In an aircraft trainer wherein the flight operations of an airplane are simulated, a source of current, a control conductor, means for deriving potentials of opposite phase from said source which vary in accordance with the simulated thrust developed by the airplane propeller, means for deriving potentials of opposite phase from said source which vary in accordance with the simulated indicated air-speed of the simulated flight, a simulated rudder pedal assembly, two potentiometers controlled by said rudder pedal assembly to the winding terminals of one of which said first derived potentials are applied and to the winding terminals of the other of which said second derived potentials are applied whereby the adjustment of the sliders of said potentiometers by said rudder pedal assembly to the rudder left or to the rudder right position is instrumental in applying a potential of one or the other phase to said conductor which varies as the indicated air-speed and as the propeller thrust, a balancing potentiometer for deriving a potential from said source and for applying it to said conductor, a motor responsive to the summation of the potentials applied to said conductor for adjusting said balancing potentiometer until the sum of the potentials applied to said conductor becomes zero, an instructor's desk, instruments at the pilot's station in said trainer and at said desk operable by said motor for indicating the simulated rate of turn, and means operated by said motor for introducing integration factors into other motor control circuit networks of the trainer representative of the rate of turn.

29. In an aircraft trainer wherein the flight operations of an airplane are simulated, a source of current, a control conductor, means for deriving potentials of opposite phase from said source which vary in accordance with the simulated thrust developed by the airplane propeller, means for deriving potentials of opposite phase from said source which vary in accordance with the simulated air-speed of the simulated flight, a simulated rudder trim wheel, two potentiometers controlled by said wheel to the winding terminals of one of which said first derived potentials are applied and to the winding terminals of the other of which said second derived potentials are applied whereby the adjustment of the sliders of said potentiometers by the trim wheel to rudder trim right or rudder trim left position is instrumental in applying potentials of either one or the opposite phase to said conductor which vary as the indicated air-speed and as the propeller thrust, a balancing potentiometer for deriving a potential from said source and for applying it to said conductor, a motor responsive to the summation of the potentials applied to said conductor for adjusting said balancing potentiometer until the sum of the potentials applied to said conductor becomes zero, an instructor's desk, instruments at the pilot's station in said trainer and at said desk operable by said motor for indicating the simulated rate of turn, and means operated by said motor for introducing integration factors into other motor control circuit networks of the trainer representative of the rate of turn.

30. In an aircraft trainer wherein the flight operations of an airplane are simulated, a source of current, a control conductor, a potentiometer for deriving a potential from said source commensurate with the simulated rate of turn of the simulated flight, means for modifying said potential in accordance with the cosine of the simulated angle of bank, means for further modifying said potential in accordance with the secant of the simulated angle of climb of the simulated flight and for applying said potential to said conductor, means for deriving a potential from said source which varies in accordance with the simulated indicated air-speed, in accordance with the angle of attack, in accordance with the sine of the angle of bank and in accordance with the secant of the angle of climb of the simulated flight and for applying said latter potential to said conductor, a motor responsive to the summation of the potentials applied to said conductor for integrating the rate of turn with respect to time, an instructor's desk, and indicators simulating compasses at the pilot's station in said trainer and at said desk operable in response to the operation of said motor to indicate the compass bearing of the simulated flight.

31. In an aircraft trainer wherein the flight operations of an airplane are simulated, a source of current, a control conductor, means for simulating the adjustment of the ailerons of an airplane, means for deriving a potential from said source which varies in accordance with the setting of said latter means and in accordance with the simulated true air-speed of the simulated flight and for applying said potential to said conductor, means for deriving a potential from said source which varies in accordance with the simulated rate of turn and with the value of the simulated angle of climb of the simulated flight, and of one or the opposite phase as determined by the direction of the turn and by the sign of the angle of climb, means for modifying said latter potential in accordance with the cosine of the simulated angle of bank and for applying it to said conductor, a motor responsive to the summation of the potentials applied to said conductor, an instructor's desk, indicators at the pilot's station in said trainer and at said desk controlled by said motor for indicating the simulated angle of bank of the simulated flight, and means operated by said motor for introducing integration factors into other motor control circuit networks of said trainer representative of the angle of bank of the simulated flight.

32. In an aircraft trainer wherein the flight operations of an airplane are simulated, a source of current, a control conductor, means for simulating the trimming of the ailerons of an airplane, means for deriving a potential from said source which varies in accordance with the operation of said latter means and in accordance with the simulated true air-speed of the simulated flight and for applying said potential to said conductor, means for deriving a potential from said source which varies in accordance with the simulated rate of turn and with the value of the simulated angle of climb of the simulated flight, and of one or the opposite phase as determined by the direction of the turn and by the sign of the angle of climb, means for modifying said latter potential in accordance with the cosine of the simulated angle of bank and for applying it to said conductor, a motor responsive to the summation of the potentials applied to said conductor, an instructor's desk, indicators at the pilot's station in said trainer and the said desk controlled by said motor for indicating the simulated angle of bank of the simulated flight, and means operated by said motor for introducing integration factors into other motor control circuit networks of said trainer representative of the angle of bank of the simulated flight.

33. In an aircraft trainer wherein the flight operations of an airplane are simulated, a source of current, a control conductor, means for deriving potentials of opposite phase from said source which vary as the simulated true airspeed of the simulated flight, a potentiometer to the winding terminals of which said potentials are applied, the slider of which is adjusted in accordance with the simulated adjustment of the ailerons of an airplane, means for applying the potential derived at said slider to said conductor, potentiometers for deriving potentials of opposite phase from said source which vary in accordance with the simulated rate of turn of the simulated flight, and each of which potentials will be of one or the opposite phase dependent upon the direction of the simulated turn, a potentiometer to the winding terminals of which said latter potentials are applied and the slider of which is adjustable in accordance with the magnitude and sign of the simulated angle of climb, means for modifying the potential derived at the slider of said latter potentiometer in accordance with the cosine of the simulated angle of bank and for applying said modified potential to said conductor, a motor responsive to the summation of the potentials applied to said conductor, an instructor's desk, instruments at the pilot's station in said trainer and at said desk controlled by said motor for indicating the simulated angle of bank of the simulated flight, and means operated by said motor for introducing integration factors into other motor control circuit networks of said trainer representative of the angle of bank of the simulated flight.

34. In an aircraft trainer wherein the flight operations of an airplane are simulated, a source of current, a control conductor, means for deriving potentials of opposite phases from said source which vary in accordance with the simulated propeller thrust, means responsive to the simulation of the setting of the elevator of the airplane for deriving a potential of one or the opposite phase from said potentials and for applying it to said conductor, a relay operative to represent a grounded condition of flight, a relay operative to represent a chocked condition of the landing wheels, a circuit controlled by said relays for applying one of said first derived potentials to said conductor representative of the opposition to the development of lift incident to the landing wheels being chocked, a balancing potentiometer for deriving a potential from said source and for applying it to said conductor, a motor responsive to the summation of the potentials applied to said conductor for adjusting said latter potentiometer until the sum of the potentials applied to said conductor becomes zero and means operated by said motor for introducing integration factors into other motor control circuit networks of said trainer representative of the angle of attack of the simulated flight.

35. In an aircraft trainer wherein the flight operations of an airplane are simulated, a source of current, a control conductor, means for deriving potentials of opposite phase from said source which vary in accordance with the simulated propeller thrust, means responsive to the simulation of the setting of the elevator of the airplane for deriving a potential of one or the opposite phase from said potentials and for applying it to said conductor, a relay operative to represent a grounded condition of flight, a relay operative to represent a chocked condition of the landing wheels, a circuit controlled by said relays for applying one of said first derived potentials to said conductor representative of the opposition to the development of lift incident to the landing wheels being chocked, a balancing potentiometer for deriving a potential from said source and for applying it to said conductor, a motor responsive to the summation of the potentials applied to said conductor for adjusting said potentiometer until the sum of the potentials applied to said conductor become zero, means operated by said motor to a position representative of the angle of attack of a simulated flight, means for deriving a potential from said source and for applying it to said conductor representative of the decrease in angle of attack incident to the lifting of the tail wheel from the ground, and a relay releasable by said latter means when the angle of attack becomes less than a definite positive value to render said latter means effective.

36. In an aircraft trainer wherein the flight operations of an airplane are simulated, a source of current, a control conductor, means for deriving a potential of one or the opposite phase from said source in accordance with the simulated position of the elevator of an airplane representative of a lift factor of the simulated flight and for applying it to said conductor, means for deriving a potential of one of said phases from said source which varies in accordance with the simulated position of the wing flaps of said airplane and for applying it to said conductor whereby said potential is increased as the lowering of the wing flaps is simulated representative of the increased opposition to the development of lift, means for further increasing said potential in simulation of the lowered or partially lowered condition of the landing wheels, a balancing potentiometer for deriving a potential from said source and for applying it to said conductor, a motor responsive to the summation of the potentials applied to said conductor for adjusting said balancing potentiometer until the sum of the potentials applied to said conductor becomes zero, and means operated by said motor for introducing integration factors into other control circuit networks of said trainer representative of the angle of attack of the simulated flight.

37. In an aircraft trainer wherein the flight operations of an airplane are simulated, a source of current, a control conductor, means for deriving a potential of one or the opposite phase from said source in accordance with the simulated position of the elevator of an airplane representative of a lift factor of the simulated flight and for applying it to said conductor, means for deriving a potential of one of said phases from said source and for applying it to said conductor in simulation of the opposition to the development of lift due to the attachment of a droppable fuel tank to said airplane, means for decreasing said derived potential in simulation of the dropping of said tank, a balancing potentiometer for deriving a potential from said source and for applying it to said conductor, a motor responsive to the summation of the potentials applied to said conductor for adjusting said balancing potentiometer until the sum of the potentials applied to said conductor becomes zero, and means operative by said motor for introducing integration factors into other circuit control networks of said trainer representative of the angle of attack of the simulated flight.

38. In an aircraft trainer wherein the flight operations of an airplane are simulated, a source of current, a control conductor, means for simulating the trimming of the elevator of an airplane, means for deriving a potential of one or the opposite phase from said source in accordance with the operation of said latter means representative of a lift factor of the simulated flight and for applying it to said conductor, means for deriving a potential of one of said phases from said source which varies in accordance with the simulated position of the wing flaps of said airplane and for applying it to said conductor whereby said potential is increased as the lowering of the wing flaps is simulated representative of the increased opposition to the development of lift, means for further increasing said potential in simulation of the lowered or partially lowered condition of the landing wheels, a balancing potentiometer for deriving a potential from said source and for applying it to said conductor, a motor responsive to the summation of the potentials applied to said conductor for adjusting said balancing potentiometer until the sum of the potentials applied to said conductor becomes zero, and means operated by said motor for introducing integration factors into other control circuit networks of said trainer representative of the angle of attack of the simulated flight.

39. Flight training apparatus of the type operable by simulated aircraft controls comprising voltage deriving means controlled in accordance with the positioning of aircraft vertical control including throttle and elevator control, electronic valve means controlled by voltages derived from said deriving means for controlling vertical air speed flight indicating means, said electronic valve means being provided with feed-back control, and a resistance adjustable in accordance with the positioning of elevator control for varying said feed-back control for simulating climb-dive characteristics of aircraft.

EDWARD J. FOGARTY.
ROBERT O. RIPPERE.

References Cited in the file of this patent

UNITED STATES PATENTS

| Number | Name | Date |
|---|---|---|
| 2,099,857 | Link | Nov. 23, 1937 |
| 2,153,986 | MacLaren | Apr. 11, 1939 |
| 2,282,442 | Whitlock | May 12, 1942 |
| 2,346,838 | Haight | Apr. 18, 1944 |
| 2,366,603 | Dehmel | Jan. 2, 1945 |
| 2,372,741 | Roberts | Apr. 3, 1945 |
| 2,394,180 | Imm | Feb. 5, 1946 |
| 2,395,477 | Gumley | Feb. 26, 1946 |
| 2,397,477 | Kellogg | Apr. 2, 1946 |
| 2,408,081 | Lovell | Sept. 24, 1946 |
| 2,428,767 | Albert | Oct. 14, 1947 |
| 2,443,604 | Dehmel | June 22, 1948 |